US008933975B2

(12) United States Patent
Nakanishi et al.

(10) Patent No.: US 8,933,975 B2
(45) Date of Patent: Jan. 13, 2015

(54) DISPLAY DEVICE AND DISPLAY CONTROL METHOD

(75) Inventors: Hirokazu Nakanishi, Osaka (JP); Atsushi Nakanishi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 287 days.

(21) Appl. No.: 13/265,763

(22) PCT Filed: Apr. 9, 2010

(86) PCT No.: PCT/JP2010/002618

§ 371 (c)(1), (2), (4) Date: Oct. 21, 2011

(87) PCT Pub. No.: WO2010/122725

PCT Pub. Date: Oct. 28, 2010

(65) Prior Publication Data

US 2012/0038694 A1 Feb. 16, 2012

(30) Foreign Application Priority Data

Apr. 24, 2009 (JP) ................................ 2009-105987

(51) Int. Cl.
*G06F 5/10* (2006.01)
*G09G 3/34* (2006.01)

(52) U.S. Cl.
CPC ...... *G09G 3/3426* (2013.01); *G09G 2320/0646* (2013.01); *G09G 2360/16* (2013.01)
USPC ............................ 345/694; 345/102; 345/204

(58) Field of Classification Search
USPC .......................................... 345/102, 204, 694
See application file for complete search history.

(56) References Cited

U.S. PATENT DOCUMENTS

| | | | | |
|---|---|---|---|---|
| 7,505,016 | B2 | 3/2009 | Kwon | |
| 8,049,711 | B2 * | 11/2011 | Kobayashi et al. | 345/102 |

(Continued)

FOREIGN PATENT DOCUMENTS

| | | |
|---|---|---|
| JP | 2002-202767 | 7/2002 |
| JP | 2004-246117 | 9/2004 |

(Continued)

OTHER PUBLICATIONS

International Search Report issued May 11, 2010 in International (PCT) Application No. PCT/JP2010/002618.

(Continued)

*Primary Examiner* — William Boddie
*Assistant Examiner* — Bryan Earles
(74) *Attorney, Agent, or Firm* — Wenderoth, Lind & Ponack, L.L.P.

(57) ABSTRACT

Provided is a display device capable of reducing a visually unpleasant sensation experienced by a user. This display device includes a display panel displaying a video picture, a backlight unit disposed on a back surface of the display panel and including a light sources for each region obtained by dividing the display panel into regions, a region characteristic amount detection unit detecting a characteristic amount of an image of each of the divided regions, a full screen characteristic amount detection unit detecting a characteristic amount of an image of the overall display panel, a region brightness determination unit determining an emission brightness of the respective light sources corresponding to each of the regions based on the detected characteristic amount, and the detected characteristic amount of the image of the overall display panel, and a backlight drive unit driving the respective light sources to emit light at the determined emission brightness.

20 Claims, 41 Drawing Sheets

(56) References Cited

U.S. PATENT DOCUMENTS

| | | | | |
|---|---|---|---|---|
| 2002/0130830 | A1 | 9/2002 | Park | |
| 2005/0174320 | A1 | 8/2005 | Park | |
| 2006/0164379 | A1 | 7/2006 | Oh et al. | |
| 2007/0152926 | A1 | 7/2007 | Kwon | |
| 2007/0247871 | A1 | 10/2007 | Yoo | |
| 2007/0285379 | A1 | 12/2007 | Jung et al. | |
| 2008/0297463 | A1 * | 12/2008 | Tsuru et al. | 345/102 |
| 2009/0052774 | A1 | 2/2009 | Yoshii et al. | |

FOREIGN PATENT DOCUMENTS

| | | |
|---|---|---|
| JP | 2007-183608 | 7/2007 |
| JP | 2007-187974 | 7/2007 |
| JP | 2007-219234 | 8/2007 |
| JP | 2007-293339 | 11/2007 |
| JP | 2008-58896 | 3/2008 |
| JP | 2008-90076 | 4/2008 |
| JP | 2008-154251 | 7/2008 |
| WO | 2008/001512 | 1/2008 |

OTHER PUBLICATIONS

Supplementary European Search Report issued Feb. 21, 2013 in corresponding European Application No. 10766788.3.

Hanfeng Chen et al., "39.3: Locally Pixel-Compensated Backlight Dimming for Improving Static Contrast on LED Backlit LCDs", SID 2007, 2007 SID International Symposium, Society for Information Display, Los Angeles, USA vol. XXXVIII, May 20, 2007, pp. 1339-1341.

* cited by examiner

DISPLAY DEVICE AND DISPLAY CONTROL METHOD

TECHNICAL FIELD

The present invention relates to a display device comprising a plurality of light sources on a back surface of a display panel, and a display control method for controlling a plurality of light sources disposed on a back surface of a display panel.

BACKGROUND ART

In a conventional display device, known is technology of dividing a display screen into a plurality of regions and changing the brightness for each segmented region in order to improve the picture quality of the display panel (for example, refer to Patent Literatures 1 and 2).

Moreover, when a display screen is divided into a plurality of regions and the brightness is changed for each segmented region, a visually unpleasant sensation will arise between the segmented regions. With a conventional display device, in order to alleviate the visually unpleasant sensation between the segmented regions, known is technology of inhibiting the brightness difference between the target segmented region and the peripheral segmented regions (for example, refer to Patent Literature 3).

In addition, with a conventional display device, known is technology of disposing LEDs at the boundary division of the adjacent segmented regions in order to alleviate the visually unpleasant sensation between the segmented regions (for example, refer to Patent Literature 4).

Nevertheless, even if the foregoing technologies are adopted, when pixels (white pixels) of high brightness and pixels (black pixels) of low brightness coexist in the image to be displayed, there is a problem in that it is not possible to display the image at an appropriate brightness.

Specifically, this is now explained with reference to FIG. 40 and FIG. 41. FIGS. 40A to C are diagrams showing a video picture (still picture) that is displayed on a conventional liquid crystal display device when the backlight is set to a high brightness. FIG. 40A is a diagram showing an example of a video picture signal that is input to the display panel, FIG. 40B is a diagram showing the brightness of the backlight to illuminate the segmented region when the video picture signal shown in FIG. 40A is input, and FIG. 40C is a diagram showing the video picture that is actually displayed on the display screen.

In FIGS. 40A to 40C, when a black pixel and a white pixel coexist in the segmented region 101 at the center of the screen, the backlight is set to a high brightness in order to brightly display the white pixel. In the video picture signal shown in FIG. 40A, a white image 102 configured by a white level pixel and a black image 103 configured by a black level pixel coexist in the segmented region 101. The white image 102 is the center portion of the segmented region, and the black image 103 is the peripheral portion of the white image 102.

As shown in FIG. 40B, when a white level pixel and a black level pixel coexist in a single segmented region, the backlight for illuminating that segmented region is lit with high brightness in order to display the white level pixel. Here, the black level pixel is displayed black by lowering the transmittance of the liquid crystal panel. Nevertheless, it is difficult to cause the transmittance of the liquid crystal display element to become completely zero. Thus, light from the brightly lit backlight leaks to the black level pixel, and a so-called "black floating" phenomenon where the black image 103 becomes slightly bright will occur. FIG. 40C is a diagram showing a state where the black floating is occurring.

As shown in FIG. 40C, when the backlight is set to a high brightness, in addition to the region where the white image should be displayed, the region where the black image should be displayed is also illuminated with a high brightness. Thus, a gray image rather than a black image is displayed, and the so-called black floating problem will arise.

FIGS. 41A to 41C are diagrams showing a video picture (still picture) that is displayed on a conventional liquid crystal display device when the backlight is set to a low brightness. FIG. 41A is a diagram showing an example of a video picture signal that is input to the display panel, FIG. 41B is a diagram showing the brightness of the backlight to illuminate the segmented region when the video picture signal shown in FIG. 40A is input, and FIG. 41C is a diagram showing the video picture that is actually displayed on the display screen.

In FIGS. 41A to 41C, unlike FIGS. 40A to 40C described above, when a black pixel and a white pixel coexist in the segmented region 101 at the center of the screen, the backlight is set to a low brightness in order to darkly display the black pixel. As shown in FIG. 41C, when the backlight is set to a low brightness, a black image is displayed in the region where the black image should be displayed. Nevertheless, in the region where the white image should be displayed, a gray image rather than a white image is displayed, and a problem of insufficient brightness will arise.

CITATION LIST

Patent Literature

Patent Literature 1: Japanese Patent Application Publication No. 2004-246117

Patent Literature 2: Japanese Patent Application Publication No. 2007-219234

Patent Literature 3: Japanese Patent Application Publication No. 2008-90076

Patent Literature 4: Japanese Patent Application Publication No. 2007-293339

SUMMARY OF THE INVENTION

The present invention was devised in order to resolve the foregoing problems, and its object is to provide a display device and a display control method capable of reducing a visually unpleasant sensation that is experienced by a user.

The display device according to one aspect of the present invention comprises a display panel which displays a video picture, a backlight unit which is disposed on a back surface of the display panel, and which includes a plurality of light sources for each region obtained by dividing the display panel into a plurality of regions, a first detection unit which detects a characteristic amount of an image of each of the divided regions, a second detection unit which detects a characteristic amount of an image of the overall display panel, and a drive unit which determines an emission brightness of the respective light sources corresponding to each of the regions based on the characteristic amount of the image of each region that is detected by the first detection unit, and the characteristic amount of the image of the overall display panel that is detected by the second detection unit, and drives the respective light sources to emit light at the determined emission brightness.

According to the foregoing configuration, the characteristic amount of the image of each of the divided regions is detected, and the characteristic amount of the image of overall display panel is detected. In addition, the emission brightness of the respective light sources corresponding to each of the regions is determined based on the detected characteristic amount of the image of each region, and the detected characteristic amount of the image of the overall display panel, and the respective light sources are driven to emit light at the determined emission brightness.

According to the present invention, since the emission brightness of the respective light sources corresponding to each of the divided regions is determined in consideration of the characteristic amount of the image of the overall screen in addition to the characteristic amount of the image of each of the divided regions, it is possible to determine the emission brightness of the light sources so as to inhibit black floating and insufficient brightness, and reduce the visually unpleasant sensation that is experienced by the user.

The object, features and advantages of the present invention will become more apparent according to the ensuing detailed explanation and appended drawings.

BRIEF DESCRIPTION OF THE DRAWINGS

FIG. 1 is a block diagram showing the overall configuration of the display device in Embodiment 1 of the present invention.

FIG. 2 is a block diagram showing the configuration of the full screen characteristic amount detection unit and the region characteristic amount detection unit in Embodiment 1.

FIG. 3 is a diagram explaining the processing of determining the region brightness to be performed by the region brightness determination unit in Embodiment 1.

FIG. 4 is a block diagram showing the configuration of the full screen characteristic amount detection unit and the region characteristic amount detection unit in the first modified example of Embodiment 1.

FIG. 5 is a diagram explaining the processing of determining the region brightness to be performed by the region brightness determination unit in the first modified example of Embodiment 1.

FIG. 6 is a block diagram showing the configuration of the full screen characteristic amount detection unit and the region characteristic amount detection unit in the second modified example of Embodiment 1.

FIG. 7 is a diagram explaining the processing of determining the region brightness to be performed by the region brightness determination unit in the second modified example of Embodiment 1.

FIG. 8 is a block diagram showing the configuration of the full screen characteristic amount detection unit and the region characteristic amount detection unit in the third modified example of Embodiment 1.

FIG. 9 is a diagram explaining the processing of determining the region brightness to be performed by the region brightness determination unit in the third modified example of Embodiment 1.

FIG. 10 is a block diagram showing the configuration of the full screen characteristic amount detection unit and the region characteristic amount detection unit in the fourth modified example of Embodiment 1.

FIG. 11 is a diagram explaining the processing of determining the region brightness to be performed by the region brightness determination unit in the fourth modified example of Embodiment 1.

FIG. 12 is a block diagram showing the configuration of the full screen characteristic amount detection unit and the region characteristic amount detection unit in the fifth modified example of Embodiment 1.

FIG. 13 is a diagram explaining the processing of determining the region brightness to be performed by the region brightness determination unit in the fifth modified example of Embodiment 1.

FIG. 14 is a block diagram showing the configuration of the full screen characteristic amount detection unit and the region characteristic amount detection unit in the sixth modified example of Embodiment 1.

FIG. 15 is a diagram explaining the processing of determining the region brightness to be performed by the region brightness determination unit in the sixth modified example of Embodiment 1.

FIG. 16 is a block diagram showing the configuration of the full screen characteristic amount detection unit and the region characteristic amount detection unit in the seventh modified example of Embodiment 1.

FIG. 17 is a diagram explaining the processing of determining the region brightness to be performed by the region brightness determination unit in the seventh modified example of Embodiment 1.

FIG. 18 is a block diagram showing the overall configuration of the display device in Embodiment 2 of the present invention.

FIG. 19 is a block diagram showing the configuration of the full screen characteristic amount detection unit and the region characteristic amount detection unit in Embodiment 2.

FIG. 20 is a diagram explaining the processing of determining the region brightness to be performed by the region brightness determination unit in Embodiment 2.

FIG. 21 is a block diagram showing the configuration of the full screen characteristic amount detection unit and the region characteristic amount detection unit in the first modified example of Embodiment 2.

FIG. 22 is a diagram explaining the processing of determining the region brightness to be performed by the region brightness determination unit in the first modified example of Embodiment 2.

FIG. 23 is a block diagram showing the configuration of the full screen characteristic amount detection unit and the region characteristic amount detection unit in the second modified example of Embodiment 2.

FIG. 24 is a diagram explaining the processing of determining the region brightness to be performed by the region brightness determination unit in the second modified example of Embodiment 2.

FIG. 25 is a block diagram showing the configuration of the full screen characteristic amount detection unit and the region characteristic amount detection unit in the third modified example of Embodiment 2.

FIG. 26 is a diagram explaining the processing of determining the region brightness to be performed by the region brightness determination unit in the third modified example of Embodiment 2.

FIG. 27 is a block diagram showing the configuration of the full screen characteristic amount detection unit and the region characteristic amount detection unit in the fourth modified example of Embodiment 2.

FIG. 28 is a diagram explaining the processing of determining the region brightness to be performed by the region brightness determination unit in the fourth modified example of Embodiment 2.

FIG. 29 is a block diagram showing the configuration of the full screen characteristic amount detection unit and the region characteristic amount detection unit in the fifth modified example of Embodiment 2.

FIG. 30 is a diagram explaining the processing of determining the region brightness to be performed by the region brightness determination unit in the fifth modified example of Embodiment 2.

FIG. 31 is a block diagram showing the configuration of the full screen characteristic amount detection unit and the region characteristic amount detection unit in the sixth modified example of Embodiment 2.

FIG. 32 is a diagram explaining the processing of determining the region brightness to be performed by the region brightness determination unit in the sixth modified example of Embodiment 2.

FIG. 33 is a block diagram showing the configuration of the full screen characteristic amount detection unit and the region characteristic amount detection unit in the seventh modified example of Embodiment 2.

FIG. 34 is a diagram explaining the processing of determining the region brightness to be performed by the region brightness determination unit in the seventh modified example of Embodiment 2.

FIG. 35 is a diagram explaining another example of the method of determining the brightness in the region.

[FIG. 36]

[FIG. 37]

FIG. 38 is a block diagram showing the configuration of the full screen characteristic amount detection unit and the region characteristic amount detection unit in Embodiment 4 of the present invention.

FIG. 39 is a block diagram showing the overall configuration of the display device in Embodiment 5 of the present invention.

FIG. 40 is a diagram showing the video picture that is displayed on a conventional liquid crystal display device when the backlight is set to a high brightness.

FIG. 41 is a diagram showing the video picture that is displayed on a conventional liquid crystal display device when the backlight is set to a low brightness.

DESCRIPTION OF EMBODIMENTS

Embodiments of the present invention are now explained with reference to the appended drawings. Note that the display device and the driving method of the display device explained in the Embodiments are examples for realizing the present invention, and the present invention is not limited thereto.

(Embodiment 1)

Figure 1:
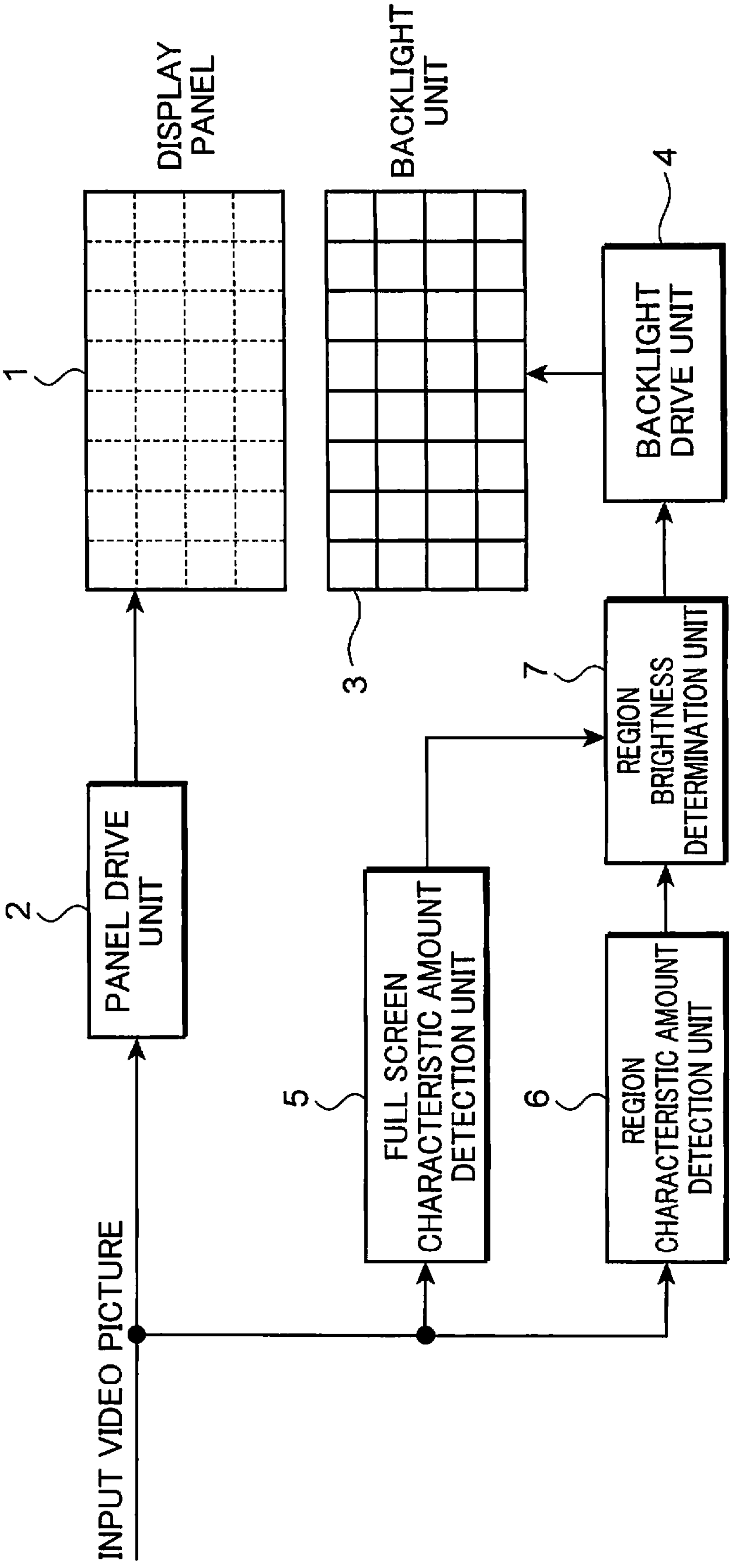
[FIG. 1]

FIG. 1 is a block diagram showing the overall configuration of the display device in Embodiment 1 of the present invention. Foremost, the respective configurations of the display device of Embodiment 1 are explained in detail with reference to the block diagram of FIG. 1 showing the overall configuration of the display device of Embodiment 1. The display device of Embodiment 1 comprises a display panel 1, a panel drive unit 2, a backlight unit 3, a backlight drive unit 4, a full screen characteristic amount detection unit 5, a region characteristic amount detection unit 6, and a region brightness determination unit 7.

The display panel 1 is configured, for example, with a liquid crystal panel, and displays an input video picture. The panel drive unit 2 controls the drive of the display panel 1.

Although not shown, the display panel 1 comprises a plurality of gate wires, a plurality of source wires, a switching element, and a plurality of pixel cells, a plurality of pixels are arranged in a matrix at the intersection of the plurality of source wires and the plurality of gate wires, and one scanning line is configured from pixels of one line in the horizontal direction. The plurality of source wires are supplied with a pixel signal from the panel drive unit 2, and the plurality of gate wire are supplied with a gate pulse to serve as the scanning signal from the panel drive unit 2, and the pixels are thereby driven. The panel drive unit 2 drives the respective pixels of the display panel 1 based on the input video picture. With the display panel 1, as shown with the dotted line of FIG. 1, the display screen is conceptually divided into a plurality of segmented regions.

The backlight unit 3 is disposed on the back surface of the display panel 1, and includes an LED (Light Emitting Diode) for each region obtained by dividing the display panel 1 into a plurality of regions. Note that one LED may be provided in each region, or a plurality of LEDs may be provided in each region.

The backlight unit 3 irradiates illumination light from the back surface for displaying an image on the display panel 1. The backlight unit 3 is also divided into a plurality of segmented region as with the display panel 1. The backlight unit 3 divides the screen into a plurality of regions, and illuminates the respective segmented regions. The respective segmented regions of the backlight unit 3 illuminate the segmented regions located at the same position on the display panel 1. The respective segmented regions of the backlight unit 3 are each provided with at least one light source. In other words, the backlight unit 3 comprises a plurality of light sources for illuminating each of the plurality of segmented regions. As the light source, for example, a white LED using phosphor, or an RGB LED which obtains white light by using a three-color LED of red (R), green (G) and blue (B) is used.

The backlight drive unit 4 drives the LEDs that is arranged in each segmented region. The backlight drive unit 4 independently drives the brightness of each segmented region. The full screen characteristic amount detection unit 5 detects the characteristic amount of the image of the overall display panel. The full screen characteristic amount detection unit 5 detects, for example, the average brightness level of the overall screen. The region characteristic amount detection unit 6 detects the characteristic amount of the image of each of the divided regions. The region characteristic amount detection unit 6 detects, for example, a maximum value of brightness, a minimum value of brightness, and an average value of brightness in the region to be processed.

The region brightness determination unit 7 determines the brightness of the relevant region based on the detection results of the full screen characteristic amount detection unit 5 and the region characteristic amount detection unit 6. The region brightness determination unit 7 determines the brightness of the respective LEDs corresponding to each of the regions based on the characteristic amount of the image of each region that is detected by the region characteristic amount detection unit 6, and the characteristic amount of the image of the overall display panel that is detected by the full screen characteristic amount detection unit 5. The backlight drive unit 4 drives the respective LEDs to emit light at the brightness that was determined by the region brightness determination unit 7.

Note that, as the method of conceptually dividing the display panel 1 into a plurality of regions as described above, in addition to dividing it in a vertical direction and a horizontal direction, it is also possible to divide it only in a horizontal direction, or divide it only in a vertical direction. Moreover, the present invention can be applied to any panel which requires a backlight unit in addition to a liquid crystal panel as the display panel 1.

Moreover, the region characteristic amount detection unit 6 detects, for the image in each of the divided regions, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness.

Moreover, the full screen characteristic amount detection unit 5 detects, for the image of the overall display panel, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness.

Moreover, in the foregoing display device, although the backlight drive unit 4 and the region brightness determination unit 7 are configured from separate circuit blocks, the present invention is not limited thereto, and it is also possible to provide the function of the region brightness determination unit 7 in the backlight drive unit 4.

Moreover, in the foregoing display device, although the input video picture is directly input to the panel drive unit 2, the present invention is not limited thereto, and the configuration may be such that the input video picture is corrected according to the brightness of the backlight of each region, and the corrected input video picture is input to the panel drive unit 2.

Figure 2:
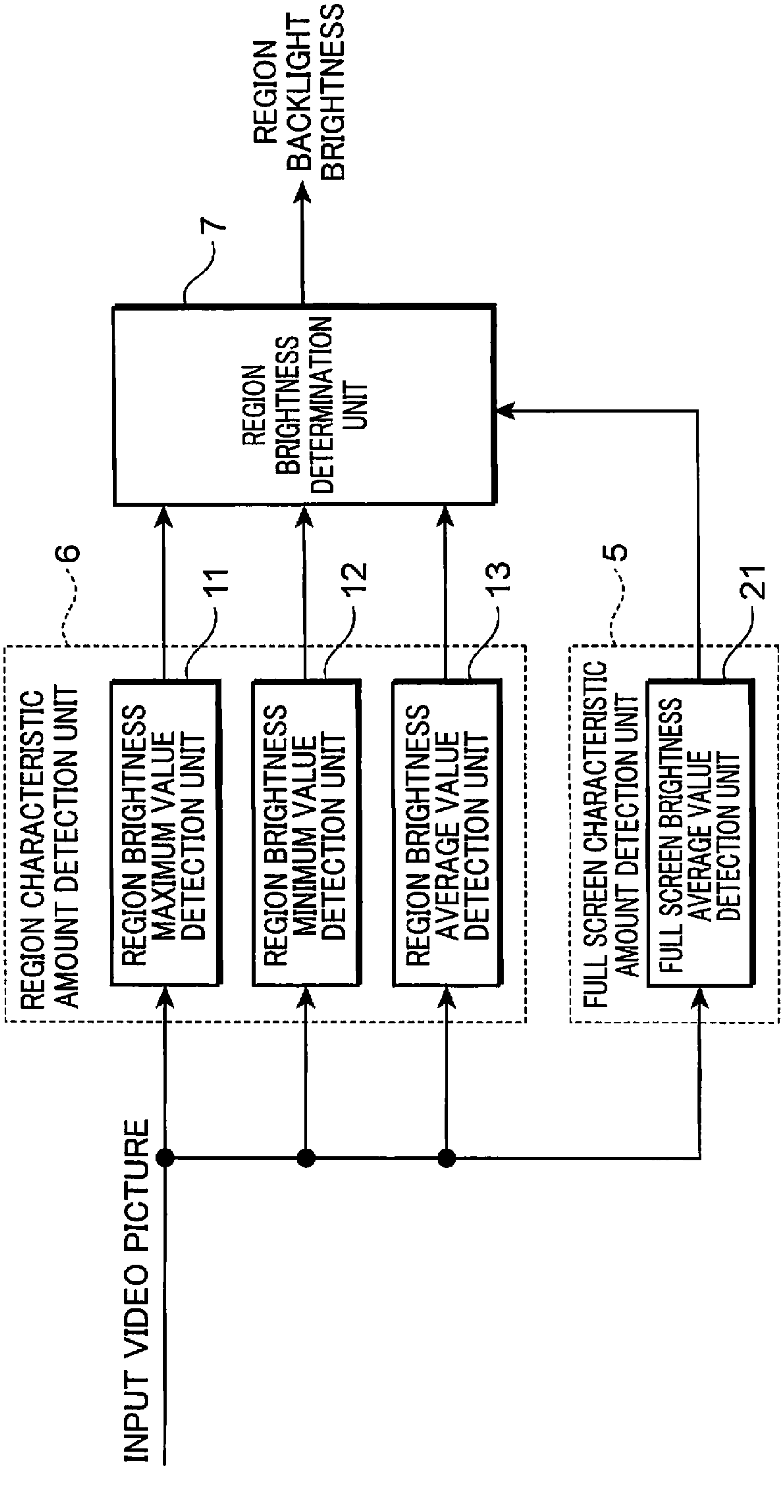
[FIG. 2]

The configuration of the full screen characteristic amount detection unit 5 and the region characteristic amount detection unit 6 is now explained in further detail with reference to FIG. 2 and FIG. 3. FIG. 2 is a block diagram showing the configuration of the full screen characteristic amount detection unit and the region characteristic amount detection unit in Embodiment 1. As shown in FIG. 2, the region characteristic amount detection unit 6 includes a region brightness maximum value detection unit 11 which detects the maximum value of brightness of the image in the region to be processed, a region brightness minimum value detection unit 12 which detects the minimum value of brightness of the image in the region to be processed, and a region brightness average value detection unit 13 which detects the average value of brightness of the image in the region to be processed. Moreover, as shown in FIG. 2, the full screen characteristic amount detection unit 5 includes a frame memory (not shown) and a full screen brightness average value detection unit 21 which detects the average value of brightness of the image in one screen.

As shown in FIG. 2, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The region brightness determination unit 7 determines the emission brightness of the respective LEDs of the backlight unit 3 based on the maximum value of brightness that is detected by the region brightness maximum value detection unit 11 when the average value of brightness that is detected by the full screen brightness average value detection unit 21 is a first value or higher.

Moreover, the region brightness determination unit 7 determines the emission brightness of the respective LEDs of the backlight unit 3 based on the minimum value of brightness that is detected by the region brightness minimum value detection unit 12 when the average value of brightness that is detected by the full screen brightness average value detection unit 21 is a second value, which is smaller than the first value, or less.

Moreover, the region brightness determination unit 7 determines the emission brightness of the respective LEDs of the backlight unit 3 based on the average value of brightness that is detected by the region brightness average value detection unit 13 when the average value of brightness that is detected by the full screen brightness average value detection unit 21 is smaller than the first value and greater than the second value.

Note that, in Embodiment 1, the display panel 1 corresponds to an example of the display panel, the backlight unit 3 corresponds to an example of the backlight unit, the region characteristic amount detection unit 6 corresponds to an example of the first detection unit, the full screen characteristic amount detection unit 5 corresponds to an example of the second detection unit, and the region brightness determination unit 7 and the backlight drive unit 4 correspond to an example of the drive unit.

The processing of the region brightness determination unit 7 for determining the brightness of the region to be processed based on the detection results of the full screen characteristic amount detection unit 5 and the region characteristic amount detection unit 6 is now explained with reference to FIG. 3.

Figure 3:
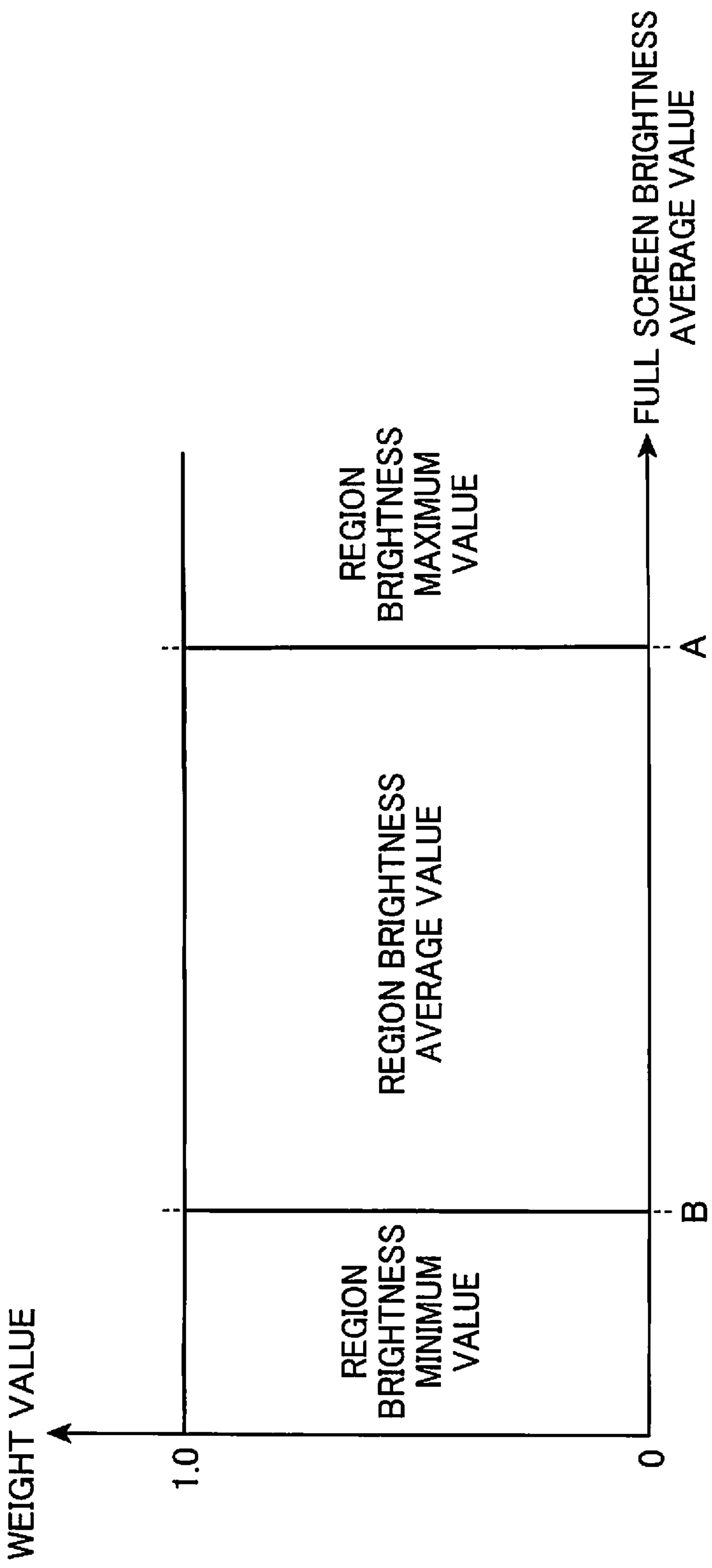
[FIG. 3]

FIG. 3 is a diagram explaining the processing of determining the region brightness to be performed by the region brightness determination unit 7 in Embodiment 1. In FIG. 3, the horizontal axis shows the average value of brightness in the full screen that is detected by the full screen characteristic amount detection unit 5, and the vertical axis shows the weight value that is multiplied to the maximum value of brightness of the image in the region, the average value of brightness of the image in the region, and the minimum value of brightness of the image in the region that were detected by the region characteristic amount detection unit 6.

As evident from FIG. 3, the region brightness determination unit 7 determines the emission brightness of the target LED of the backlight unit 3 based on the maximum value of brightness of the image in the region that is detected by the region brightness maximum value detection unit 11 when the average value of brightness of the image in the full screen that is detected by the full screen brightness average value detection unit 21 is a predetermined first value A or higher; that is, when the overall screen is a bright scene.

In other words, the region brightness determination unit 7 determines the emission brightness of the target LED of the backlight 3 to be a value obtained by multiplying the weight value of "1.0" to the maximum value of brightness of the image in the region that is detected by the region brightness maximum value detection unit 11 when the average value of brightness of the image in the full screen that is detected by the full screen brightness average value detection unit 21 is the first value A or higher. Accordingly, the region brightness determination unit 7 determines the emission brightness of the target LED of the backlight unit 3 to be the maximum value of brightness of the image in the region that is detected by the region brightness maximum value detection unit 11 when the average value of brightness of the image in the full screen that is detected by the full screen brightness average value detection unit 21 is the first value A or higher.

Meanwhile, the region brightness determination unit 7 determines the emission brightness of the target LED of the backlight unit 3 based on the minimum value of brightness of the image in the region that is detected by the region brightness minimum value detection unit 12 when the average value of brightness of the image in the full screen detected by the full screen brightness average value detection unit 21 is a predetermined second value B, which is smaller than the first value A, or less; that is, when the overall screen is a dark scene.

In other words, the region brightness determination unit 7 determines the emission brightness of the target LED of the backlight unit 3 to be a value obtained by multiplying the weight value of “1.0” to the minimum value of brightness of the image in the region that is detected by the region brightness minimum value detection unit 12 when the average value of brightness of the image in the full screen detected by the full screen brightness average value detection unit 21 is the second value B or less. Accordingly, the region brightness determination unit 7 determines the emission brightness of the target LED of the backlight unit 3 to be the minimum value of brightness of the image in the region that is detected by the region brightness minimum value detection unit 12 when the average value of brightness of the image in the full screen detected by the full screen brightness average value detection unit 21 is the second value B or less.

In addition, the region brightness determination unit 7 determines the emission brightness of the target LED of the backlight unit 3 based on the average value of brightness of the image in the region that is detected by the region brightness average value detection unit 13 when the average value of brightness of the image in the full screen that is detected by the full screen brightness average value detection unit 21 is smaller than the first value A and greater than the second value B; that is, when the overall screen is a neutral color.

In other words, the region brightness determination unit 7 determines the emission brightness of the target LED of the backlight unit 3 to be a value obtained by multiplying the weight value of “1.0” to the average value of brightness of the image in the region that is detected by the region brightness average value detection unit 13 when the average value of brightness of the image in the full screen that is detected by the full screen brightness average value detection unit 21 is smaller than the first value A and greater than the second value B. Accordingly, the region brightness determination unit 7 determines the emission brightness of the target LED of the backlight unit 3 to be the average value of brightness of the image in the region that is detected by the region brightness average value detection unit 13 when the average value of brightness of the image in the full screen that is detected by the full screen brightness average value detection unit 21 is smaller than the first value A and greater than the second value B.

Note that, in Embodiment 1 and the fourth modified example of Embodiment 1 described later, although the first value A is set to be a brightness value of ¾ of a possible range of the brightness value (for example, 256 gradations of 0 to 255), and the second value B is set to be a brightness value of ¼ of a possible range of the brightness value, the present invention is not limited thereto. For example, the first value A can be set to a brightness value of ⅔ of a possible range of the brightness value, and the second value B can be set to a brightness value of ⅓ of a possible range of the brightness value, and the first value A can be set to a brightness value of ⅗ of a possible range of the brightness value, and the second value B can be set to a brightness value of ⅖ of a possible range of the brightness value. The brightness value between the first value A and the second value B merely needs to a brightness value which represents a halftone.

As described above, it is possible to determine whether the video picture to be displayed on the display panel 1 is a bright video picture or a dark picture based on the characteristic amount in the full screen that is detected by the full screen characteristic amount detection unit 5. The region brightness determination unit 7 causes the respective LEDs of the backlight unit 3 to emit light at the maximum value of brightness of the image in the region to be processed when the overall screen is a bright video picture; that is when a peak brightness is required. It is thereby possible to resolve the problem of insufficient brightness.

Meanwhile, the region brightness determination unit 7 causes the respective LEDs of the backlight unit 3 to emit light at the minimum value of brightness of the image in the region to be processed when the overall screen is a dark picture; that is, when it is necessary to inhibit black floating. It is thereby possible to inhibit black floating.

Moreover, the region brightness determination unit 7 causes the respective LEDs of the backlight unit 3 to emit light at the average value of brightness of the image in the region to be processed when the overall screen is a video picture having a gray level brightness; that is, when it is necessary to balance black floating and peak brightness. It is thereby possible to display a well-balanced video picture.

Based on the foregoing processing, at least one type of characteristic amount is detected for each region, and how to use the detected characteristic amount to calculate the brightness of the backlight is determined according to the detection result of the characteristic amount of the image of the overall screen.

Specifically, it is possible to determine whether the video picture to be displayed is a bright video picture or a dark picture by using the average value of brightness as the characteristic amount of the image of the overall screen. When the video picture is dark, the inhibition of black floating is important. Thus, the brightness of the backlight of each region is determined based on the minimum value of brightness of the pixel in the region.

Meanwhile, when the video picture is bright, peak brightness is required. Thus, the brightness of the backlight of each region is determined based on the maximum value of brightness of the pixel in the region. Moreover, when the video picture has gray level brightness, it is necessary to balance black floating and peak brightness. Thus, the brightness of the backlight of each region is determined based on the average value of brightness of the pixel in the region.

Based on the foregoing processing, it is possible to inhibit the problems of black floating and insufficient brightness, and provide a video picture to the user that will not cause a visually unpleasant sensation.

Note that, in the foregoing explanation, although the average value of brightness is used as the characteristic amount of the image of the overall screen, the present invention is not limited thereto, and a variance value of brightness can also be used as the characteristic amount of the image of the overall screen.

The first modified example of Embodiment 1 which uses a variance value of brightness as the characteristic amount of the image of the overall screen is now explained.

Figure 4:
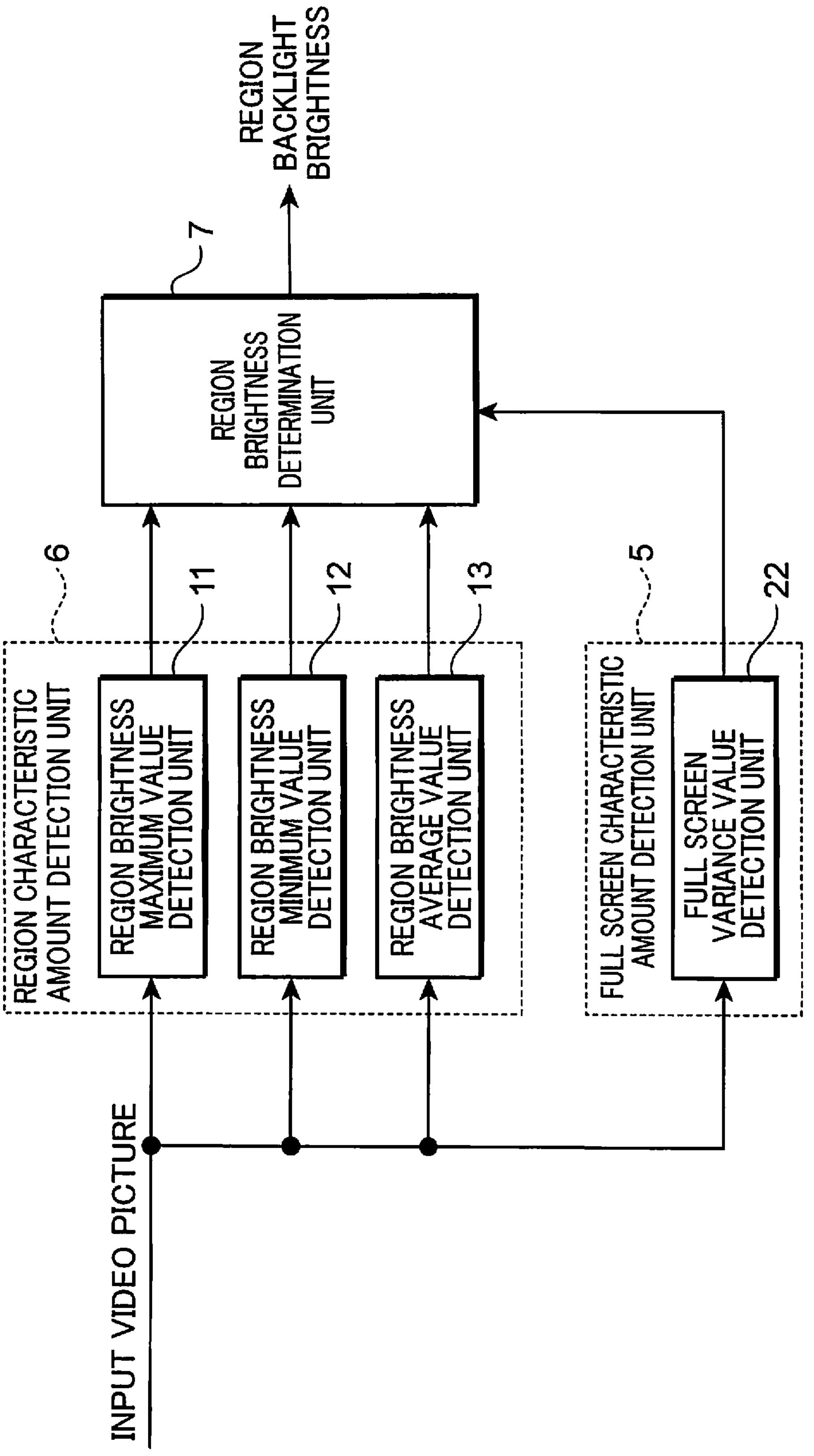
[FIG. 4]

FIG. 4 is a block diagram showing the configuration of the full screen characteristic amount detection unit and the region characteristic amount detection unit in the first modified example of Embodiment 1. Note that, in the first modified example of Embodiment 1, the configuration of the display device is the same as FIG. 1 and the explanation thereof is omitted.

As shown in FIG. 4, the region characteristic amount detection unit 6 in the first modified example of Embodiment 1 includes a region brightness maximum value detection unit 11 which detects the maximum value of brightness of the image in the region to be processed, a region brightness minimum value detection unit 12 which detects the minimum value of brightness of the image in the region to be processed, and a region brightness average value detection unit 13 which detects the average value of brightness of the image in the region to be processed. Moreover, as shown in FIG. 4, the full screen characteristic amount detection unit 5 in the first modified example of Embodiment 1 includes a frame memory (not shown) and a full screen variance value detection unit 22 which detects the variance value of brightness of the image in one screen.

Note that the variance value of brightness is the difference between a bright part and a dark part in a symmetrical region; that is, it is the so-called contrast.

As shown in FIG. 4, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 5.

Figure 5:
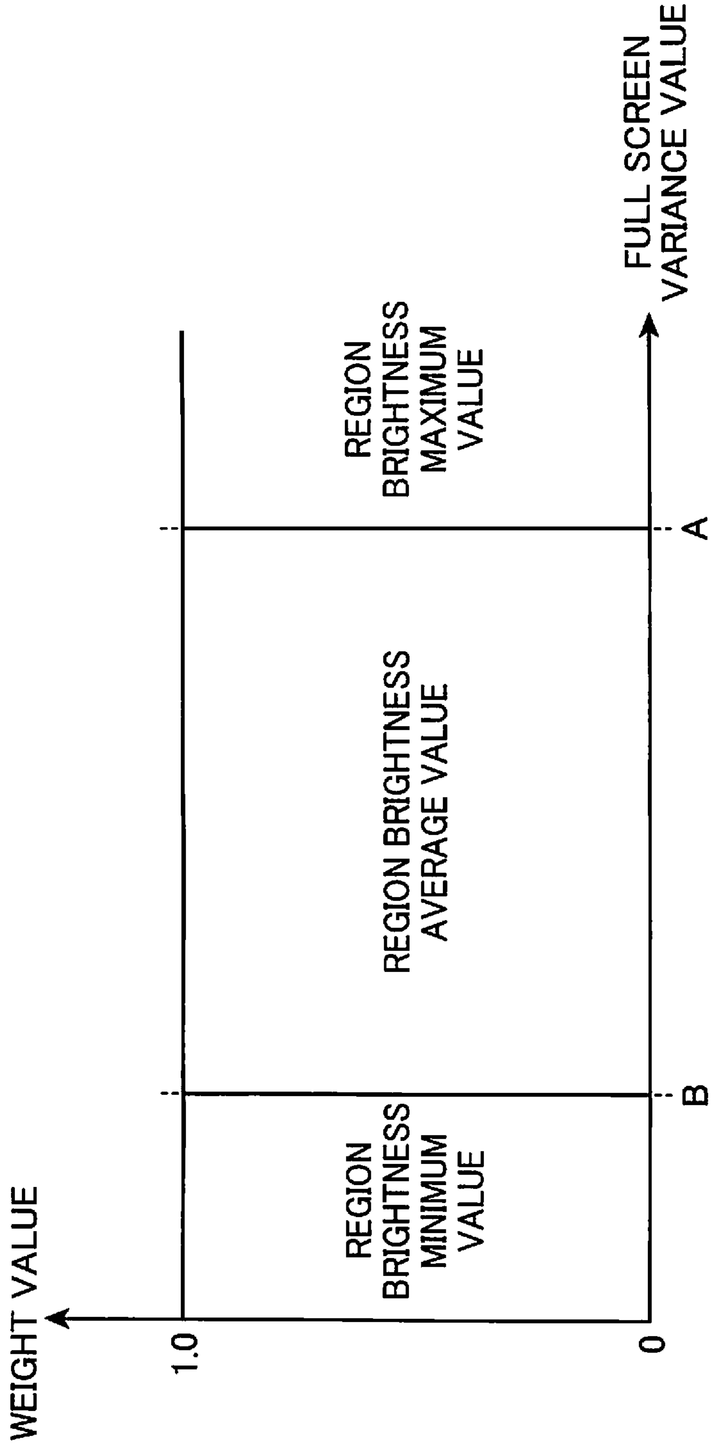
[FIG. 5]

FIG. 5 is a diagram explaining the processing of determining the region brightness to be performed by the region brightness determination unit 7 in the first modified example of Embodiment 1. In FIG. 5, the horizontal axis shows the variance value in the full screen that is detected by the full screen characteristic amount detection unit 5, and the vertical axis shows the weight value that is multiplied to the maximum value of brightness of the image in the region, the average value of brightness of the image in the region, and the minimum value of brightness of the image in the region that were detected by the region characteristic amount detection unit 6.

As evident from FIG. 5, the region brightness determination unit 7 determines the emission brightness of the LED to be the maximum value of brightness that is detected in the region when the variance value of brightness of the overall screen is a predetermined first value A or higher, determines the emission brightness of the LED to be the minimum value of brightness that is detected in the region when the variance value of brightness of the overall screen is a predetermined second value B, which is smaller than the first value A, or less, and determines the emission brightness of the LED to be the average value of brightness that is detected in the region when the variance value of brightness of the overall screen is smaller than the first value A and greater than the second value B.

In other words, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the variance value of brightness of the image in the full screen that is detected by the full screen variance value detection unit 22 is the first value A or higher. Accordingly, the region brightness determination unit 7 determines the emission brightness of the target LED of the backlight unit 3 to be the maximum value of brightness of the image in the region that is detected by the region brightness maximum value detection unit 11 when the variance value of brightness of the image in the full screen that is detected by the full screen variance value detection unit 22 is the first value A or higher.

Moreover, the region brightness determination unit 7 determines the emission brightness of the target LED of the backlight unit 3 to be a value obtained by multiplying the weight value of "1.0" to the minimum value of brightness of the image in the region that is detected by the region brightness minimum value detection unit 12 when the variance value of brightness of the image in the full screen that is detected by the full screen variance value detection unit 22 is the second value B, which is smaller than the first value A, or less. Accordingly, the region brightness determination unit 7 determines the emission brightness of the target LED of the backlight unit 3 to be the minimum value of brightness of the image in the region that is detected by the region brightness minimum value detection unit 12 when the variance value of brightness of the image in the full screen that is detected by the full screen variance value detection unit 22 is the second value B or less.

In addition, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the variance value of brightness of the image in the full screen that is detected by the full screen variance value detection unit 22 is smaller than the first value A and greater than the second value B. Accordingly, the region brightness determination unit 7 determines the emission brightness of the target LED of the backlight unit 3 to be the average value of brightness of the image in the region that is detected by the region brightness average value detection unit 13 when the variance value of brightness of the image in the full screen that is detected by the full screen variance value detection unit 22 is smaller than the first value A and greater than the second value B or less.

Note that, in the first modified example of Embodiment 1 and the fifth modified example of Embodiment 1 described later, although the first value A is set to be a variance value of ¾ of a possible range of the variance value, and the second value B is set to be a variance value of ¼ of a possible range of the variance value, the present invention is not limited thereto. For example, the first value A can be set to a variance value of ⅔ of a possible range of the variance value, and the second value B can be set to a variance value of ⅓ of a possible range of the variance value, and the first value A can be set to a variance value of ⅗ of a possible range of the variance value, and the second value B can be set to a variance value of ⅖ of a possible range of the variance value. The variance value between the first value A and the second value B merely needs to a variance value which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that, in the foregoing explanation, although the average value of brightness and the variance value of brightness are used as the characteristic amount of the image of the overall screen, the present invention is not limited thereto, and a specific frequency component (spatial frequency component) of the image can also be used as the characteristic amount of the image of the overall screen.

The second modified example of Embodiment 1 which uses a specific frequency component of the image as the characteristic amount of the image of the overall screen is now explained.

Figure 6:
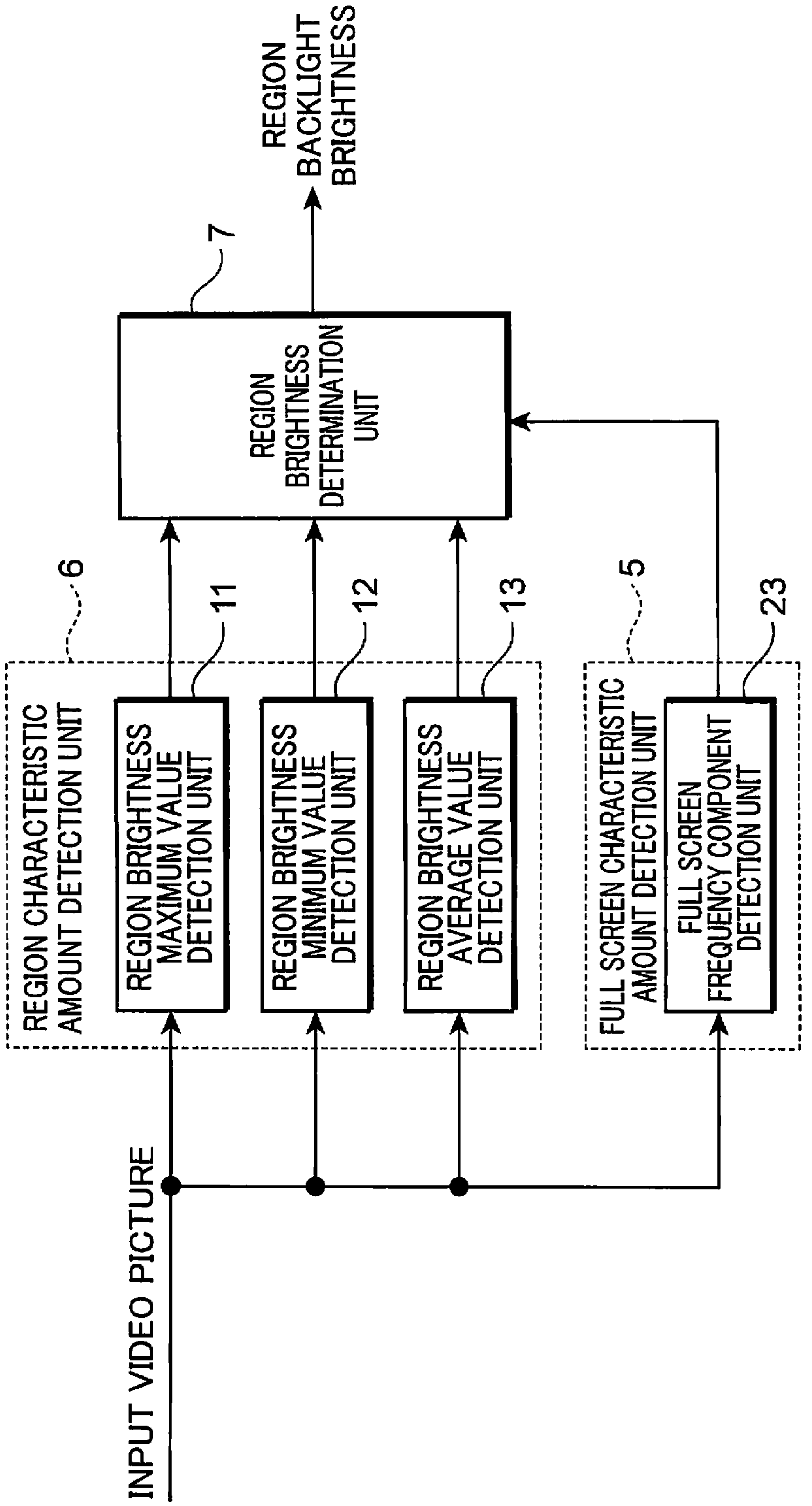
[FIG. 6]

FIG. 6 is a block diagram showing the configuration of the full screen characteristic amount detection unit and the region characteristic amount detection unit in the second modified example of Embodiment 1. Note that, in the second modified example of Embodiment 1, the configuration of the display device is the same as FIG. 1 and the explanation thereof is omitted.

As shown in FIG. 6, the region characteristic amount detection unit 6 in the second modified example of Embodiment 1 includes a region brightness maximum value detection unit 11 which detects the maximum value of brightness of the image in the region to be processed, a region brightness minimum value detection unit 12 which detects the minimum value of brightness of the image in the region to be processed, and a region brightness average value detection unit 13 which detects the average value of brightness of the image in the region to be processed. Moreover, as shown in FIG. 6, the full screen characteristic amount detection unit 5 in the second modified example of Embodiment 1 includes a frame memory (not shown) and a full screen frequency component detection unit 23 which detects the specific frequency component of the image in one screen.

Note that the specific frequency component is the low frequency component of the frequency spectrum, or the high frequency component of the frequency spectrum. The low frequency component of the frequency spectrum is a region containing information of a flat portion with minimal change of the image. Meanwhile, the high frequency component of the frequency spectrum is the region containing information of a portion with sudden change of the image; for example, a region such as the contoured portion.

As shown in FIG. 6, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 7.

Figure 7:
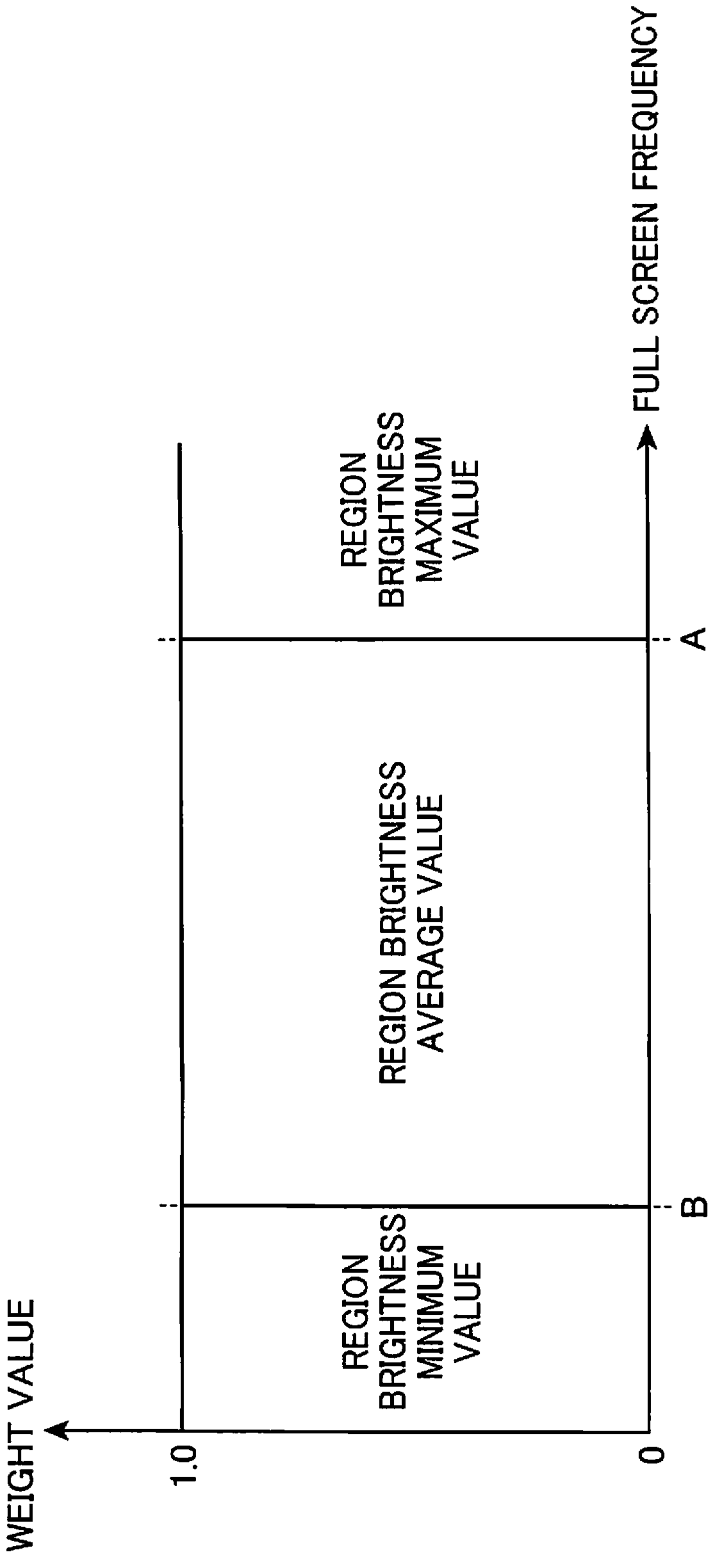
[FIG. 7]

FIG. 7 is a diagram explaining the processing of determining the region brightness to be performed by the region brightness determination unit 7 in the second modified example of Embodiment 1. In FIG. 7, the horizontal axis shows the specific frequency component in the full screen that is detected by the full screen characteristic amount detection unit 5, and the vertical axis shows the weight value that is multiplied to the maximum value of brightness of the image in the region, the average value of brightness of the image in the region, and the minimum value of brightness of the image in the region that were detected by the region characteristic amount detection unit 6.

As evident from FIG. 7, the region brightness determination unit 7 determines the emission brightness of the LED to be the maximum value of brightness that is detected in the region when the specific frequency component of the image of the overall screen is a predetermined first value A or higher, determines the emission brightness of the LED to be the minimum value of brightness that is detected in the region when the specific frequency component of the image of the overall screen is a predetermined second value B, which is smaller than the first value A, or less, and determines the emission brightness of the LED to be the average value of brightness that is detected in the region when the specific frequency component of the image of the overall screen is smaller than the first value A and greater than the second value B.

In other words, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the specific frequency component of the image in the full screen that is detected by the full screen frequency component detection unit 23 is the first value A or higher. Accordingly, the region brightness determination unit 7 determines the emission brightness of the target LED of the backlight unit 3 to be the maximum value of brightness of the image in the region that is detected by the region brightness maximum value detection unit 11 when the specific frequency component of the image in the full screen that is detected by the full screen frequency component detection unit 23 is the first value A or higher.

Moreover, the region brightness determination unit 7 determines the emission brightness of the target LED of the backlight unit 3 to be a value obtained by multiplying the weight value of "1.0" to the minimum value of brightness of the image in the region that is detected by the region brightness minimum value detection unit 12 when the specific frequency component of the image in the full screen that is detected by the full screen frequency component detection unit 23 is the second value B, which is smaller than the first value A, or less. Accordingly, the region brightness determination unit 7 determines the emission brightness of the target LED of the backlight unit 3 to be the minimum value of brightness of the image in the region that is detected by the region brightness minimum value detection unit 12 when the specific frequency component of the image in the full screen that is detected by the full screen frequency component detection unit 23 is the second value B or less.

In addition, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the specific frequency component of the image in the full screen that is detected by the full screen frequency component detection unit 23 is smaller than the first value A and greater than the second value B. Accordingly, the region brightness determination unit 7 determines the emission brightness of the target LED of the backlight unit 3 to be the average value of brightness of the image in the region that is detected by the region brightness average value detection unit 13 when the specific frequency component of the image in the full screen that is detected by the full screen frequency component detection unit 23 is smaller than the first value A and greater than the second value B or less.

Note that, in the second modified example of Embodiment 1 and the sixth modified example of Embodiment 1 described later, although the first value A is set to be a frequency component of ¾ of a possible range of the specific frequency component, and the second value B is set to be a frequency component of ¼ of a possible range of the specific frequency component, the present invention is not limited thereto. For example, the first value A can be set to a frequency component of ⅔ of a possible range of the specific frequency component, and the second value B can be set to a frequency component of ⅓ of a possible range of the specific frequency component, and the first value A can be set to a frequency component of ⅗ of a possible range of the specific frequency component, and the second value B can be set to a frequency component of ⅖ of a possible range of the specific frequency component. The specific frequency component between the first value A and the second value B merely needs to a frequency component which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that, in the foregoing explanation, although the average value of brightness, the variance value of brightness, and the specific frequency component are used as the characteristic amount of the image of the overall screen, the present invention is not limited thereto, and a color area of a specific color can also be used as the characteristic amount of the image of the overall screen.

The third modified example of Embodiment 1 which uses a color area of a specific color as the characteristic amount of the image of the overall screen is now explained.

Figure 8:
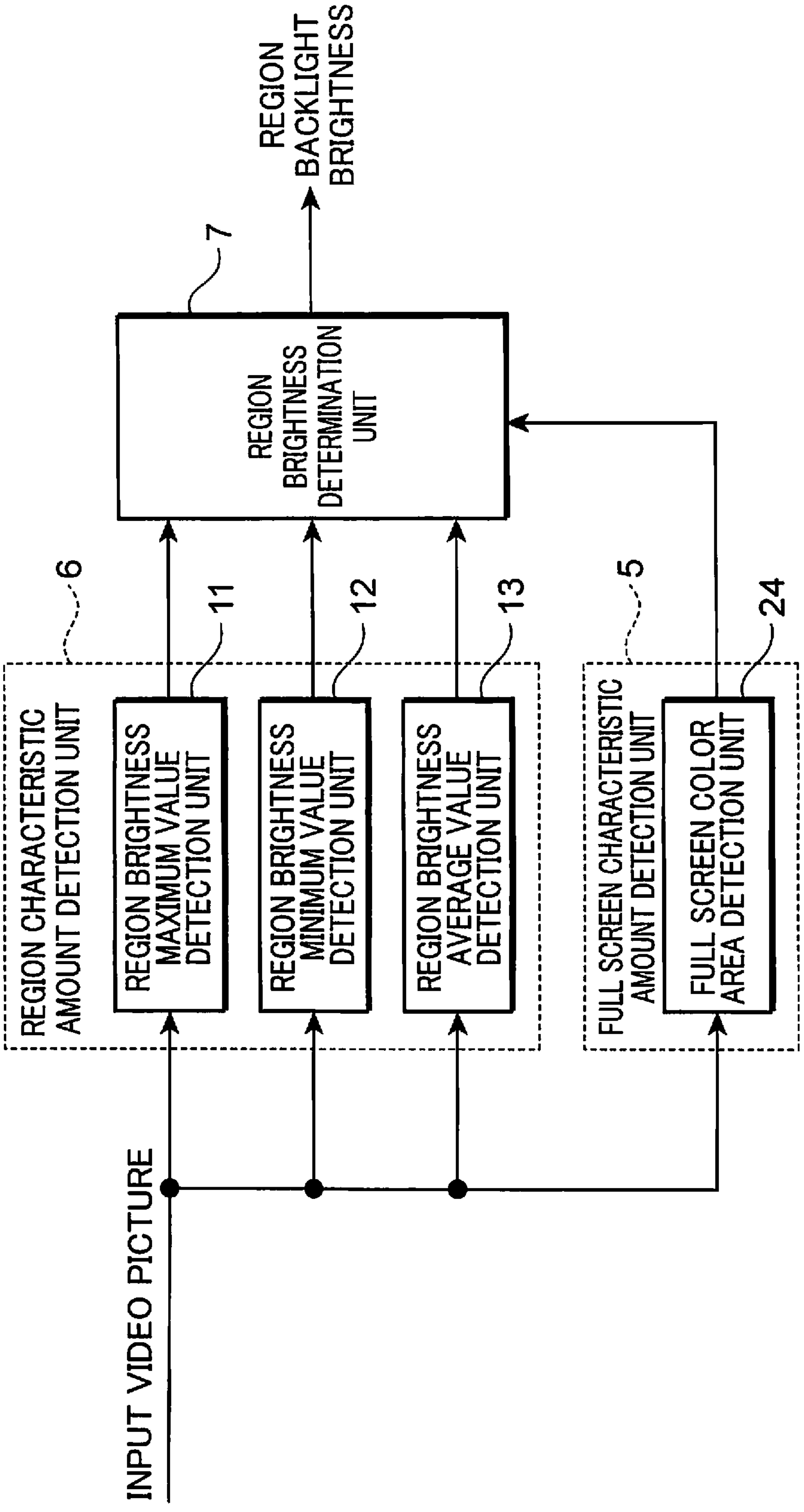
[FIG. 8]

FIG. 8 is a block diagram showing the configuration of the full screen characteristic amount detection unit and the region characteristic amount detection unit in the third modified example of Embodiment 1. Note that, in the third modified example of Embodiment 1, the configuration of the display device is the same as FIG. 1 and the explanation thereof is omitted.

As shown in FIG. 8, the region characteristic amount detection unit 6 in the third modified example of Embodiment 1 includes a region brightness maximum value detection unit 11 which detects the maximum value of brightness of the image in the region to be processed, a region brightness minimum value detection unit 12 which detects the minimum value of brightness of the image in the region to be processed, and a region brightness average value detection unit 13 which detects the average value of brightness of the image in the region to be processed. Moreover, as shown in FIG. 8, the full screen characteristic amount detection unit 5 in the second modified example of Embodiment 1 includes a frame memory (not shown) and a full screen color area detection unit 24 which detects the color area of a specific color of the image in one screen.

Note that the area of a specific color is the area of the pixels having a color of specific range. For example, upon focusing on a specific color such as black, white, red, yellow or green, this is the area occupied by that specific color among the overall region or the overall screen.

As shown in FIG. 8, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 9.

Figure 9:
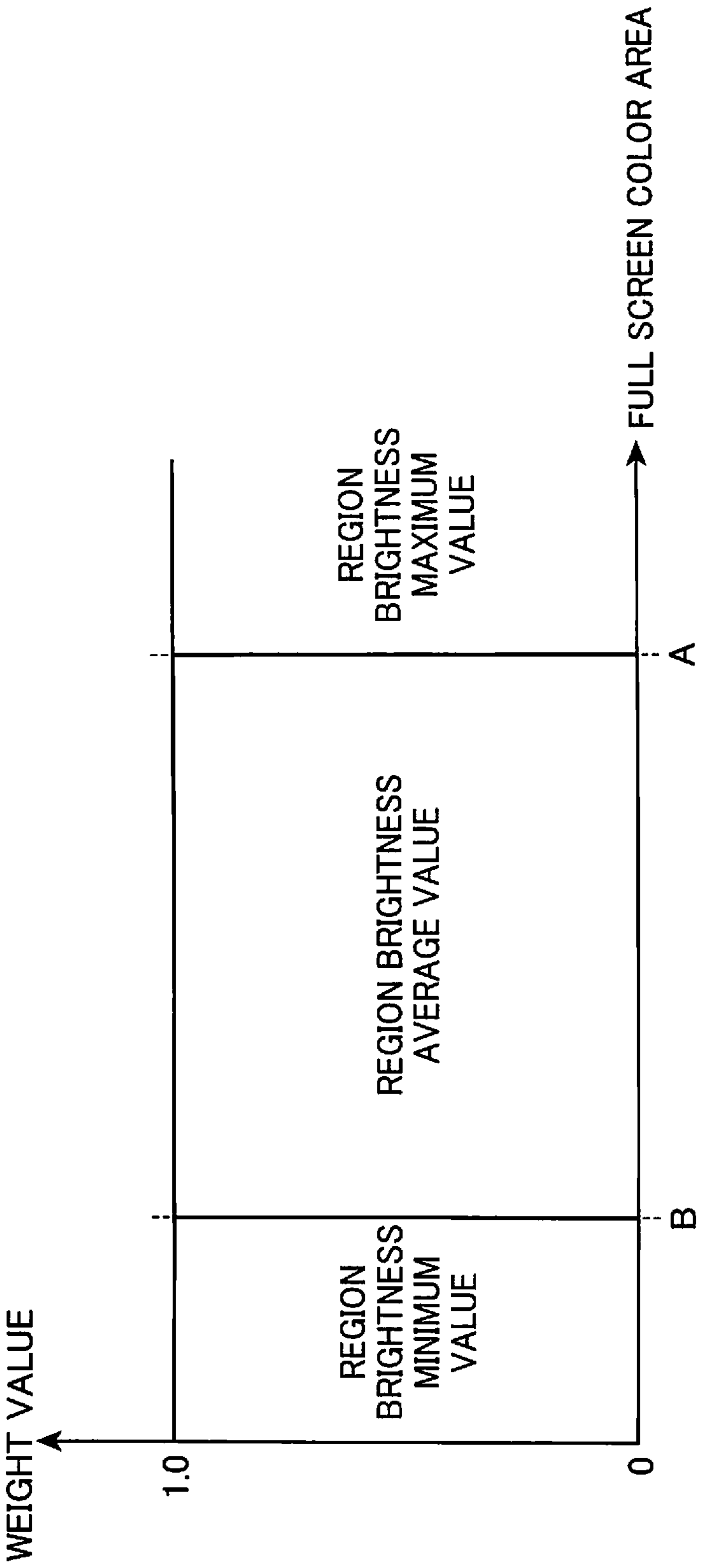
[FIG. 9]

FIG. 9 is a diagram explaining the processing of determining the region brightness to be performed by the region brightness determination unit 7 in the third modified example of Embodiment 1. In FIG. 9, the horizontal axis shows the color area of a specific color in the full screen that is detected by the full screen characteristic amount detection unit 5, and the vertical axis shows the weight value that is multiplied to the maximum value of brightness of the image in the region, the average value of brightness of the image in the region, and the minimum value of brightness of the image in the region that were detected by the region characteristic amount detection unit 6.

As evident from FIG. 9, the region brightness determination unit 7 determines the emission brightness of the LED to be the maximum value of brightness that is detected in the region when the color area of a specific color of the overall screen is a predetermined first value A or higher, determines the emission brightness of the LED to be the minimum value of brightness that is detected in the region when the color area of a specific color of the overall screen is a predetermined second value B, which is smaller than the first value A, or less, and determines the emission brightness of the LED to be the average value of brightness that is detected in the region when the color area of a specific color of the overall screen is smaller than the first value A and greater than the second value B. However, in the foregoing case, the specific color is, for example, white.

In other words, the region brightness determination unit 7 determines the emission brightness of the target LED of the backlight unit 3 to be a value obtained by multiplying the weight value of “1.0” to the maximum value of brightness of the image in the region that is detected by the region brightness maximum value detection unit 11 when the white color area in the full screen that is detected by the full screen color area detection unit 24 is the first value A or higher. Accordingly, the region brightness determination unit 7 determines the emission brightness of the target LED of the backlight unit 3 to be the maximum value of brightness of the image in the region that is detected by the region brightness maximum value detection unit 11 when the white color area in the full screen that is detected by the full screen color area detection unit 24 is the first value A or higher.

Moreover, the region brightness determination unit 7 determines the emission brightness of the target LED of the backlight unit 3 to be a value obtained by multiplying the weight value of “1.0” to the minimum value of brightness of the image in the region that is detected by the region brightness minimum value detection unit 12 when the white color area in the full screen that is detected by the full screen color area detection unit 24 is the second value B, which is smaller than the first value A, or less. Accordingly, the region brightness determination unit 7 determines the emission brightness of the target LED of the backlight unit 3 to be the minimum value of brightness of the image in the region that is detected by the region brightness minimum value detection unit 12 when the white color area in the full screen that is detected by the full screen color area detection unit 24 is the second value B or less.

In addition, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the white color area in the full screen that is detected by the full screen color area detection unit 24 is smaller than the first value A and greater than the second value B. Accordingly, the region brightness determination unit 7 determines the emission brightness of the target LED of the backlight unit 3 to be the average value of brightness of the image in the region that is detected by the region brightness average value detection unit 13 when the white color area in the full screen that is detected by the full screen color area detection unit 24 is smaller than the first value A and greater than the second value B or less.

Needless to say, when the specific color is black, the emission brightness of the LED will be the opposite value as the foregoing case when the specific color is white. Specifically, the region brightness determination unit 7 determines the emission brightness of the LED to be the minimum value of brightness that is detected in the region when the black color area of the overall screen is a predetermined first value A or higher, determines the emission brightness of the LED to be the maximum value of brightness that is detected in the region when the black color area of the overall screen is a predetermined second value B, which is smaller than the first value A, or less, and determines the emission brightness of the LED to be the average value of brightness that is detected in the region when the black color area of the overall screen is smaller than the first value A and greater than the second value B.

Moreover, in the third modified example of Embodiment 1 and the seventh modified example of Embodiment 1 described later, although the first value A is set to be a color area of ¾ of a possible range of the color area, and the second value B is set to be a color area of ¼ of a possible range of the color area, the present invention is not limited thereto. For example, the first value A can be set to a color area of ⅔ of a possible range of the color area, and the second value B can be set to a color area of ⅓ of a possible range of the color area, and the first value A can be set to a color area of ⅗ of a possible range of the color area, and the second value B can be set to a color area of ⅖ of a possible range of the color area. The color area between the first value A and the second value B merely needs to a color area which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

In the foregoing explanation, although the average value of brightness, the minimum value of brightness, and the average value of brightness are used as the characteristic amount of the image of each of the divided regions, the present invention is not limited thereto, and the maximum value of brightness, the average value of brightness, and the color area of a specific color can also be used as the characteristic amount of the image of each of the divided regions, and the average value of brightness can be used as the characteristic amount of the image of the overall screen.

The fourth modified example of Embodiment 1 which uses the maximum value of brightness, the average value of brightness, and the color area of a specific color as the characteristic amount of the image of the respective regions, and uses the average value of brightness as the characteristic amount of the image of the overall screen is now explained.

Figure 10:
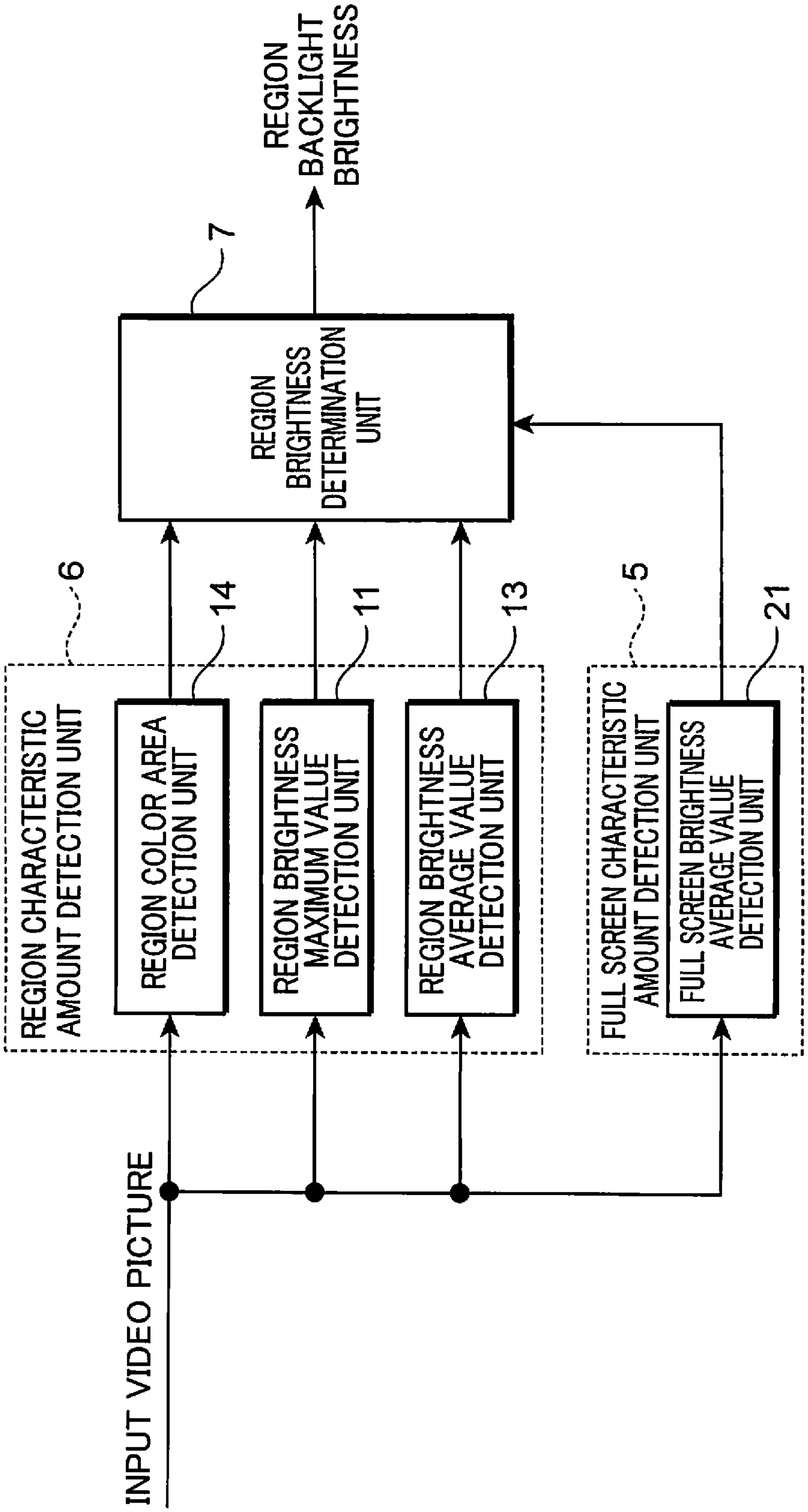
[FIG. 10]

FIG. 10 is a block diagram showing the configuration of the full screen characteristic amount detection unit and the region characteristic amount detection unit in the fourth modified example of Embodiment 1. Note that, in the fourth modified example of Embodiment 1, the configuration of the display device is the same as FIG. 1 and the explanation thereof is omitted.

As shown in FIG. 10, the region characteristic amount detection unit 6 in the fourth modified example of Embodiment 1 includes a region color area detection unit 14 which detects the color area of a specific color of the image in the region to be processed, a region brightness maximum value detection unit 11 which detects the maximum value of brightness of the image in the region to be processed, and a region brightness average value detection unit 13 which detects the average value of brightness of the image in the region to be processed. Moreover, as shown in FIG. 10, the full screen characteristic amount detection unit 5 in the fourth modified example of Embodiment 1 includes a frame memory (not shown) and a full screen brightness average value detection unit 21 which detects the average value of brightness of the image in one screen.

As shown in FIG. 10, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 11.

Figure 11:
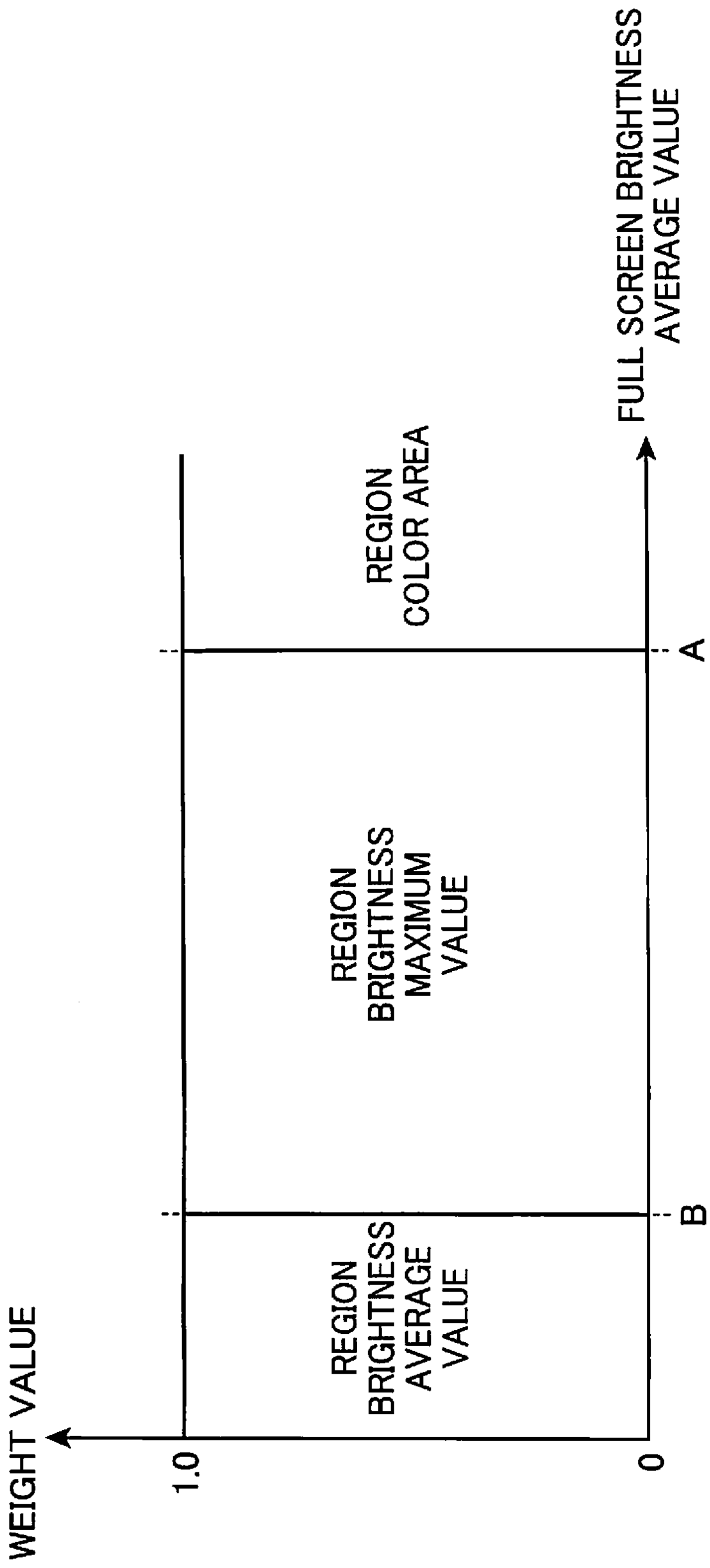
[FIG. 11]

FIG. 11 is a diagram explaining the processing of determining the region brightness to be performed by the region brightness determination unit 7 in the fourth modified example of Embodiment 1. In FIG. 11, the horizontal axis shows the average value of brightness in the full screen that is detected by the full screen characteristic amount detection unit 5, and the vertical axis shows the weight value that is multiplied to the brightness corresponding to the maximum value of brightness of the image in the region, the average value of brightness of the image in the region, and the color area of a specific color in the region that were detected by the region characteristic amount detection unit 6.

As evident from FIG. 11, the region brightness determination unit 7 determines the emission brightness of the LED to be the brightness corresponding to the color area of a specific color that is detected in the region when the average value of brightness of the overall screen is a predetermined first value A or higher, determines the emission brightness of the LED to be the average value of brightness that is detected in the region when the average value of brightness of the overall screen is a predetermined second value B, which is smaller than the first value A, or less, and determines the emission brightness of the LED to be the maximum value of brightness that is detected in the region when the average volume of brightness of the overall screen is smaller than the first value A and greater than the second value B. However, in the foregoing case, the specific color is, for example, white.

In other words, the region brightness determination unit 7 determines the emission brightness of the target LED of the backlight unit 3 to be a value obtained by multiplying the weight value of "1.0" to the brightness corresponding to the white color area in the region that is detected by the region color area detection unit 14 when the average value of brightness in the full screen that is detected by the full screen brightness average value detection unit 21 is the first value A or higher. Accordingly, the region brightness determination unit 7 determines the emission brightness of the target LED of the backlight unit 3 to be the brightness corresponding to the white color area of the image in the region that is detected by the region color area detection unit 14 when the average value of brightness in the full screen that is detected by the full screen brightness average value detection unit 21 is the first value A or higher.

Moreover, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the average value of brightness in the full screen that is detected by the full screen brightness average value detection unit 21 is the second value B, which is smaller than the first value A, or less. Accordingly, the region brightness determination unit 7 determines the emission brightness of the target LED of the backlight unit 3 to be the average value of brightness of the image in the region that is detected by the region brightness average value detection unit 13 when the average value of brightness in the full screen that is detected by the full screen brightness average value detection unit 21 is the second value B or less.

In addition, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the average value of brightness in the full screen that is detected by the full screen brightness average value detection unit 21 is smaller than the first value A and greater than the second value B. Accordingly, the region brightness determination unit 7 determines the emission brightness of the target LED of the backlight unit 3 to be the maximum value of brightness of the image in the region that is detected by the region brightness maximum value detection unit 11 when the average value of brightness in the full screen that is detected by the full screen brightness average value detection unit 21 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the variance value of brightness can be used as the characteristic amount of the image of the overall screen.

The fifth modified example of Embodiment 1 which uses the maximum value of brightness, the average value of brightness, and the color area of a specific color as the characteristic amount of the image of the respective regions, and uses the variance value of brightness as the characteristic amount of the image of the overall screen is now explained.

Figure 12:
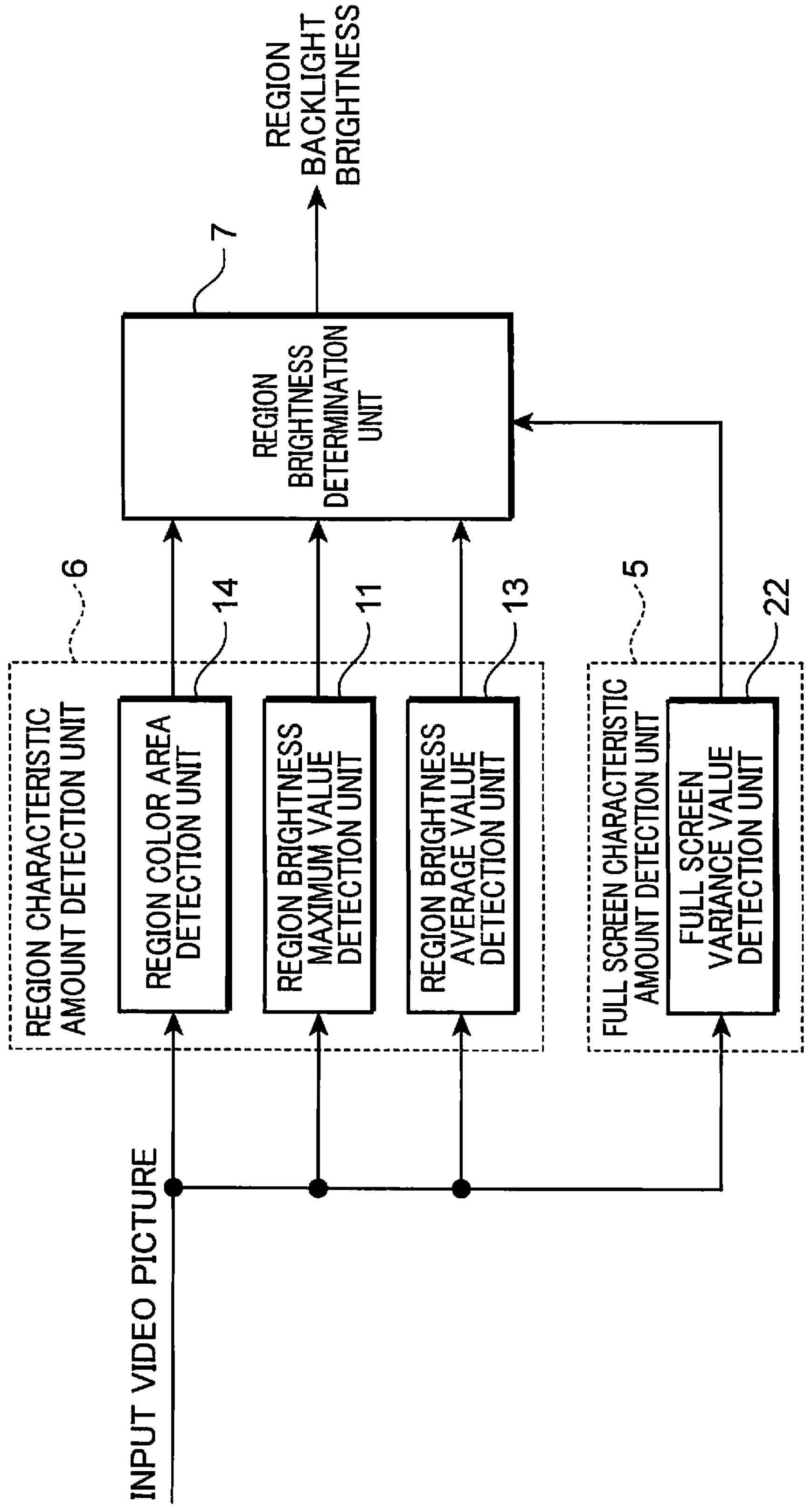
[FIG. 12]

FIG. 12 is a block diagram showing the configuration of the full screen characteristic amount detection unit and the region characteristic amount detection unit in the fifth modified example of Embodiment 1. Note that, in the fifth modified example of Embodiment 1, the configuration of the display device is the same as FIG. 1 and the explanation thereof is omitted.

As shown in FIG. 12, the region characteristic amount detection unit 6 in the fifth modified example of Embodiment 1 includes a region color area detection unit 14 which detects the color area of a specific color of the image in the region to be processed, a region brightness maximum value detection unit 11 which detects the maximum value of brightness of the image in the region to be processed, and a region brightness average value detection unit 13 which detects the average value of brightness of the image in the region to be processed. Moreover, as shown in FIG. 12, the full screen characteristic amount detection unit 5 in the fifth modified example of Embodiment 1 includes a frame memory (not shown) and a full screen variance value detection unit 22 which detects the variance value of brightness of the image in one screen.

As shown in FIG. 12, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 13.

Figure 13:
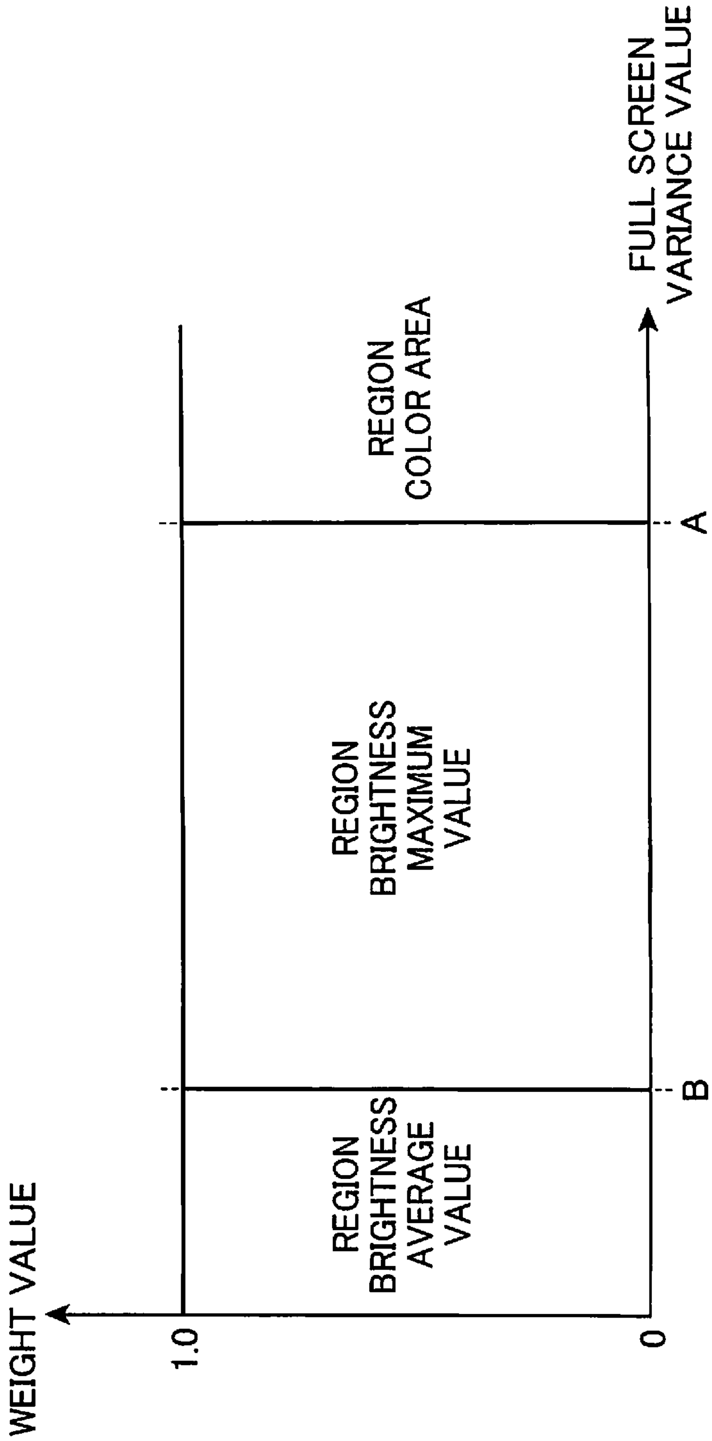
[FIG. 13]

FIG. 13 is a diagram explaining the processing of determining the region brightness to be performed by the region brightness determination unit 7 in the fifth modified example of Embodiment 1. In FIG. 13, the horizontal axis shows the variance value of brightness in the full screen that is detected by the full screen characteristic amount detection unit 5, and the vertical axis shows the weight value that is multiplied to the brightness corresponding to the maximum value of brightness of the image in the region, the average value of brightness of the image in the region, and the color area of a specific color in the region that were detected by the region characteristic amount detection unit 6.

As evident from FIG. 13, the region brightness determination unit 7 determines the emission brightness of the LED to be the brightness corresponding to the color area of a specific color that is detected in the region when the variance value of brightness of the overall screen is a predetermined first value A or higher, determines the emission brightness of the LED to be the average value of brightness that is detected in the region when the variance value of brightness of the overall screen is a predetermined second value B, which is smaller than the first value A, or less, and determines the emission brightness of the LED to be the maximum value of brightness that is detected in the region when the variance value of brightness of the overall screen is smaller than the first value A and greater than the second value B. However, in the foregoing case, the specific color is, for example, white.

In other words, the region brightness determination unit 7 determines the emission brightness of the target LED of the backlight unit 3 to be a value obtained by multiplying the weight value of "1.0" to the brightness corresponding to the white color area in the region that is detected by the region color area detection unit 14 when the variance value of brightness in the full screen that is detected by the full screen variance value detection unit 22 is the first value A or higher. Accordingly, the region brightness determination unit 7 determines the emission brightness of the target LED of the backlight unit 3 to be the brightness corresponding to the white color area of the image in the region that is detected by the region color area detection unit 14 when the variance value of brightness in the full screen that is detected by the full screen variance value detection unit 22 is the first value A or higher.

Moreover, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the variance value of brightness in the full screen that is detected by the full screen variance value detection unit 22 is the second value B, which is smaller than the first value A, or less. Accordingly, the region brightness determination unit 7 determines the emission brightness of the target LED of the backlight unit 3 to be the average value of brightness of the image in the region that is detected by the region brightness average value detection unit 13 when the variance value of brightness in the full screen that is detected by the full screen variance value detection unit 22 is the second value B or less.

In addition, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the variance value of brightness in the full screen that is detected by the full screen variance value detection unit 22 is smaller than the first value A and greater than the second value B. Accordingly, the region brightness determination unit 7 determines the emission brightness of the target LED of the backlight unit 3 to be the maximum value of brightness of the image in the region that is detected by the region brightness maximum value detection unit 11 when the variance value of brightness in the full screen that is detected by the full screen variance value detection unit 22 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the specific frequency component can be used as the characteristic amount of the image of the overall screen.

The sixth modified example of Embodiment 1 which uses the maximum value of brightness, the average value of brightness, and the color area of a specific color as the characteristic amount of the image of the respective regions, and uses the specific frequency component as the characteristic amount of the image of the overall screen is now explained.

Figure 14:
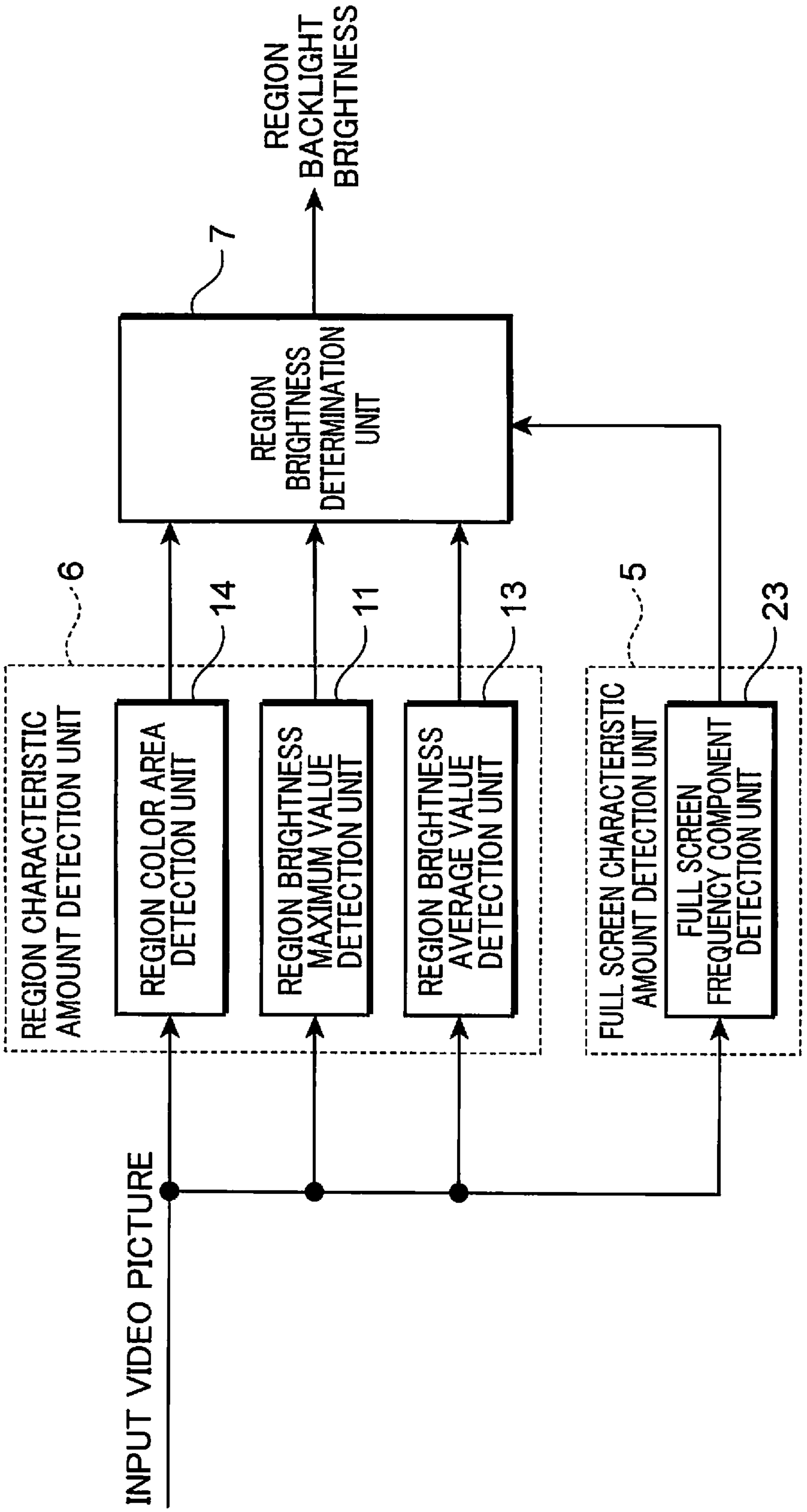
[FIG. 14]

FIG. 14 is a block diagram showing the configuration of the full screen characteristic amount detection unit and the region characteristic amount detection unit in the sixth modified example of Embodiment 1. Note that, in the sixth modified example of Embodiment 1, the configuration of the display device is the same as FIG. 1 and the explanation thereof is omitted.

As shown in FIG. 14, the region characteristic amount detection unit 6 in the sixth modified example of Embodiment 1 includes a region color area detection unit 14 which detects the color area of a specific color of the image in the region to be processed, a region brightness maximum value detection unit 11 which detects the maximum value of brightness of the image in the region to be processed, and a region brightness average value detection unit 13 which detects the average value of brightness of the image in the region to be processed. Moreover, as shown in FIG. 14, the full screen characteristic amount detection unit 5 in the sixth modified example of Embodiment 1 includes a frame memory (not shown) and a full screen frequency component detection unit 23 which detects the specific frequency component of the image in one screen.

As shown in FIG. 14, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 15.

Figure 15:
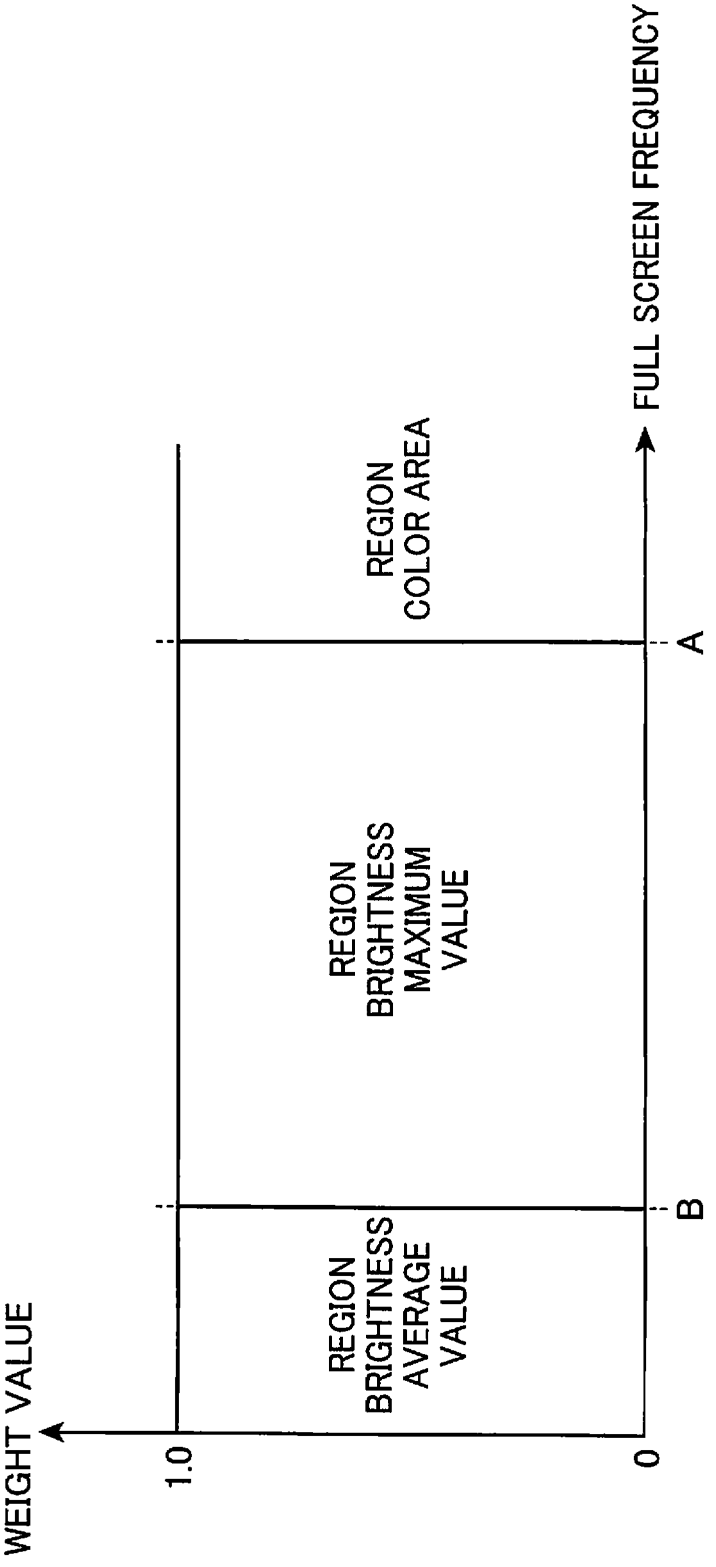
[FIG. 15]

FIG. 15 is a diagram explaining the processing of determining the region brightness to be performed by the region brightness determination unit 7 in the sixth modified example of Embodiment 1. In FIG. 15, the horizontal axis shows the specific frequency component of the image in the full screen that is detected by the full screen characteristic amount detection unit 5, and the vertical axis shows the weight value that is multiplied to the brightness corresponding to the maximum value of brightness of the image in the region, the average value of brightness of the image in the region, and the color area of a specific color in the region that were detected by the region characteristic amount detection unit 6.

As evident from FIG. 15, the region brightness determination unit 7 determines the emission brightness of the LED to be the brightness corresponding to the color area of a specific color that is detected in the region when the specific frequency component of the image of the overall screen is a predetermined first value A or higher, determines the emission brightness of the LED to be the average value of brightness that is detected in the region when the specific frequency component of the image of the overall screen is a predetermined second value B, which is smaller than the first value A, or less, and determines the emission brightness of the LED to be the maximum value of brightness that is detected in the region when the specific frequency component of the image of the overall screen is smaller than the first value A and greater than the second value B. However, in the foregoing case, the specific color is, for example, white.

In other words, the region brightness determination unit 7 determines the emission brightness of the target LED of the backlight unit 3 to be a value obtained by multiplying the weight value of "1.0" to the brightness corresponding to the white color area in the region that is detected by the region color area detection unit 14 when the specific frequency component of the image in the full screen that is detected by the full screen frequency component detection unit 23 is the first value A or higher. Accordingly, the region brightness determination unit 7 determines the emission brightness of the target LED of the backlight unit 3 to be the brightness corresponding to the white color area of the image in the region that is detected by the region color area detection unit 14 when the specific frequency component of the image in the full screen that is detected by the full screen frequency component detection unit 23 is the first value A or higher.

Moreover, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the specific frequency component of the image in the full screen that is detected by the full screen frequency component detection unit 23 is the second value B, which is smaller than the first value A, or less. Accordingly, the region brightness determination unit 7 determines the emission brightness of the target LED of the backlight unit 3 to be the average value of brightness of the image in the region that is detected by the region brightness average value detection unit 13 when the specific frequency component of the image in the full screen that is detected by the full screen frequency component detection unit 23 is the second value B or less.

In addition, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the specific frequency component of the image in the full screen that is detected by the full screen frequency component detection unit 23 is smaller than the first value A and greater than the second value B. Accordingly, the region brightness determination unit 7 determines the emission brightness of the target LED of the backlight unit 3 to be the maximum value of brightness of the image in the region that is detected by the region brightness maximum value detection unit 11 when the specific frequency component of the image in the full screen that is detected by the full screen frequency component detection unit 23 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the color area of a specific color can be used as the characteristic amount of the image of the overall screen.

The seventh modified example of Embodiment 1 which uses the maximum value of brightness, the average value of brightness, and the color area of a specific color as the characteristic amount of the image of the respective regions, and uses the color area of a specific color as the characteristic amount of the image of the overall screen is now explained.

Figure 16:
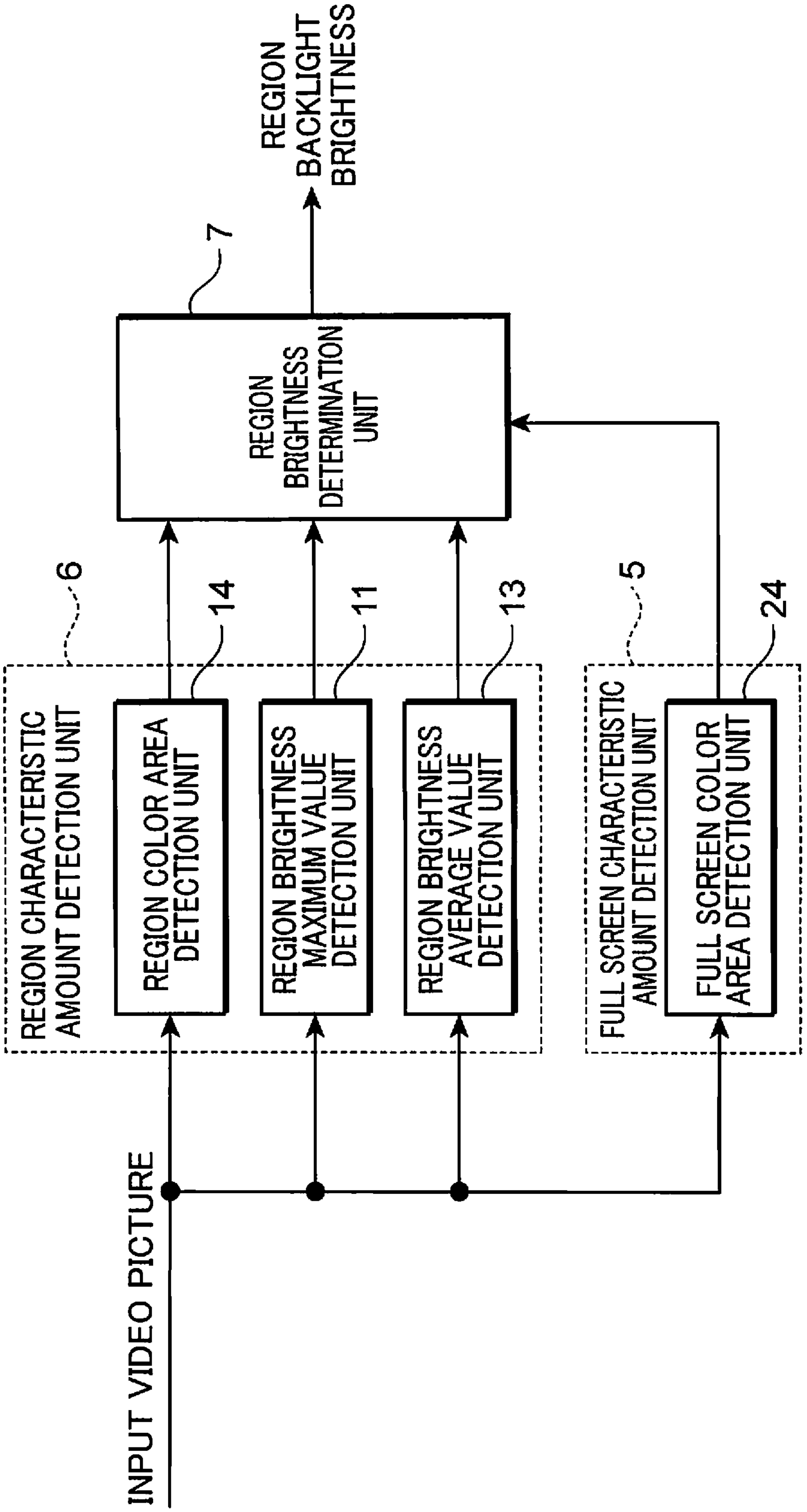
[FIG. 16]

FIG. 16 is a block diagram showing the configuration of the full screen characteristic amount detection unit and the region characteristic amount detection unit in the seventh modified example of Embodiment 1. Note that, in the seventh modified example of Embodiment 1, the configuration of the display device is the same as FIG. 1 and the explanation thereof is omitted.

As shown in FIG. 16, the region characteristic amount detection unit 6 in the seventh modified example of Embodiment 1 includes a region color area detection unit 14 which detects the color area of a specific color of the image in the region to be processed, a region brightness maximum value detection unit 11 which detects the maximum value of brightness of the image in the region to be processed, and a region brightness average value detection unit 13 which detects the average value of brightness of the image in the region to be processed. Moreover, as shown in FIG. 16, the full screen characteristic amount detection unit 5 in the seventh modified example of Embodiment 1 includes a frame memory (not shown) and a full screen color area detection unit 24 which detects the color area of a specific color of the image in one screen.

As shown in FIG. 16, the detection results of the full screen characteristic amount detection unit 5 and the region characteristic amount detection unit 6 are input to the region brightness determination unit 7. The region brightness determination unit 7 determines the emission brightness of the LED of the backlight unit 3 corresponding to the target segmented region based on the detection results of the full screen characteristic amount detection unit 5 and the region characteristic amount detection unit 6.

The processing of the region brightness determination unit 7 for determining the brightness of the region to be processed based on the detection results of the full screen characteristic amount detection unit 5 and the region characteristic amount detection unit 6 is now explained with reference to FIG. 17.

Figure 17:
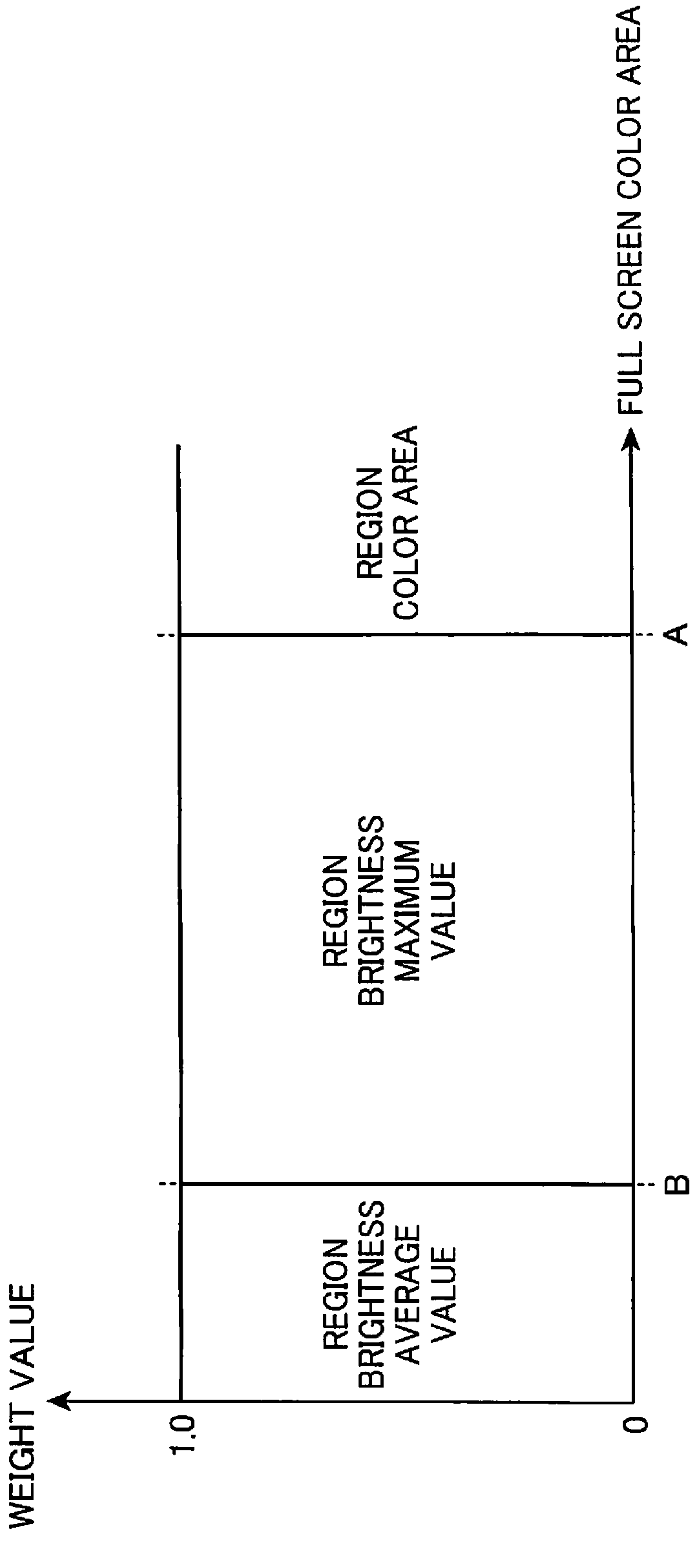
[FIG. 17]

FIG. 17 is a diagram explaining the processing of determining the region brightness to be performed by the region brightness determination unit 7 in the seventh modified example of Embodiment 1. In FIG. 17, the horizontal axis shows the color area of a specific color of the image in the full screen that is detected by the full screen characteristic amount detection unit 5, and the vertical axis shows the weight value that is multiplied to the brightness corresponding to the maximum value of brightness of the image in the region, the average value of brightness of the image in the region, and the color area of a specific color in the region that were detected by the region characteristic amount detection unit 6.

As evident from FIG. 17, the region brightness determination unit 7 determines the emission brightness of the LED to be the brightness corresponding to the color area of a specific color that is detected in the region when the color area of a specific color of the overall screen is a predetermined first value A or higher, determines the emission brightness of the LED to be the average value of brightness that is detected in the region when the color area of a specific color of the overall screen is a predetermined second value B, which is smaller than the first value A, or less, and determines the emission brightness of the LED to be the maximum value of brightness that is detected in the region when the color area of a specific color of the overall screen is smaller than the first value A and greater than the second value B. However, in the foregoing case, the specific color upon detecting the color area of the overall screen and the specific color upon detecting the color area in the region are both, for example, white.

In other words, the region brightness determination unit 7 determines the emission brightness of the target LED of the backlight unit 3 to be a value obtained by multiplying the weight value of "1.0" to the brightness corresponding to the white color area in the region that is detected by the region color area detection unit 14 when the white color area in the full screen that is detected by the full screen color area detection unit 24 is the first value A or higher. Accordingly, the region brightness determination unit 7 determines the emission brightness of the target LED of the backlight unit 3 to be the brightness corresponding to the white color area of the image in the region that is detected by the region color area detection unit 14 when the white color area in the full screen that is detected by the full screen color area detection unit 24 is the first value A or higher.

Moreover, the region brightness determination unit 7 determines the emission brightness of the target LED of the backlight unit 3 to be a value obtained by multiplying the weight value of "1.0" to the average value of brightness of the image in the region that is detected by the region brightness average value detection unit 13 when the white color area in the full screen that is detected by the full screen color area detection unit 24 is the second value B, which is smaller than the first value A, or less. Accordingly, the region brightness determination unit 7 determines the emission brightness of the target LED of the backlight unit 3 to be the average value of brightness of the image in the region that is detected by the region brightness average value detection unit 13 when the white color area in the full screen that is detected by the full screen color area detection unit 24 is the second value B or less.

In addition, the region brightness determination unit 7 determines the emission brightness of the target LED of the backlight unit 3 to be a value obtained by multiplying the weight value of "1.0" to the maximum value of brightness of the image in the region that is detected by the region brightness maximum value detection unit 11 when the white color area in the full screen that is detected by the full screen color area detection unit 24 is smaller than the first value A and greater than the second value B. Accordingly, the region brightness determination unit 7 determines the emission brightness of the target LED of the backlight unit 3 to be the maximum value of brightness of the image in the region that is detected by the region brightness maximum value detection unit 11 when the white color area in the full screen that is detected by the full screen color area detection unit 24 is smaller than the first value A and greater than the second value B.

Needless to say, when the specific color upon detecting the color area of the overall screen is black, the emission brightness of the LED will be the opposite value as the foregoing case when the specific color upon detecting the color area of the overall screen is white. Specifically, the region brightness determination unit 7 determines the emission brightness of the LED to be the average value of brightness that is detected in the region when the black color area of the overall screen is a predetermined first value A or higher, determines the emission brightness of the LED to be the brightness corresponding to the white color area that is detected in the region when the black color area of the overall screen is a predetermined second value B, which is smaller than the first value A, or less, and determines the emission brightness of the LED to be the maximum value of brightness that is detected in the region when the black color area of the overall screen is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

As described above, both the full screen characteristic amount detection unit 5 and the region characteristic amount detection unit 6 can detect various parameters. Moreover, the full screen characteristic amount detection unit 5 and the region characteristic amount detection unit 6 can also combine a plurality of parameters.

In other words, the region characteristic amount detection unit 6 can detect the average value of brightness of the image of each of the divided regions, the maximum value of brightness of the image of each of the divided regions, the minimum value of brightness of the image of each of the divided regions, the low frequency component detection value (magnitude of low frequency component of frequency spectrum) of the image of each of the divided regions, the high frequency component detection value (magnitude of high frequency component of frequency spectrum) of the image of each of the divided regions, the dynamic range (difference between maximum value and minimum value of brightness) of the image of each of the divided regions, the average value of the maximum value and minimum value of brightness of the image of each of the divided regions, the area of a specific color of the image of each of the divided regions, and the variance value (value showing distribution of histogram) of brightness of the image of each of the divided regions.

Moreover, the full screen characteristic amount detection unit 5 can detect the average value of brightness of the image of the overall display panel, the maximum value of brightness of the image of the overall display panel, the minimum value of brightness of the image of the overall display panel, the low frequency component detection value (magnitude of low frequency component of frequency spectrum) of the image of the overall display panel, the high frequency component detection value (magnitude of high frequency component of frequency spectrum) of the image of the overall display panel, the dynamic range (difference between maximum value and minimum value of brightness) of the image of the overall display panel, the average value of the maximum value and minimum value of brightness of the image of the overall display panel, the area of a specific color of the image of the overall display panel, and the variance value (value showing distribution of histogram) of brightness of the image of the overall display panel.

Note that the region color area detection unit 14 and the full screen color area detection unit 24 can also perform weighting according to the position inside the region or the overall screen upon calculating the color area of a specific color, and use a total value of the weighted value as the area.

In Embodiment 1, these parameters can be freely combined so that the full screen characteristic amount detection unit 5 and the region characteristic amount detection unit 6 can detect various characteristic amounts of the full screen and in the region.

(Embodiment 2)

The display device of Embodiment 2 according to the present invention is now explained. The difference with the display device of Embodiment 1 is that the display device further comprises a weight value storing unit which stores a predetermined weight value that changes according to the brightness, and that the region brightness determination unit 7 determines the emission brightness of the respective LEDs of the backlight unit 3 by multiplying the weight value stored in the weight value storing unit by a value that is detected by the region characteristic amount detection unit 6. Consequently, it is possible to set the emission brightness in further detail, inhibit the problem of black floating and insufficient brightness better than the processing method of Embodiment 1, and thereby provide a video picture to the user that will not cause a visually unpleasant sensation.

Figure 18:
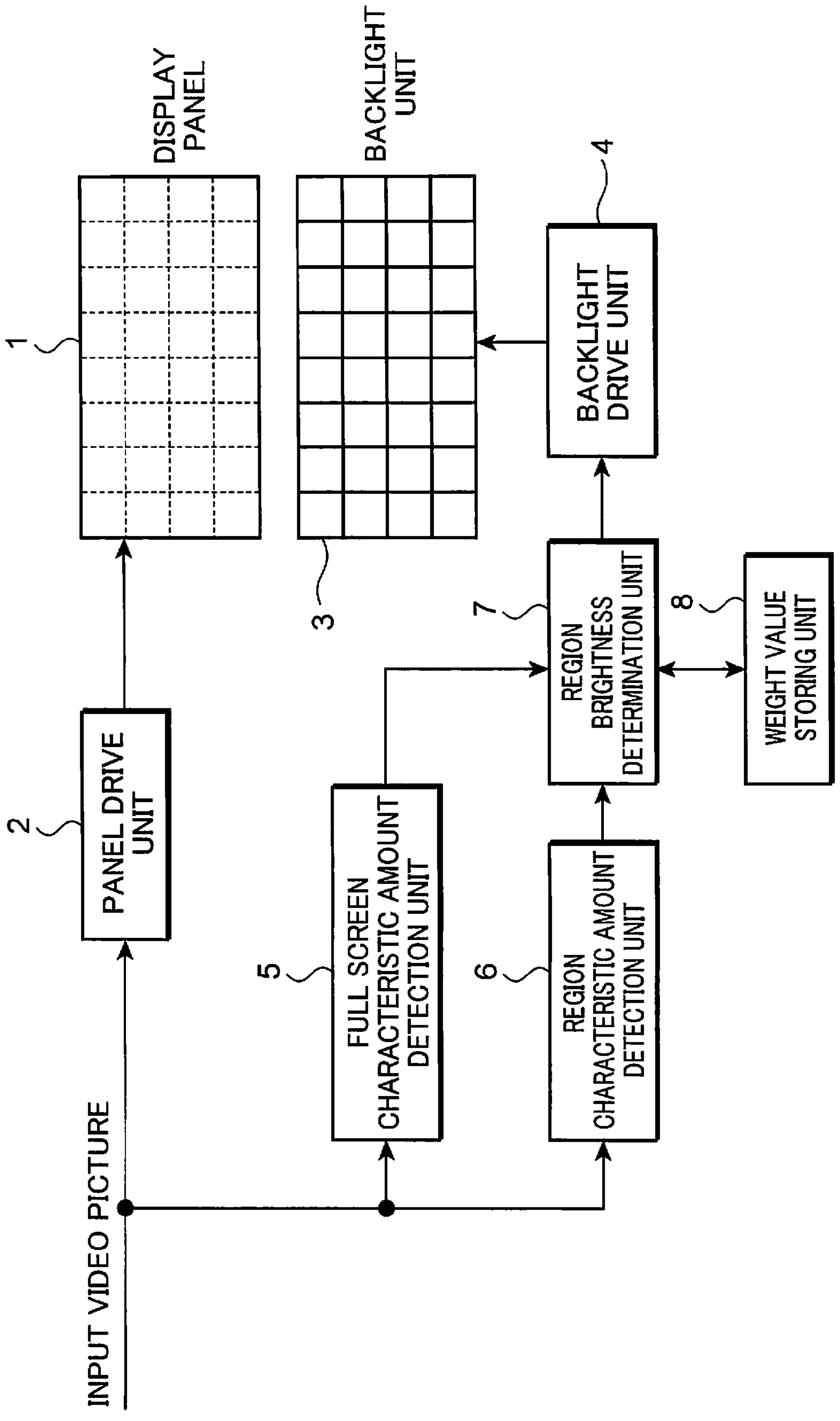
[FIG. 18]
Figure 19:
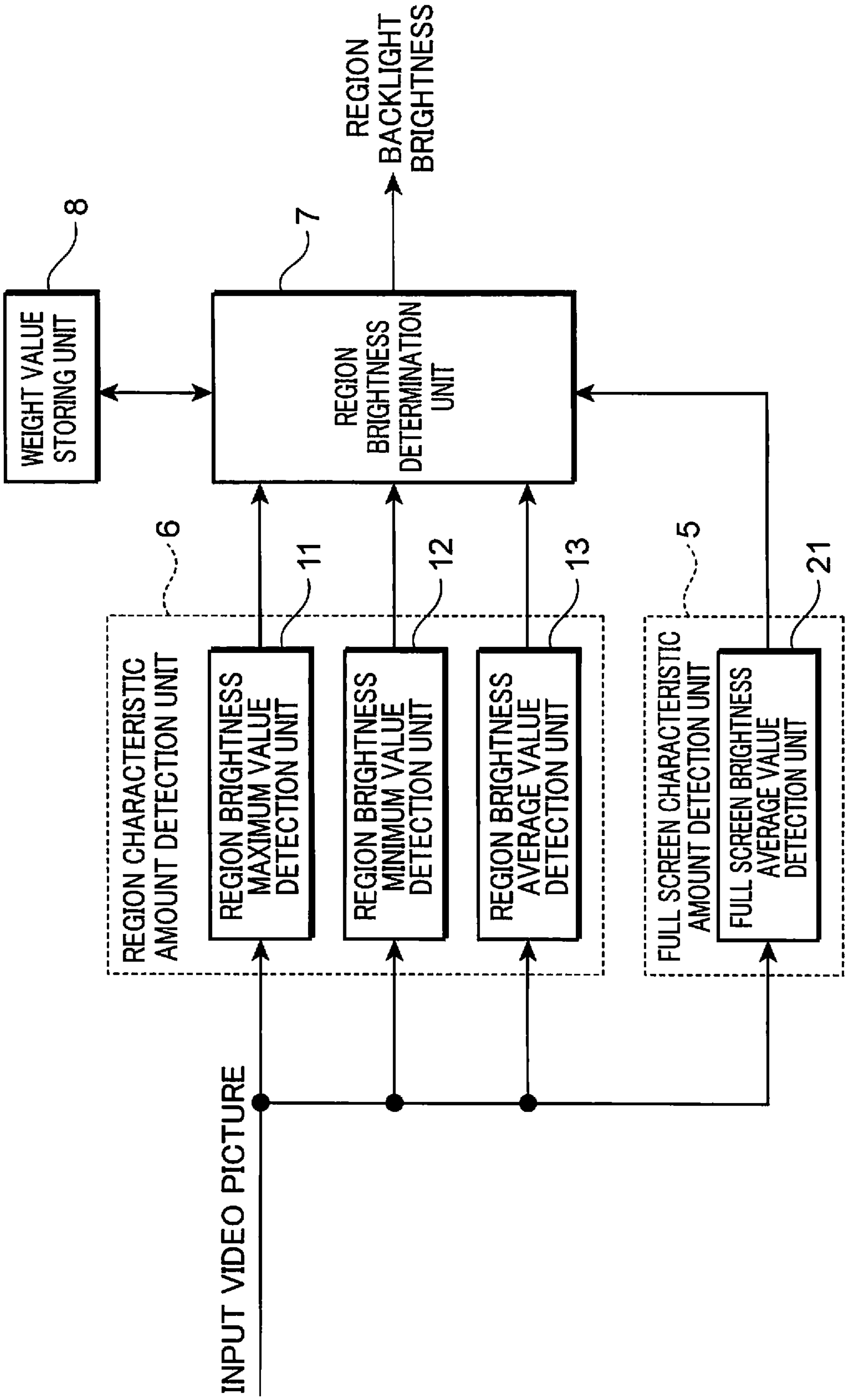
[FIG. 19]

FIG. 18 is a block diagram showing the overall configuration of the display device in Embodiment 2 of the present invention, and FIG. 19 is a block diagram showing the configuration of the full screen characteristic amount detection unit and the region characteristic amount detection unit in Embodiment 2. Note that, in FIG. 18 and FIG. 19, the same configuration as FIG. 1 and FIG. 2 is given the same reference numeral, and the explanation thereof is omitted.

The display device of Embodiment 2 comprises a display panel 1, a panel drive unit 2, a backlight unit 3, a backlight drive unit 4, the full screen characteristic amount detection unit 5, the region characteristic amount detection unit 6, the region brightness determination unit 7, and a weight value storing unit 8. Moreover, the region characteristic amount detection unit 6 of Embodiment 2 includes a region brightness maximum value detection unit 11, a region brightness minimum value detection unit 12, and a region brightness average value detection unit 13. Moreover, the full screen characteristic amount detection unit 5 of Embodiment 2 includes a full screen brightness average value detection unit 21.

The weight value storing unit 8 stores in advance a plurality of weight values, which change according to the brightness, by respectively associating the weight values with the maximum value of brightness of the image in the region, the minimum value of brightness of the image in the region, and the average value of brightness of the image in the region. Note that, in Embodiment 2, the weight value storing unit 8 corresponds to an example of the storing unit.

The region brightness determination unit 7 determines the emission brightness of the respective LEDs of the backlight unit 3 based on a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the average value of brightness that is detected by the full screen brightness average value detection unit 21 is a first value or higher.

Moreover, the region brightness determination unit 7 determines the emission brightness of the respective LEDs of the backlight unit 3 based on a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the average value of brightness that is detected by the full screen brightness average value detection unit 21 is a second value, which is smaller than the first value, or less.

Moreover, the region brightness determination unit 7 determines the emission brightness of the respective LEDs of the backlight unit 3 based on the average value of brightness that is detected by the region brightness average value detection unit 13 when the average value of brightness that is detected by the full screen brightness average value detection unit 21 is smaller than the first value and greater than the second value.

Figure 20:
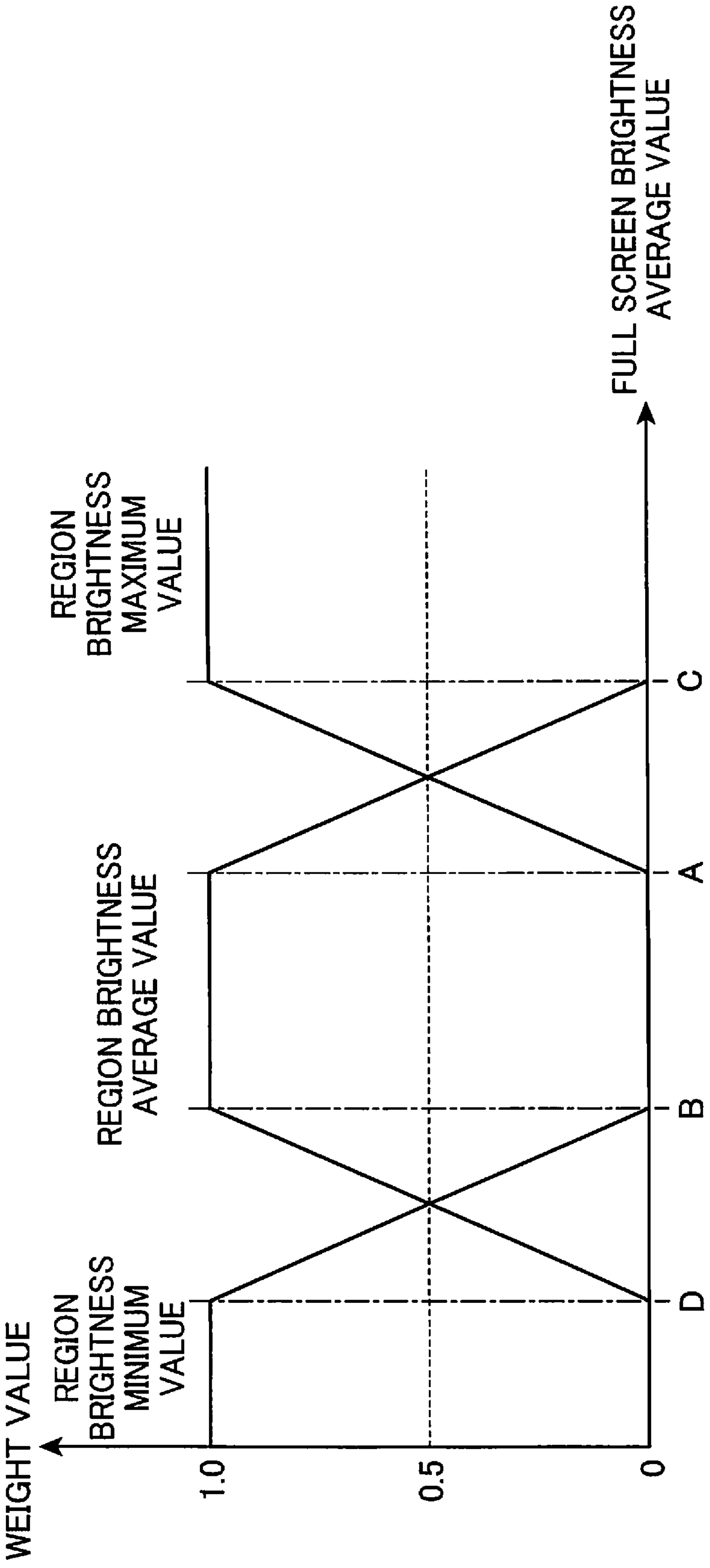
[FIG. 20]

FIG. 20 is a diagram explaining the processing of determining the region brightness to be performed by the region brightness determination unit 7 in Embodiment 2. In FIG. 20, the horizontal axis shows the average value of brightness in the full screen that is detected by the full screen characteristic amount detection unit 5, and the vertical axis shows the weight value that is multiplied to the maximum value of brightness of the image in the region, the average value of brightness of the image in the region, and the minimum value of brightness of the image in the region that were detected by the region characteristic amount detection unit 6.

As evident from FIG. 20, the region brightness determination unit 7 determines the emission brightness of the LED of the backlight unit 3 based on a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the average value of brightness that is detected by the full screen brightness average value detection unit 21 is a first value or higher; that is, when the overall screen is a bright scene.

Moreover, the region brightness determination unit 7 determines the emission brightness of the target LED of the backlight unit 3 to be the maximum value of brightness that is detected by the region brightness maximum value detection unit 11 when the average value of brightness of the image in the full screen that is detected by the full screen brightness average value detection unit 21 is a third value C, which is greater than the first value A, or higher.

In other words, the region brightness determination unit 7 determines the emission brightness of the target LED of the backlight unit 3 to be a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the average value of brightness that is detected by the full screen brightness average value detection unit 21 is the first value A or higher and smaller than the third value C.

Here, the region brightness determination unit 7 reads from the weight value storing unit 8 the weight value in which the detected average value of brightness of the image in the full screen and the detected maximum value of brightness in the region are associated, and reads from the weight value storing unit 8 the weight value in which the detected average value of brightness of the image in the full screen and the detected average value of brightness in the region are associated.

Meanwhile, the region brightness determination unit 7 determines the emission brightness of the target LED of the backlight unit 3 based on a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the average value of brightness that is detected by the full screen brightness average value detection unit 21 is a predetermined second value B or less; that is, when the overall screen is a dark scene.

Moreover, the region brightness determination unit 7 determines the emission brightness of the target LED of the backlight unit 3 to be the minimum value of brightness that is detected by the region brightness minimum value detection unit 12 when the average value of brightness of the image in the full screen that is detected by the full screen brightness average value detection unit 21 is a fourth value D, which is smaller than the second value B, or less.

In other words, the region brightness determination unit 7 determines the emission brightness of the target LED of the backlight unit 3 to be a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the average value of brightness that is detected by the full screen brightness average value detection unit 21 is the second value B or less and greater than the fourth value D.

Here, the region brightness determination unit 7 reads from the weight value storing unit 8 the weight value in which the detected average value of brightness of the image in the full screen and the detected minimum value of brightness in the region are associated, and reads from the weight value storing unit 8 the weight value in which the detected average value of brightness of the image in the full screen and the detected average value of brightness in the region are associated.

In addition, the region brightness determination unit 7 determines the emission brightness of the target LED of the backlight unit 3 to be the brightness of the average value of brightness of the image in the region that is detected by the region brightness average value detection unit 13 when the average value of brightness that is detected by the full screen brightness average value detection unit 21 is smaller than the first value A and greater than the second value B; that is, when the overall screen is a gray color scene.

Note that, in Embodiment 2 and the fourth modified example of Embodiment 2 described later, although the first value A is set to be a brightness value of 3/5 of a possible range of the brightness value (for example, 256 gradations of 0 to 255), the second value B is set to be a brightness value of 2/5 of a possible range of the brightness value, the third value C is set to be a brightness value of 4/5 of a possible range or the brightness value, and the fourth value D is set to be a brightness value of 1/5 of a possible range of the brightness value, the present invention is not limited thereto. The brightness value between the first value A and the second value B merely needs to a brightness value which represents a halftone.

As described above, it is possible to determine whether the video picture to be displayed on the display panel 1 is a bright video picture or a dark picture based on the characteristic amount in the full screen that is detected by the full screen characteristic amount detection unit 5. The region brightness determination unit 7 causes the respective LEDs of the backlight unit 3 to emit light based on a value obtained by multiplying the weight value stored in the weight value storing unit by the maximum value of brightness of the image in the region to be processed, and a value obtained by multiplying the weight value stored in the weight value storing unit by the average value of brightness of the image in the region to be processed when the overall screen is a bright video picture; that is when a peak brightness is required. It is thereby possible to resolve the problem of insufficient brightness.

Meanwhile, the region brightness determination unit 7 causes the respective LEDs of the backlight unit 3 to emit light based on a value obtained by multiplying the weight value stored in the weight value storing unit by the minimum value of brightness of the image in the region to be processed, and a value obtained by multiplying the weight value stored in the weight value storing unit by the average value of brightness of the image in the region to be processed when the overall screen is a dark picture; that is, when it is necessary to inhibit black floating. It is thereby possible to inhibit black floating.

Moreover, the region brightness determination unit 7 causes the LED of the backlight unit 3 to emit light at the average value of brightness of the image in the region to be processed when the overall screen is a video picture having a gray level brightness; that is, when it is necessary to balance black floating and peak brightness. It is thereby possible to display a well-balanced video picture.

Since it is possible to adopt the brightness between the detected maximum value of brightness and the detected average value of brightness, and the brightness between the detected minimum value of brightness and the detected average value of brightness in each of the divided regions based on the foregoing processing, in comparison to the processing of Embodiment 1 described above, the video picture can be represented in a broader range. Moreover, it is possible to inhibit the foregoing problem of black floating and brightness deterioration, and thereby provide a video picture to the user that will not cause a visually unpleasant sensation.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that, in Embodiment 2, although the region brightness determination unit 7 compares the average value of brightness of the image in the full screen that is detected by the full screen brightness average value detection unit 21 with the first value A, the second value B, the third value C and the fourth value D, the present invention is not limited thereto, and it is also possible to compare the average value of brightness of the image in the full screen that is detected by the full screen brightness average value detection unit 21 with the first value A and the second value B.

Note that, in the foregoing explanation, although the average value of brightness is used as the characteristic amount of the image of the overall screen, the present invention is not limited thereto, and a variance value of brightness can also be used as the characteristic amount of the image of the overall screen.

The first modified example of Embodiment 2 which uses a variance value of brightness as the characteristic amount of the image of the overall screen is now explained.

Figure 21:
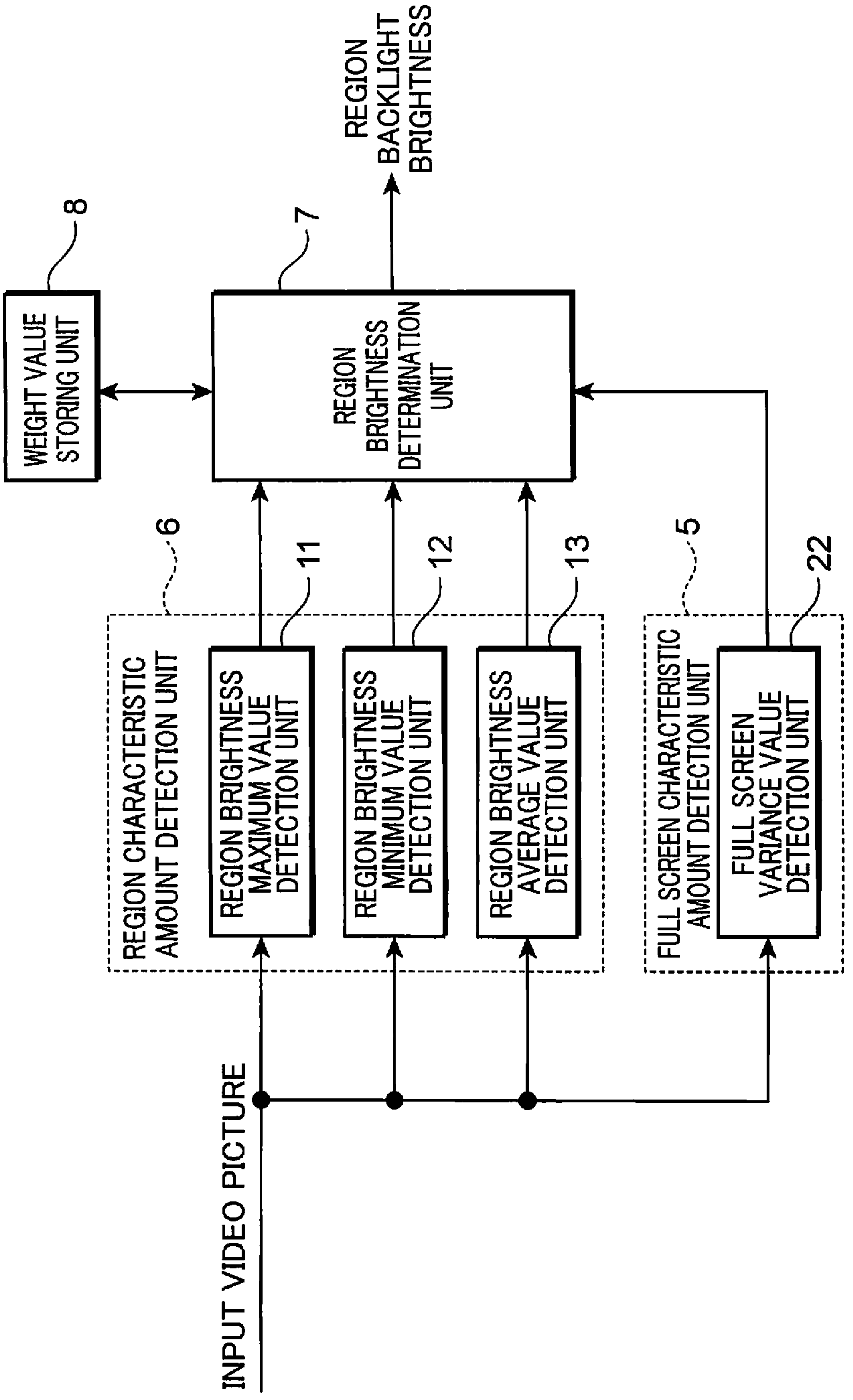
[FIG. 21]

FIG. 21 is a block diagram showing the configuration of the full screen characteristic amount detection unit and the region characteristic amount detection unit in the first modified example of Embodiment 2. Note that, in the first modified example of Embodiment 2, the configuration of the display device is the same as FIG. 18 and the explanation thereof is omitted. Moreover, in FIG. 21, the same configuration as FIG. 4 and FIG. 19 is given the same reference numeral and the explanation thereof is omitted.

As shown in FIG. 21, the region characteristic amount detection unit 6 in the first modified example of Embodiment 2 includes a region brightness maximum value detection unit 11, a region brightness minimum value detection unit 12, and a region brightness average value detection unit 13. Moreover, as shown in FIG. 21, the full screen characteristic amount detection unit 5 in the first modified example of Embodiment 2 includes a frame memory (not shown) and a full screen variance value detection unit 22 which detects the variance value of brightness of the image in one screen.

The weight value storing unit 8 stores in advance a plurality of weight values, which change according to a variance value of brightness, by respectively associating the weight values with the maximum value of brightness of the image in the region, the minimum value of brightness of the image in the region, and the average value of brightness of the image in the region.

The region brightness determination unit 7 determines the emission brightness of the respective LEDs of the backlight unit 3 based on a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the variance value of brightness in the full screen that is detected by the full screen variance value detection unit 22 is a first value or higher.

Moreover, the region brightness determination unit 7 determines the emission brightness of the respective LEDs of the backlight unit 3 based on a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the variance value of brightness in the full screen that is detected by the full screen variance value detection unit 22 is a second value, which is smaller than the first value, or less.

Moreover, the region brightness determination unit 7 determines the emission brightness of the target respective LEDs of the backlight unit 3 to be the average value of brightness that is detected by the region brightness average value detection unit 13 when the variance value of brightness of the image in the full screen that is detected by the full screen variance value detection unit 22 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 22.

Figure 22:
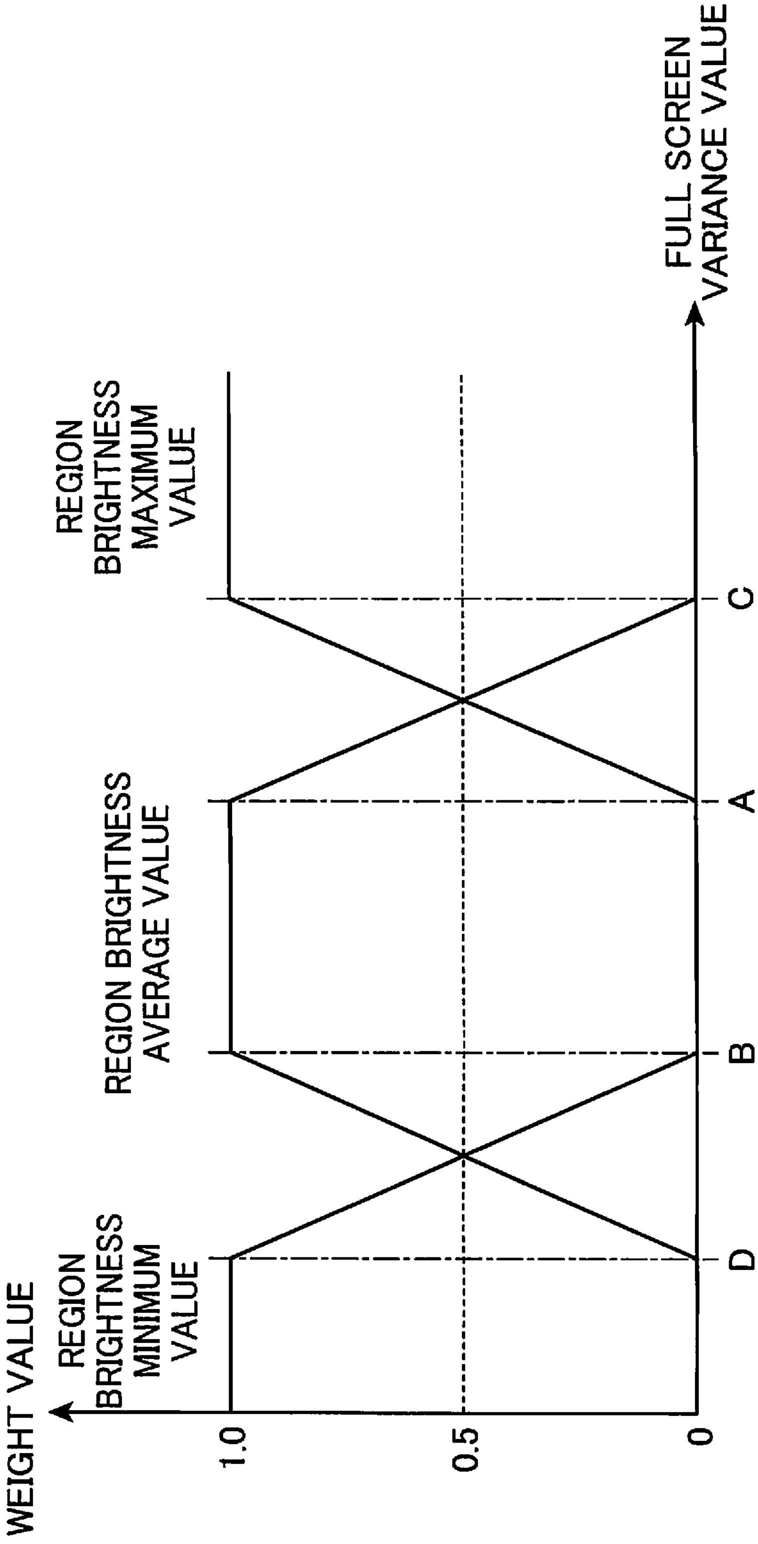
[FIG. 22]

FIG. 22 is a diagram explaining the processing of determining the region brightness to be performed by the region brightness determination unit 7 in the first modified example of Embodiment 2. In FIG. 22, the horizontal axis shows the variance value of brightness in the full screen that is detected by the full screen characteristic amount detection unit 5, and the vertical axis shows the weight value that is multiplied to the brightness corresponding to the maximum value of brightness of the image in the region, the average value of brightness of the image in the region, and the minimum value of brightness of the image in the region that were detected by the region characteristic amount detection unit 6.

As evident from FIG. 22, the region brightness determination unit 7 determines the emission brightness of the target LED of the backlight unit 3 to be the maximum value of brightness that is detected by the region brightness maximum value detection unit 11 when the variance value of brightness of the image in the full screen that is detected by the full screen variance value detection unit 22 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the variance value of brightness that is detected by the full screen variance value detection unit 22 is the first value A or higher and smaller than the third value C.

Here, the region brightness determination unit 7 reads from the weight value storing unit 8 the weight value in which the detected variance value of brightness of the image in the full screen and the detected maximum value of brightness in the region are associated, and reads from the weight value storing unit 8 the weight value in which the detected variance value of brightness of the image in the full screen and the detected average value of brightness in the region are associated.

Meanwhile, the region brightness determination unit 7 determines the emission brightness of the target LED of the backlight unit 3 to be the minimum value of brightness that is detected by the region brightness minimum value detection unit 12 when the variance value of brightness of the image in the full screen that is detected by the full screen variance value detection unit 22 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the variance value of brightness in the full screen that is detected by the full screen variance value detection unit 22 is the second value B or less and greater than the fourth value D.

Here, the region brightness determination unit 7 reads from the weight value storing unit 8 the weight value in which the detected variance value of brightness of the image in the full screen and the detected minimum value of brightness in the region are associated, and reads from the weight value storing unit 8 the weight value in which the detected variance value of brightness of the image in the full screen and the detected average value of brightness in the region are associated.

In addition, the region brightness determination unit 7 determines the emission brightness of the target LED of the backlight unit 3 to be the average value of brightness of that is detected by the region brightness average value detection unit 13 when the variance value of brightness that is detected by the full screen variance value detection unit 22 is smaller than the first value A and greater than the second value B.

Note that, in the first modified example of Embodiment 2 and the fifth modified example of Embodiment 2 described later, although the first value A is set to be a variance value of $\frac{3}{5}$ of a possible range of the variance value, the second value B is set to be a variance value of $\frac{2}{5}$ of a possible range of the variance value, the third value C is set to be a variance value of $\frac{4}{5}$ of a possible range of the variance value, and the fourth value D is set to be a variance value of $\frac{1}{5}$ of a possible range of the variance value, the present invention is not limited thereto. The variance value between the first value A and the second value B merely needs to a variance value which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that, in the foregoing explanation, although the average value of brightness and the variance value of brightness are used as the characteristic amount of the image of the overall screen, the present invention is not limited thereto, and a specific frequency component can also be used as the characteristic amount of the image of the overall screen.

The second modified example of Embodiment 2 which uses a specific frequency component as the characteristic amount of the image of the overall screen is now explained.

Figure 23:
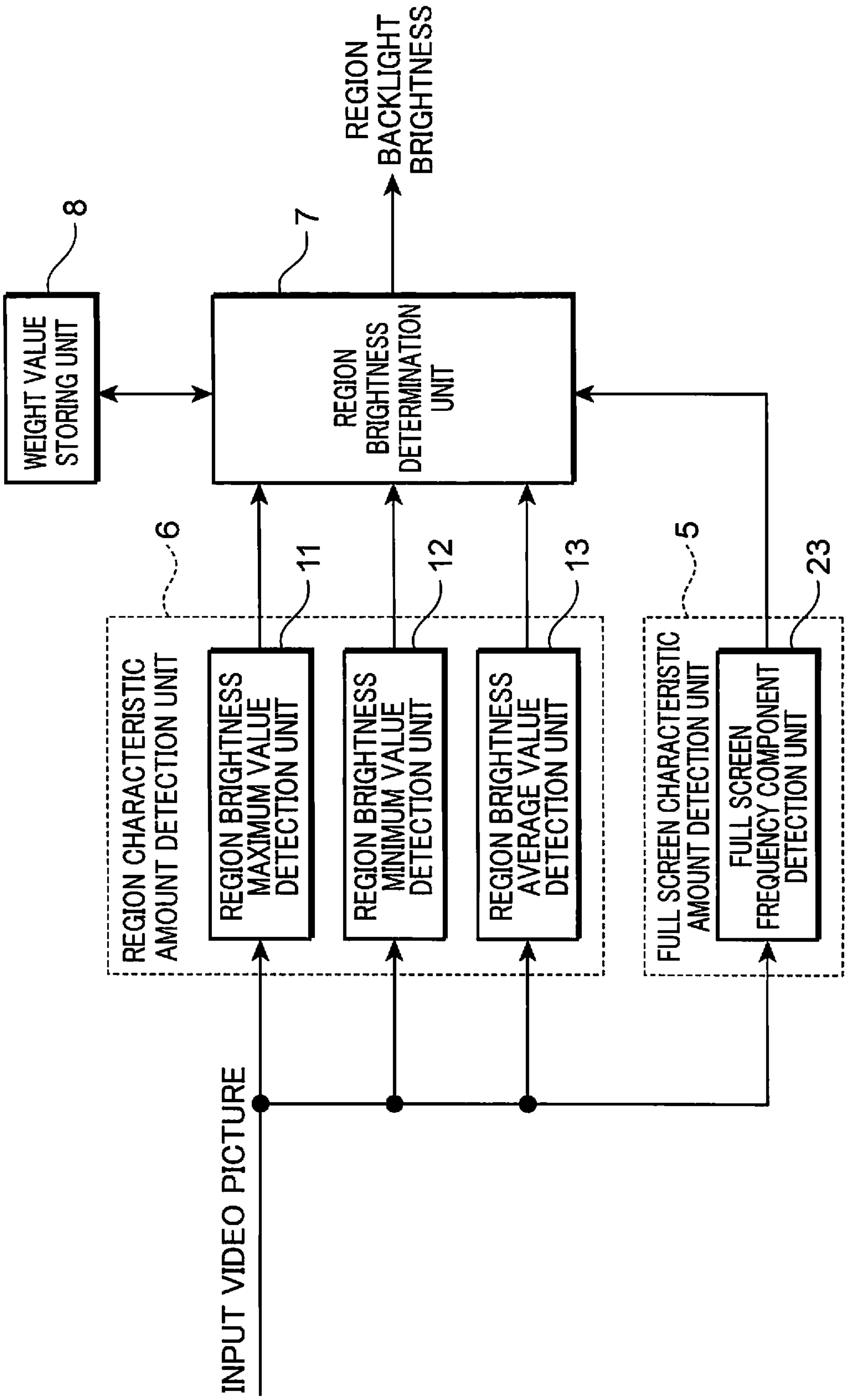
[FIG. 23]

FIG. 23 is a block diagram showing the configuration of the full screen characteristic amount detection unit and the region characteristic amount detection unit in the second modified example of Embodiment 2. Note that, in the second modified example of Embodiment 2, the configuration of the display device is the same as FIG. 18 and the explanation thereof is omitted. Moreover, in FIG. 23, the same configuration as FIG. 6 and FIG. 19 is given the same reference numeral and the explanation thereof is omitted.

As shown in FIG. 23, the region characteristic amount detection unit 6 in the second modified example of Embodiment 2 includes a region brightness maximum value detection unit 11, a region brightness minimum value detection unit 12, and a region brightness average value detection unit 13. Moreover, as shown in FIG. 23, the full screen characteristic amount detection unit 5 in the second modified example of Embodiment 2 includes a frame memory (not shown) and a full screen frequency component detection unit 23 which detects the specific frequency component of the image in one screen.

The weight value storing unit 8 stores in advance a plurality of weight values, which change according to a specific frequency component, by respectively associating the weight values with the maximum value of brightness of the image in the region, the minimum value of brightness of the image in the region, and the average value of brightness of the image in the region.

The region brightness determination unit 7 determines the emission brightness of the respective LEDs of the backlight unit 3 based on a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the specific frequency component of the image of the overall screen that is detected by the full screen frequency component detection unit 23 is a first value or higher.

Moreover, the region brightness determination unit 7 determines the emission brightness of the respective LEDs of the backlight unit 3 based on a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the specific frequency component of the image of the overall screen that is detected by the full screen frequency component detection unit 23 is a second value, which is smaller than the first value, or less.

Moreover, the region brightness determination unit 7 determines the emission brightness of the target respective LEDs of the backlight unit 3 to be the average value of brightness that is detected by the region brightness average value detection unit 13 when the specific frequency component of the image in the overall screen that is detected by the full screen frequency component detection unit 23 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 24.

Figure 24:
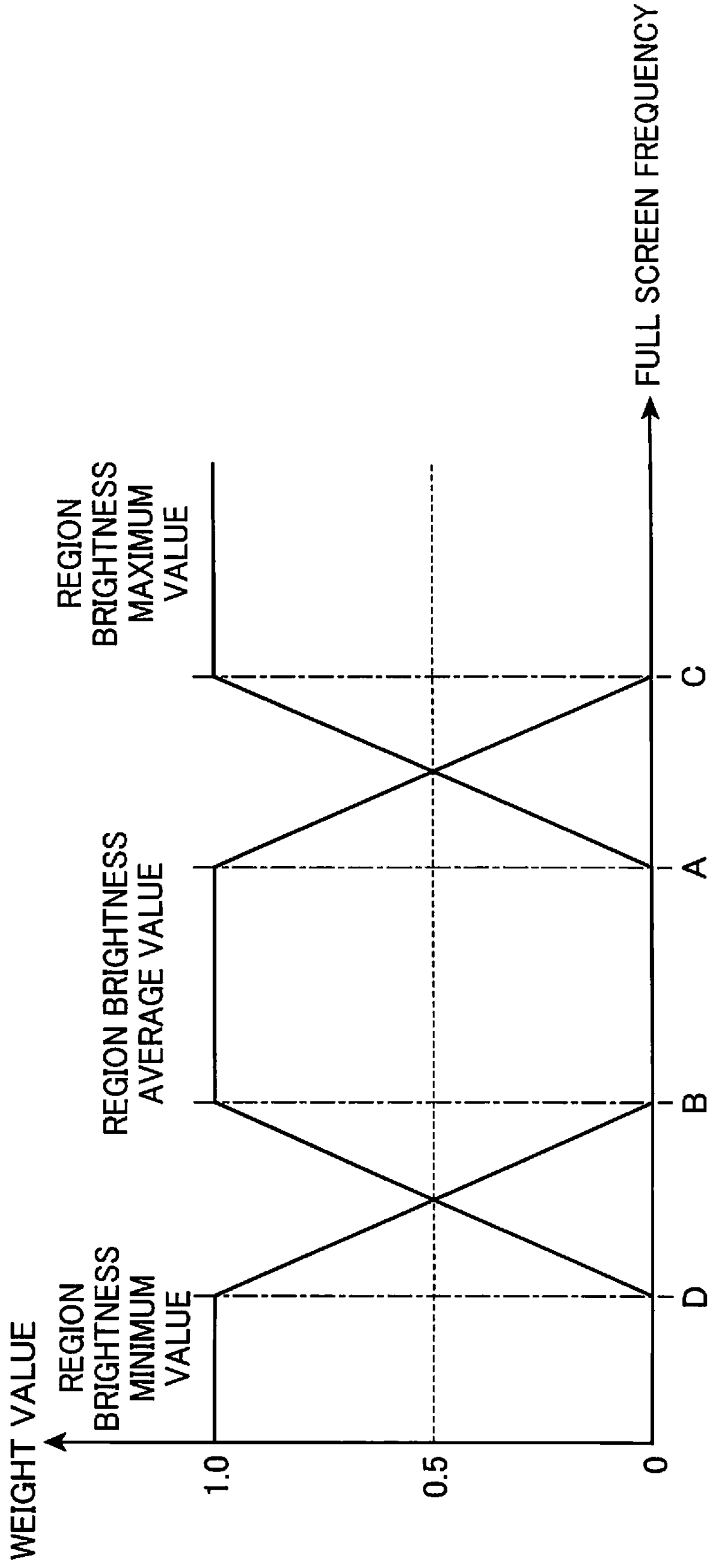
[FIG. 24]

FIG. 24 is a diagram explaining the processing of determining the region brightness to be performed by the region brightness determination unit 7 in the second modified example of Embodiment 2. In FIG. 24, the horizontal axis shows the specific frequency component in the full screen that is detected by the full screen characteristic amount detection unit 5, and the vertical axis shows the weight value that is multiplied to the brightness corresponding to the maximum value of brightness of the image in the region, the average value of brightness of the image in the region, and the minimum value of brightness of the image in the region that were detected by the region characteristic amount detection unit 6.

As evident from FIG. 24, the region brightness determination unit 7 determines the emission brightness of the target LED of the backlight unit 3 to be the maximum value of brightness that is detected by the region brightness maximum value detection unit 11 when the specific frequency component of the image in the full screen that is detected by the full screen frequency component detection unit 23 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the specific frequency component of the image of the overall screen that is detected by the full screen frequency component detection unit 23 is the first value A or higher and smaller than the third value C.

Here, the region brightness determination unit 7 reads from the weight value storing unit 8 the weight value in which the detected specific frequency component of the image of the overall screen and the detected maximum value of brightness in the region are associated, and reads from the weight value storing unit 8 the weight value in which the detected specific frequency component of the image of the overall screen and the detected average value of brightness in the region are associated.

Meanwhile, the region brightness determination unit 7 determines the emission brightness of the target LED of the backlight unit 3 to be the minimum value of brightness that is detected by the region brightness minimum value detection unit 12 when the specific frequency component of the image of the overall screen that is detected by the full screen frequency component detection unit 23 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the specific frequency component of the image of the overall screen that is detected by the full screen frequency component detection unit 23 is the second value B or less and greater than the fourth value D.

Here, the region brightness determination unit 7 reads from the weight value storing unit 8 the weight value in which the detected specific frequency component of the image of the overall screen and the detected minimum value of brightness in the region are associated, and reads from the weight value storing unit 8 the weight value in which the detected specific frequency component of the image of the overall screen and the detected average value of brightness in the region are associated.

In addition, the region brightness determination unit 7 determines the emission brightness of the target LED of the backlight unit 3 to be the average value of brightness of that is detected by the region brightness average value detection unit 13 when the specific frequency component of the image of the overall screen that is detected by the full screen frequency component detection unit 23 is smaller than the first value A and greater than the second value B.

Note that, in the second modified example of Embodiment 2 and the sixth modified example of Embodiment 2 described later, although the first value A is set to be a frequency component of 3/5 of a possible range of the specific frequency component, the second value B is set to be a frequency component of 2/5 of a possible range of the specific frequency component, the third value C is set to be a frequency component of 4/5 of a possible range of the specific frequency component, and the fourth value D is set to be a frequency component of 1/5 of a possible range of the specific frequency component, the present invention is not limited thereto. The specific frequency component between the first value A and the second value B merely needs to a frequency component which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that, in the foregoing explanation, although the average value of brightness, the variance value of brightness, and the specific frequency component are used as the characteristic amount of the image of the overall screen, the present invention is not limited thereto, and a color area of a specific color can also be used as the characteristic amount of the image of the overall screen.

The third modified example of Embodiment 2 which uses a color area of a specific color as the characteristic amount of the image of the overall screen is now explained.

Figure 25:
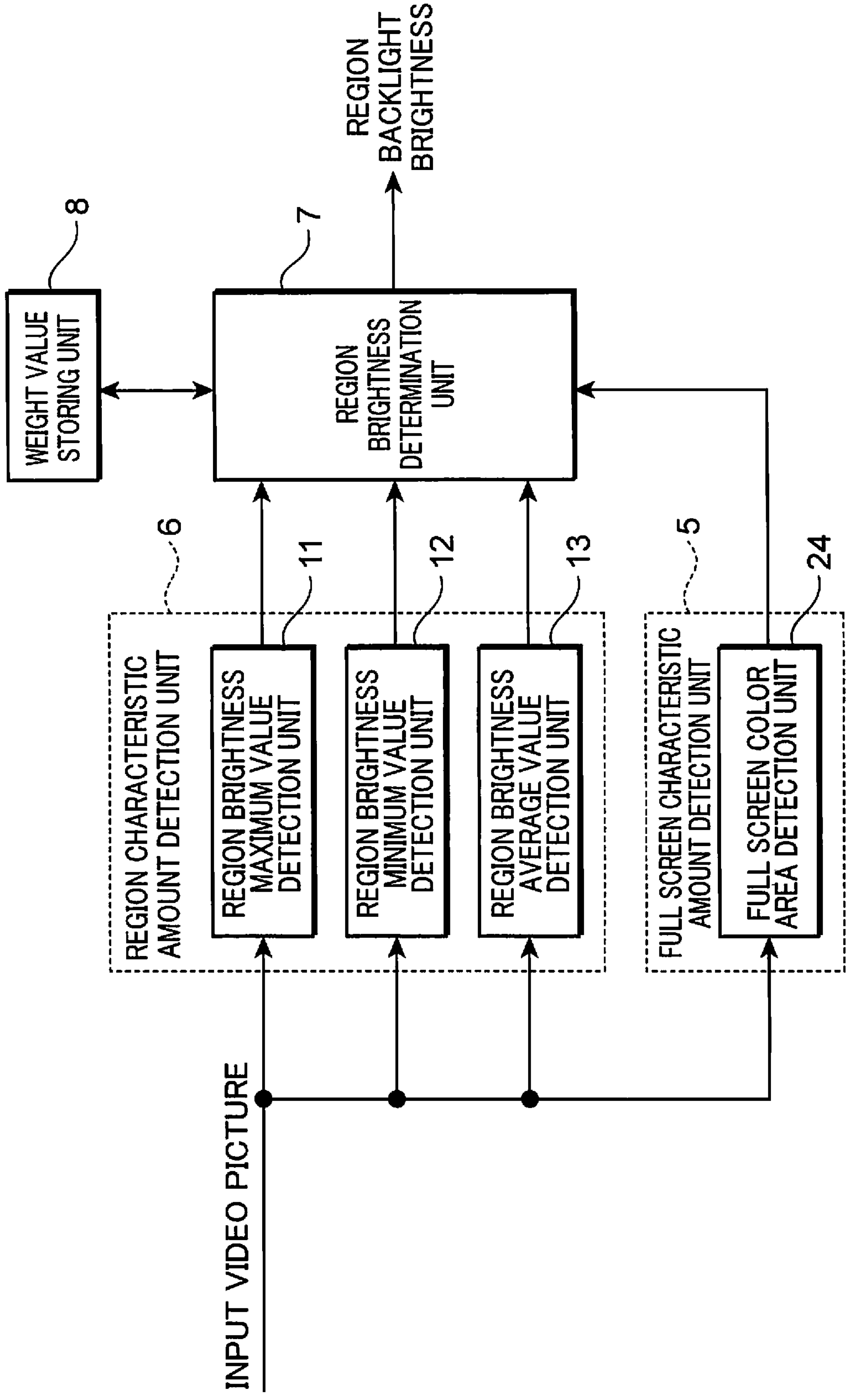
[FIG. 25]

FIG. 25 is a block diagram showing the configuration of the full screen characteristic amount detection unit and the region characteristic amount detection unit in the third modified example of Embodiment 2. Note that, in the third modified example of Embodiment 2, the configuration of the display device is the same as FIG. 18 and the explanation thereof is omitted. Moreover, in FIG. 25, the same configuration as FIG. 8 and FIG. 19 is given the same reference numeral and the explanation thereof is omitted.

As shown in FIG. 25, the region characteristic amount detection unit 6 in the third modified example of Embodiment 2 includes a region brightness maximum value detection unit 11, a region brightness minimum value detection unit 12, and a region brightness average value detection unit 13. Moreover, as shown in FIG. 25, the full screen characteristic amount detection unit 5 in the third modified example of Embodiment 2 includes a frame memory (not shown) and a full screen color area detection unit 24 which detects the color area of a specific color of the image in one screen.

The weight value storing unit 8 stores in advance a plurality of weight values, which change according to a color area of a specific color, by respectively associating the weight values with the maximum value of brightness of the image in the region, the minimum value of brightness of the image in the region, and the average value of brightness of the image in the region.

The region brightness determination unit 7 determines the emission brightness of the respective LEDs of the backlight unit 3 based on a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the color area of a specific color of the overall screen that is detected by the full screen color area detection unit 24 is a first value or higher.

Moreover, the region brightness determination unit 7 determines the emission brightness of the respective LEDs of the backlight unit 3 based on a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the color area of a specific color of the overall screen that is detected by the full screen color area detection unit 24 is a second value, which is smaller than the first value, or less.

Moreover, the region brightness determination unit 7 determines the emission brightness of the target LED of the backlight unit 3 to be the average value of brightness that is detected by the region brightness average value detection unit 13 when the color area of a specific color of the overall screen that is detected by the full screen color area detection unit 24 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 26.

Figure 26:
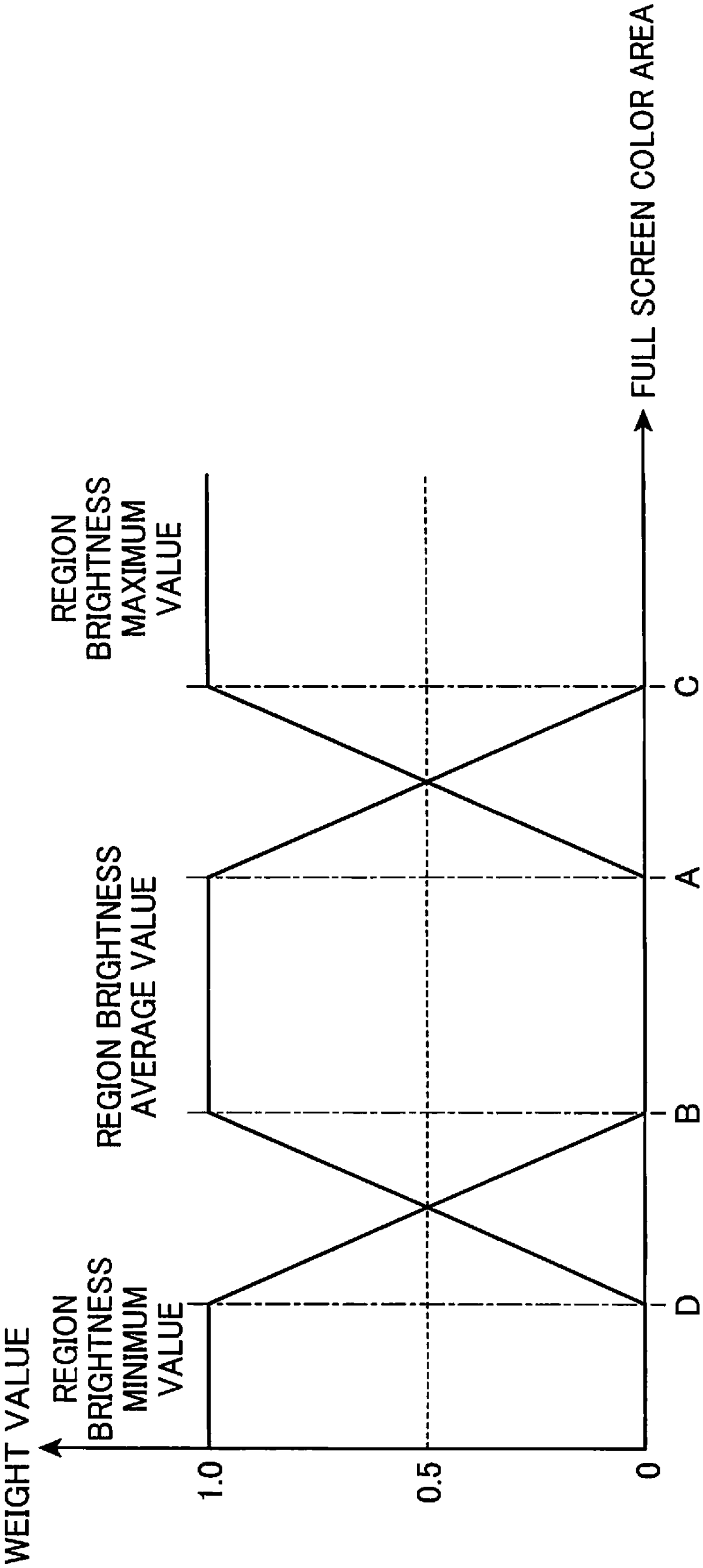
[FIG. 26]

FIG. 26 is a diagram explaining the processing of determining the region brightness to be performed by the region brightness determination unit 7 in the third modified example of Embodiment 2. In FIG. 26, the horizontal axis shows the color area of a specific color in the full screen that is detected by the full screen characteristic amount detection unit 5, and the vertical axis shows the weight value that is multiplied to the brightness corresponding to the maximum value of brightness of the image in the region, the average value of brightness of the image in the region, and the minimum value of brightness of the image in the region that were detected by the region characteristic amount detection unit 6.

As evident from FIG. 26, the region brightness determination unit 7 determines the emission brightness of the target LED of the backlight unit 3 to be the maximum value of brightness that is detected by the region brightness maximum value detection unit 11 when the color area of a specific color of the overall screen that is detected by the full screen color area detection unit 24 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the color area of a specific color of the overall screen that is detected by the full screen color area detection unit 24 is the first value A or higher and smaller than the third value C. However, in the foregoing case, the specific color is, for example, white.

Here, the region brightness determination unit 7 reads from the weight value storing unit 8 the weight value in which the detected color area of a specific color of the overall screen and the detected maximum value of brightness in the region are associated, and reads from the weight value storing unit 8 the weight value in which the detected color area of a specific color of the overall screen and the detected average value of brightness in the region are associated.

Meanwhile, the region brightness determination unit 7 determines the emission brightness of the target LED of the backlight unit 3 to be the minimum value of brightness that is detected by the region brightness minimum value detection unit 12 when the color area of a specific color of the overall screen that is detected by the full screen color area detection unit 24 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the color area of a specific color of the overall screen that is detected by the full screen color area detection unit 24 is the second value B or less and greater than the fourth value D.

Here, the region brightness determination unit 7 reads from the weight value storing unit 8 the weight value in which the detected color area of a specific color of the overall screen and the detected minimum value of brightness in the region are associated, and reads from the weight value storing unit 8 the weight value in which the detected color area of a specific color of the overall screen and the detected average value of brightness in the region are associated.

In addition, the region brightness determination unit 7 determines the emission brightness of the target LED of the backlight unit 3 to be the average value of brightness of that is detected by the region brightness average value detection unit 13 when the color area of a specific color of the overall screen that is detected by the full screen color area detection unit 24 is smaller than the first value A and greater than the second value B.

Needless to say, when the specific color is black, the emission brightness of the LED will be the opposite value as the foregoing case when the specific color is white. Specifically, the region brightness determination unit 7 determines the emission brightness of the LED to be a total value of a value obtained by multiplying the weight value stored in the weight value storing unit 8 to the minimum value of brightness that is detected by the region brightness minimum value detection unit 12, and a value obtained multiplying the weight value stored in the weight value storing unit 8 to the average value of brightness that is detected by the region brightness average value detection unit 13 when the black color area of the overall screen is the first value A or higher and smaller than the third value C, determines the emission brightness of the LED to be a total value of a value obtained by multiplying the weight value stored in the weight value storing unit 8 to the maximum value of brightness that is detected by the region brightness maximum value detection unit 11, and a value obtained multiplying the weight value stored in the weight value storing unit 8 to the average value of brightness that is detected by the region brightness average value detection unit 13 when the black color area of the overall screen is the second value B or less and greater than the fourth value D, and determines the emission brightness of the LED to be the average value of brightness that is detected by the region brightness average value detection unit 13 when the black color area of the overall screen is smaller than the first value A and greater than the second value B.

Moreover, in the third modified example of Embodiment 2 and the seventh modified example of Embodiment 2 described later, although the first value A is set to be a color area of ⅗ of a possible range of the color area, the second value B is set to be a color area of ⅖ of a possible range of the color area, the third value C is set to be a color area of ⅘ of a possible range of the color area, and the fourth value D is set to be a color area of ⅕ of a possible range of the color area, the present invention is not limited thereto. The color area between the first value A and the second value B merely needs to a color area which represents a halftone.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

In the foregoing explanation, although the maximum value of brightness, the minimum value of brightness, and the average value of brightness are used as the characteristic amount of the image of each of the divided regions, the present invention is not limited thereto, and the maximum value of brightness, the average value of brightness, and the color area of a specific color can also be used as the characteristic amount of the image of each of the divided regions, and the average value of brightness can be used as the characteristic amount of the image of the overall screen.

The fourth modified example of Embodiment 2 which uses the maximum value of brightness, the average value of brightness, and the color area of a specific color as the characteristic amount of the image of the respective regions, and uses the average value of brightness as the characteristic amount of the image of the overall screen is now explained.

Figure 27:
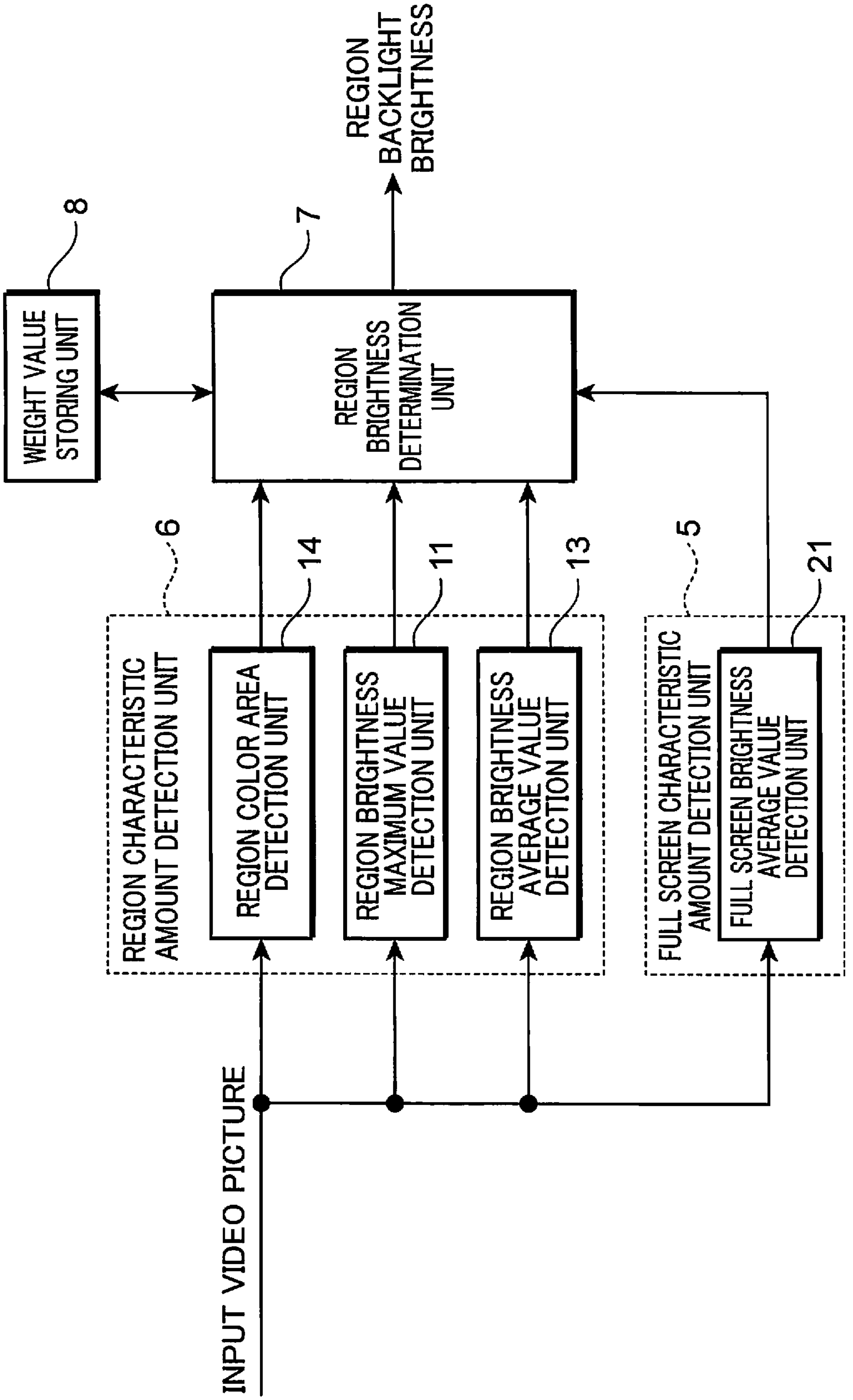
[FIG. 27]

FIG. 27 is a block diagram showing the configuration of the full screen characteristic amount detection unit and the region characteristic amount detection unit in the fourth modified example of Embodiment 2. Note that, in the fourth modified example of Embodiment 2, the configuration of the display device is the same as FIG. 18 and the explanation thereof is omitted. Moreover, in FIG. 27, the same configuration as FIG. 10 and FIG. 19 is given the same reference numeral and the explanation thereof is omitted.

As shown in FIG. 27, the region characteristic amount detection unit 6 in the fourth modified example of Embodiment 2 includes a region color area detection unit 14, a region brightness maximum value detection unit 11, and a region brightness average value detection unit 13. Moreover, as shown in FIG. 27, the full screen characteristic amount detection unit 5 in the fourth modified example of Embodiment 2 includes a frame memory (not shown) and a full screen brightness average value detection unit 21 which detects the average value of brightness of the image in one screen.

The weight value storing unit 8 stores in advance a plurality of weight values, which change according to the brightness, by respectively associating the weight values with the maximum value of brightness of the image in the region, the average value of brightness of the image in the region, and the area of a specific color of the image in the region.

The region brightness determination unit 7 determines the emission brightness of the respective LEDs of the backlight unit 3 based on a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the average value of brightness that is detected by the full screen brightness average value detection unit 21 is a first value or higher.

Moreover, the region brightness determination unit 7 determines the emission brightness of the respective LEDs of the backlight unit 3 based on a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the average value of brightness that is detected by the full screen brightness average value detection unit 21 is a second value, which is smaller than the first value, or less.

Moreover, the region brightness determination unit 7 determines the emission brightness of the respective LEDs of the backlight unit 3 based on the maximum value of brightness that is detected by the region brightness maximum value detection unit 11 when the average value of brightness that is detected by the full screen brightness average value detection unit 21 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 28.

Figure 28:
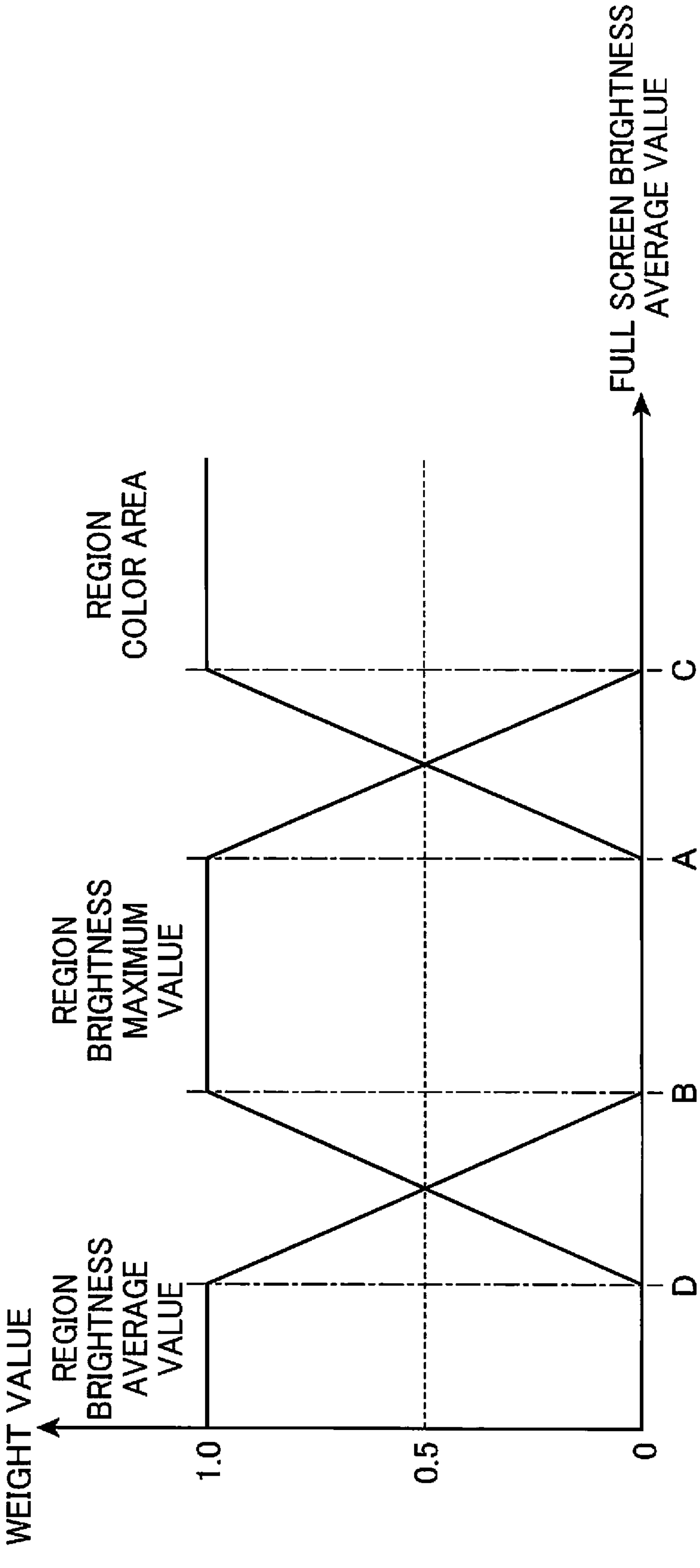
[FIG. 28]

FIG. 28 is a diagram explaining the processing of determining the region brightness to be performed by the region brightness determination unit 7 in the fourth modified example of Embodiment 2. In FIG. 28, the horizontal axis shows the average value of brightness in the full screen that is detected by the full screen characteristic amount detection unit 5, and the vertical axis shows the weight value that is multiplied to the maximum value of brightness of the image in the region, the average value of brightness of the image in the region, and the color area of a specific color in the region that were detected by the region characteristic amount detection unit 6.

As evident from FIG. 28, the region brightness determination unit 7 determines the emission brightness of the target LED of the backlight unit 3 to be the brightness corresponding to the color area of a specific color that is detected by the region color area detection unit 14 when the average value of brightness of the image in the full screen that is detected by the full screen brightness average value detection unit 21 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the average value of brightness that is detected by the full screen brightness average value detection unit 21 is the first value A or higher and smaller than the third value C. However, in the foregoing case, the specific color is, for example, white.

Here, the region brightness determination unit 7 reads from the weight value storing unit 8 the weight value in which the detected average value of brightness of the image in the full screen and the detected color area of a specific color in the region are associated, and reads from the weight value storing unit 8 the weight value in which the detected average value of brightness of the image in the full screen and the detected maximum value of brightness in the region are associated.

Meanwhile, the region brightness determination unit 7 determines the emission brightness of the target LED of the backlight unit 3 to be the average value of brightness that is detected by the region brightness average value detection unit 13 when the average value of brightness of the image in the full screen that is detected by the full screen brightness average value detection unit 21 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the average value of brightness that is detected by the full screen brightness average value detection unit 21 is the second value B or less and greater than the fourth value D.

Here, the region brightness determination unit 7 reads from the weight value storing unit 8 the weight value in which the detected average value of brightness of the image in the full screen and the detected average value of brightness in the region are associated, and reads from the weight value storing unit 8 the weight value in which the detected average value of brightness of the image in the full screen and the detected maximum value of brightness in the region are associated.

In addition, the region brightness determination unit 7 determines the emission brightness of the target LED of the backlight unit 3 to be the maximum value of brightness of the image in the region that is detected by the region brightness maximum value detection unit 11 when the average value of brightness that is detected by the full screen brightness average value detection unit 21 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the variance value of brightness can be used as the characteristic amount of the image of the overall screen.

The fifth modified example of Embodiment 2 which uses the maximum value of brightness, the average value of brightness, and the color area of a specific color as the characteristic amount of the image of the respective regions, and uses the variance value of brightness as the characteristic amount of the image of the overall screen is now explained.

Figure 29:
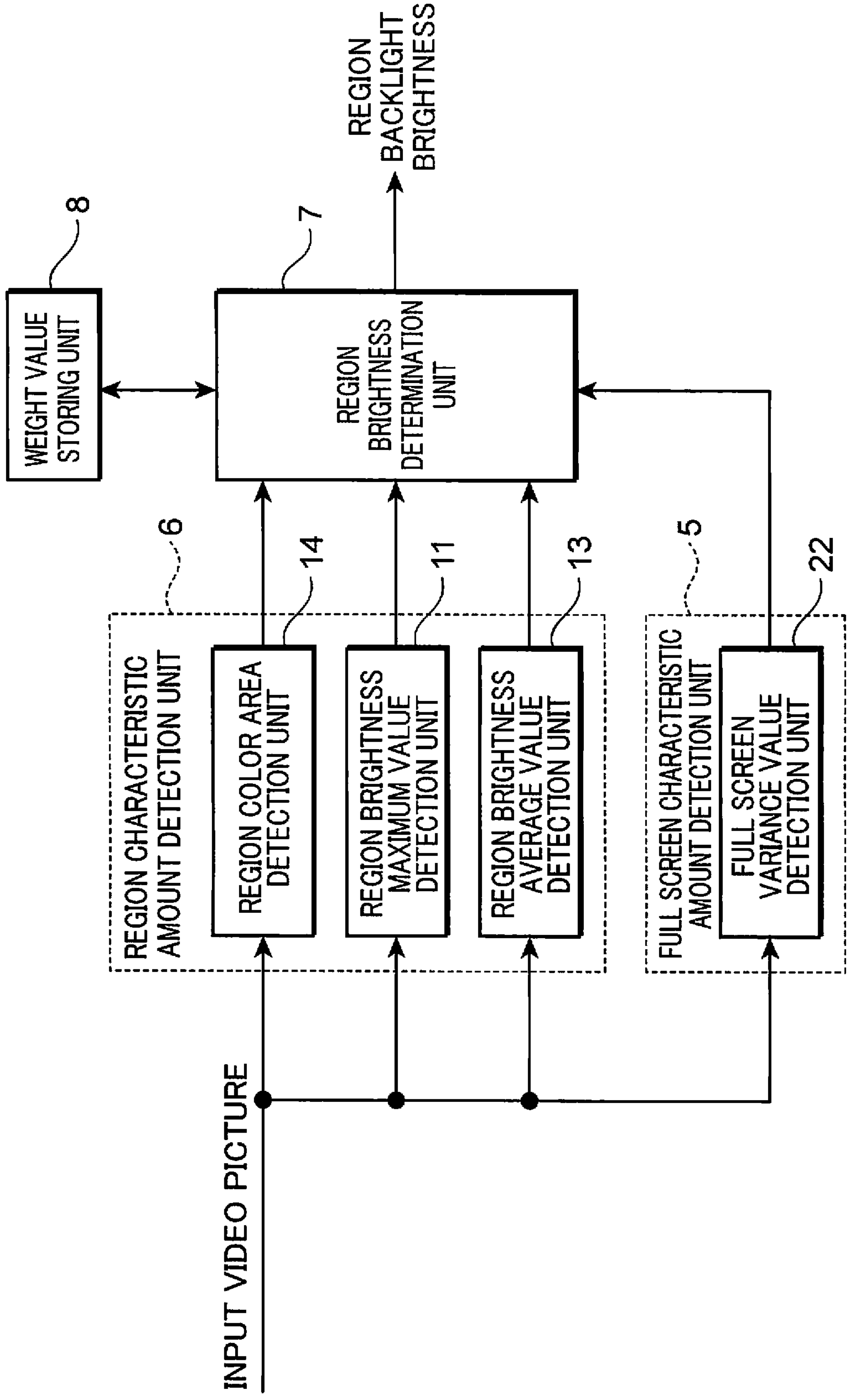
[FIG. 29]

FIG. 29 is a block diagram showing the configuration of the full screen characteristic amount detection unit and the region characteristic amount detection unit in the fifth modified example of Embodiment 2. Note that, in the fifth modified example of Embodiment 2, the configuration of the display device is the same as FIG. 18 and the explanation thereof is omitted. Moreover, in FIG. 29, the same configuration as FIG. 12 and FIG. 19 is given the same reference numeral and the explanation thereof is omitted.

As shown in FIG. 29, the region characteristic amount detection unit 6 in the fifth modified example of Embodiment 2 includes a region color area detection unit 14, a region brightness maximum value detection unit 11, and a region brightness average value detection unit 13. Moreover, as shown in FIG. 29, the full screen characteristic amount detection unit 5 in the fifth modified example of Embodiment 2 includes a frame memory (not shown) and a full screen variance value detection unit 22 which detects the variance value of brightness of the image in one screen.

The weight value storing unit 8 stores in advance a plurality of weight values, which change according to a variance value of brightness, by respectively associating the weight values with the maximum value of brightness of the image in the region, the average value of brightness of the image in the region, and the area of a specific color of the image in the region.

The region brightness determination unit 7 determines the emission brightness of the respective LEDs of the backlight unit 3 based on a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the variance value of brightness of the overall screen that is detected by the full screen variance value detection unit 22 is a first value or higher.

Moreover, the region brightness determination unit 7 determines the emission brightness of the respective LEDs of the backlight unit 3 based on a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the variance value of brightness of the overall screen that is detected by the full screen variance value detection unit 22 is a second value, which is smaller than the first value, or less.

Moreover, the region brightness determination unit 7 determines the emission brightness of the respective LEDs of the backlight unit 3 based on the maximum value of brightness that is detected by the region brightness maximum value detection unit 11 when the variance value of brightness of the overall screen that is detected by the full screen variance value detection unit 22 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 30.

Figure 30:
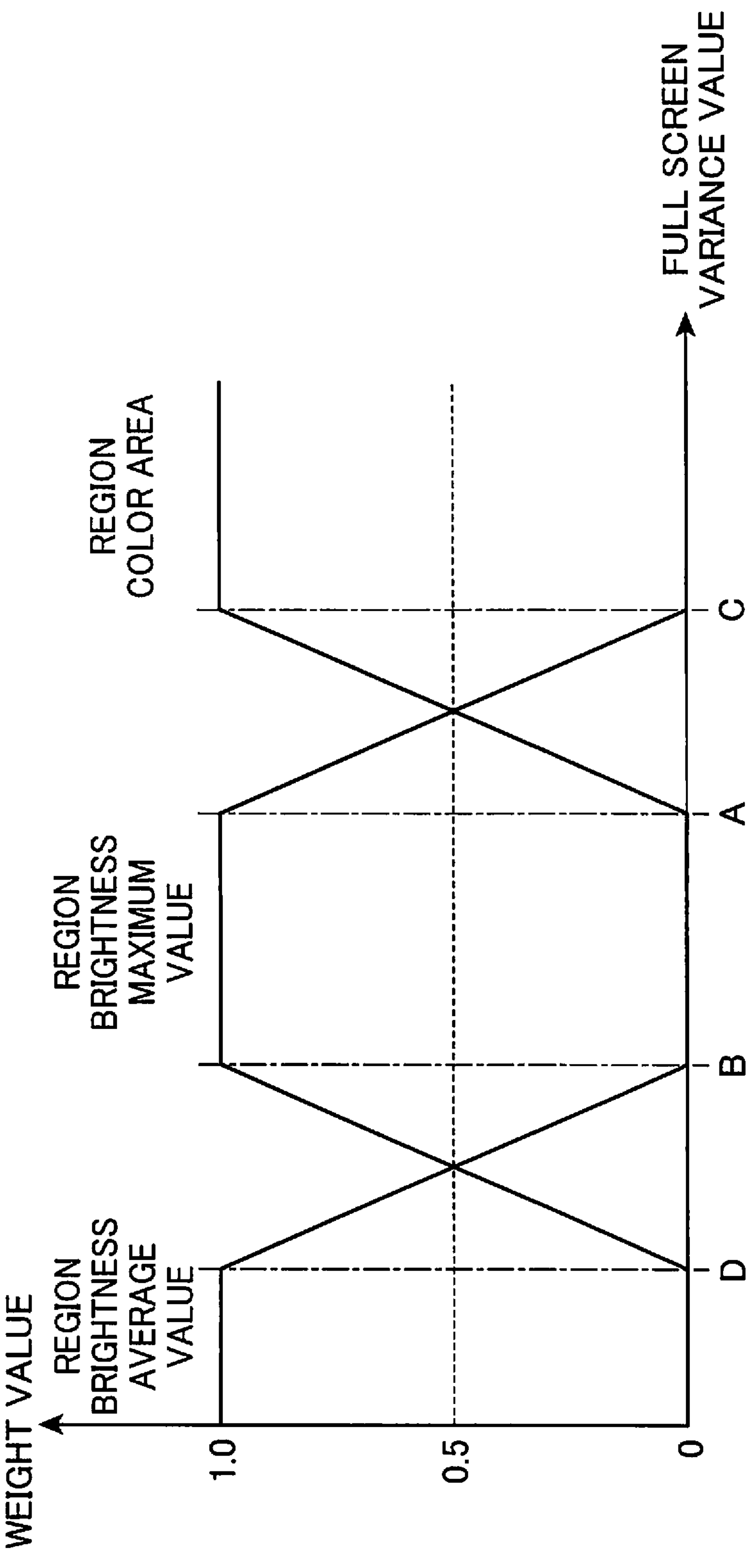
[FIG. 30]

FIG. 30 is a diagram explaining the processing of determining the region brightness to be performed by the region brightness determination unit 7 in the fifth modified example of Embodiment 2. In FIG. 30, the horizontal axis shows the variance value of brightness in the full screen that is detected by the full screen characteristic amount detection unit 5, and the vertical axis shows the weight value that is multiplied to the maximum value of brightness of the image in the region, the average value of brightness of the image in the region, and the color area of a specific color in the region that were detected by the region characteristic amount detection unit 6.

As evident from FIG. 30, the region brightness determination unit 7 determines the emission brightness of the target LED of the backlight unit 3 to be the brightness corresponding to the color area of a specific color that is detected by the region color area detection unit 14 when the variance value of brightness of the overall screen that is detected by the full screen variance value detection unit 22 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the variance value of brightness of the overall screen that is detected by the full screen variance value detection unit 22 is the first value A or higher and smaller than the third value C. However, in the foregoing case, the specific color is, for example, white.

Here, the region brightness determination unit 7 reads from the weight value storing unit 8 the weight value in which the detected variance value of brightness of the image in the full screen and the detected color area of a specific color in the region are associated, and reads from the weight value storing unit 8 the weight value in which the detected variance value of brightness of the image in the full screen and the detected maximum value of brightness in the region are associated.

Meanwhile, the region brightness determination unit 7 determines the emission brightness of the target LED of the backlight unit 3 to be the average value of brightness that is detected by the region brightness average value detection unit 13 when the variance value of brightness of the overall screen that is detected by the full screen variance value detection unit 22 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the variance value of brightness of the overall screen that is detected by the full screen variance value detection unit 22 is the second value B or less and greater than the fourth value D.

Here, the region brightness determination unit 7 reads from the weight value storing unit 8 the weight value in which the detected variance value of brightness of the image of the overall screen and the detected average value of brightness in the region are associated, and reads from the weight value storing unit 8 the weight value in which the detected variance value of brightness of the image in the full screen and the detected maximum value of brightness in the region are associated.

In addition, the region brightness determination unit 7 determines the emission brightness of the target LED of the backlight unit 3 to be the maximum value of brightness of the image in the region that is detected by the region brightness maximum value detection unit 11 when the variance value of brightness of the overall screen that is detected by the full screen variance value detection unit 22 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the specific frequency component can be used as the characteristic amount of the image of the overall screen.

The sixth modified example of Embodiment 2 which uses the maximum value of brightness, the average value of brightness, and the color area of a specific color as the characteristic amount of the image of the respective regions, and uses the specific frequency component as the characteristic amount of the image of the overall screen is now explained.

Figure 31:
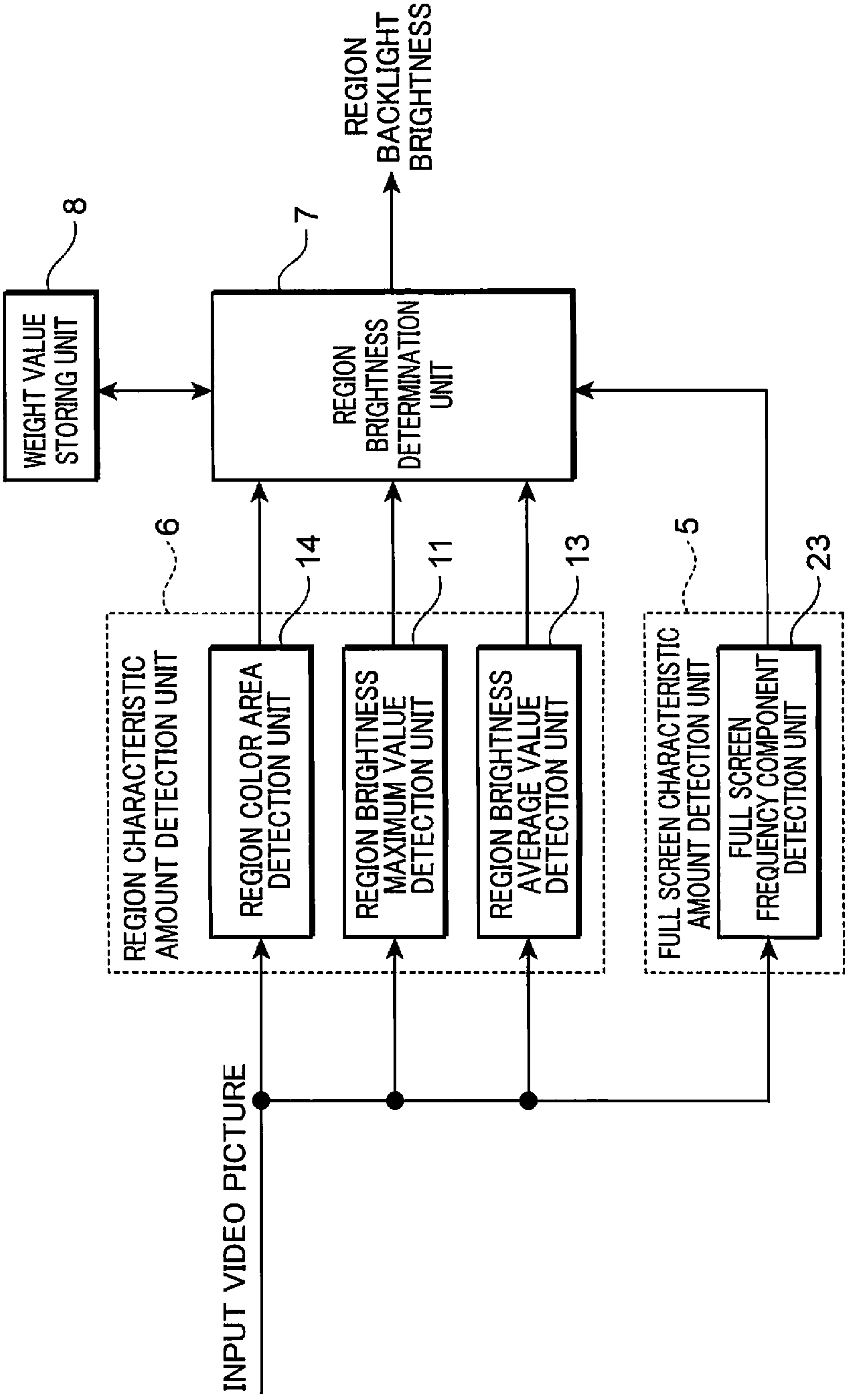
[FIG. 31]

FIG. 31 is a block diagram showing the configuration of the full screen characteristic amount detection unit and the region characteristic amount detection unit in the sixth modified example of Embodiment 2. Note that, in the sixth modified example of Embodiment 2, the configuration of the display device is the same as FIG. 18 and the explanation thereof is omitted. Moreover, in FIG. 31, the same configuration as FIG. 14 and FIG. 19 is given the same reference numeral and the explanation thereof is omitted.

As shown in FIG. 31, the region characteristic amount detection unit 6 in the sixth modified example of Embodiment 2 includes a region color area detection unit 14, a region brightness maximum value detection unit 11, and a region brightness average value detection unit 13. Moreover, as shown in FIG. 31, the full screen characteristic amount detection unit 5 in the sixth modified example of Embodiment 2 includes a frame memory (not shown) and a full screen frequency component detection unit 23 which detects the specific frequency component of the image in one screen.

The weight value storing unit 8 stores in advance a plurality of weight values, which change according to a frequency component of the pixel, by respectively associating the weight values with the maximum value of brightness of the image in the region, the average value of brightness of the image in the region, and the area of a specific color of the image in the region.

The region brightness determination unit 7 determines the emission brightness of the respective LEDs of the backlight unit 3 based on a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the specific frequency component of the image of the overall screen that is detected by the full screen frequency component detection unit 23 is a first value or higher.

Moreover, the region brightness determination unit 7 determines the emission brightness of the respective LEDs of the backlight unit 3 based on a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the specific frequency component of the image of the overall screen that is detected by the full screen frequency component detection unit 23 is a second value, which is smaller than the first value, or less.

Moreover, the region brightness determination unit 7 determines the emission brightness of the respective LEDs of the backlight unit 3 based on the maximum value of brightness that is detected by the region brightness maximum value detection unit 11 when the specific frequency component of the image of the overall screen that is detected by the full screen frequency component detection unit 23 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 32.

Figure 32:
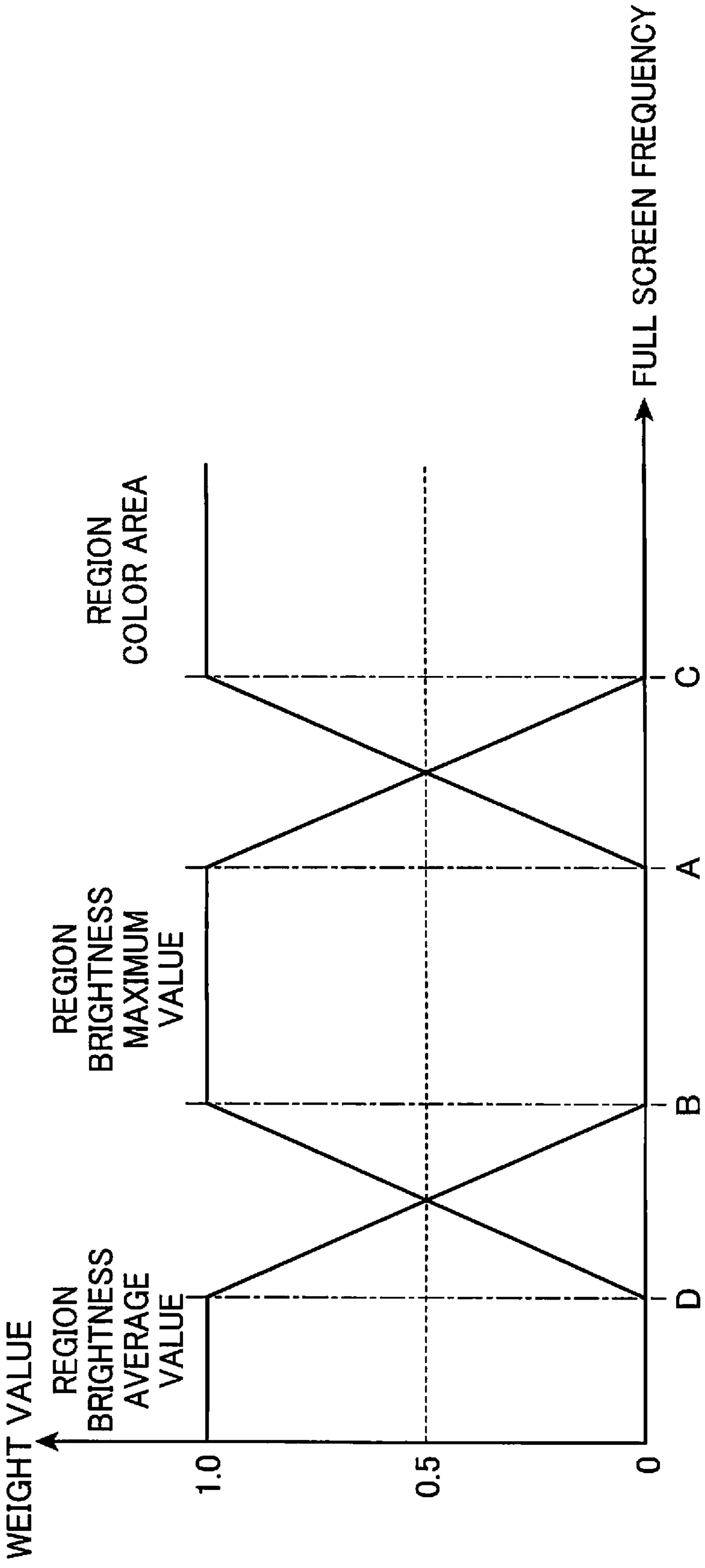
[FIG. 32]

FIG. 32 is a diagram explaining the processing of determining the region brightness to be performed by the region brightness determination unit 7 in the sixth modified example of Embodiment 2. In FIG. 32, the horizontal axis shows the specific frequency component in the full screen that is detected by the full screen characteristic amount detection unit 5, and the vertical axis shows the weight value that is multiplied to the maximum value of brightness of the image in the region, the average value of brightness of the image in the region, and the color area of a specific color in the region that were detected by the region characteristic amount detection unit 6.

As evident from FIG. 32, the region brightness determination unit 7 determines the emission brightness of the target LED of the backlight unit 3 to be the brightness corresponding to the color area of a specific color that is detected by the region color area detection unit 14 when the specific frequency component of the image of the overall screen that is detected by the full screen frequency component detection unit 23 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the specific frequency component of the image of the overall screen that is detected by the full screen frequency component detection unit 23 is the first value A or higher and smaller than the third value C. However, in the foregoing case, the specific color is, for example, white.

Here, the region brightness determination unit 7 reads from the weight value storing unit 8 the weight value in which the detected specific frequency component of the image of the overall screen and the detected color area of a specific color in the region are associated, and reads from the weight value storing unit 8 the weight value in which the detected specific frequency component of the image of the overall screen and the detected maximum value of brightness in the region are associated.

Meanwhile, the region brightness determination unit 7 determines the emission brightness of the target LED of the backlight unit 3 to be the average value of brightness that is detected by the region brightness average value detection unit 13 when the specific frequency component of the image of the overall screen that is detected by the full screen frequency component detection unit 23 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the specific frequency component of the image of the overall screen that is detected by the full screen frequency component detection unit 23 is the second value B or less and greater than the fourth value D.

Here, the region brightness determination unit 7 reads from the weight value storing unit 8 the weight value in which the detected specific frequency component of the image of the overall screen and the detected average value of brightness in the region are associated, and reads from the weight value storing unit 8 the weight value in which the detected specific frequency component of the image of the overall screen and the detected maximum value of brightness in the region are associated.

In addition, the region brightness determination unit 7 determines the emission brightness of the target LED of the backlight unit 3 to be the maximum value of brightness of the image in the region that is detected by the region brightness maximum value detection unit 11 when the specific frequency component of the image of the overall screen that is detected by the full screen frequency component detection unit 23 is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Moreover, the maximum value of brightness, the average value of brightness, and the color area of a specific color can also be used as the characteristic amount of the image of each of the divided regions, and the color area of a specific color can be used as the characteristic amount of the image of the overall screen.

The seventh modified example of Embodiment 2 which uses the maximum value of brightness, the average value of brightness, and the color area of a specific color as the characteristic amount of the image of the respective regions, and uses the color area of a specific color as the characteristic amount of the image of the overall screen is now explained.

Figure 33:
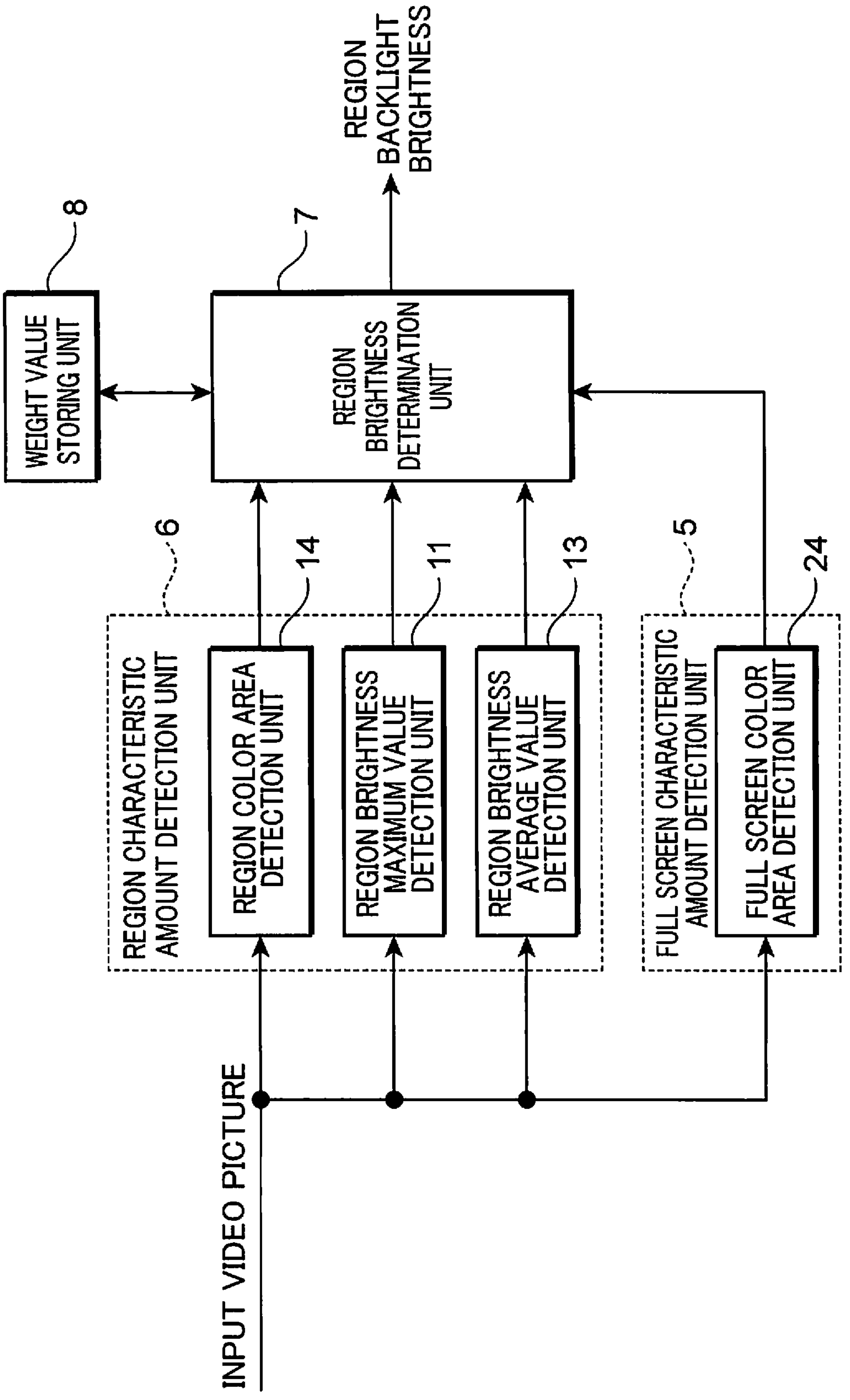
[FIG. 33]

FIG. 33 is a block diagram showing the configuration of the full screen characteristic amount detection unit and the region characteristic amount detection unit in the seventh modified example of Embodiment 2. Note that, in the seventh modified example of Embodiment 2, the configuration of the display device is the same as FIG. 18 and the explanation thereof is omitted. Moreover, in FIG. 33, the same configuration as FIG. 16 and FIG. 19 is given the same reference numeral and the explanation thereof is omitted.

As shown in FIG. 33, the region characteristic amount detection unit 6 in the seventh modified example of Embodiment 2 includes a region color area detection unit 14, a region brightness maximum value detection unit 11, and a region brightness average value detection unit 13. Moreover, as shown in FIG. 33, the full screen characteristic amount detection unit 5 in the seventh modified example of Embodiment 2 includes a frame memory (not shown) and a full screen color area detection unit 24 which detects the color area of a specific color of the image in one screen.

The weight value storing unit 8 stores in advance a plurality of weight values, which change according to a color area of a specific color, by respectively associating the weight values with the maximum value of brightness of the image in the region, the average value of brightness of the image in the region, and the area of a specific color of the image in the region.

The region brightness determination unit 7 determines the emission brightness of the respective LEDs of the backlight unit 3 based on a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the color area of a specific color of the image of the overall screen that is detected by the full screen color area detection unit 24 is a first value or higher.

Moreover, the region brightness determination unit 7 determines the emission brightness of the respective LEDs of the backlight unit 3 based on a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the color area of a specific color of the image of the overall screen that is detected by the full screen color area detection unit 24 is a second value, which is smaller than the first value, or less.

Moreover, the region brightness determination unit 7 determines the emission brightness of the respective LEDs of the backlight unit 3 based on the maximum value of brightness that is detected by the region brightness maximum value detection unit 11 when the color area of a specific color of the image of the overall screen that is detected by the full screen color area detection unit 24 is smaller than the first value and greater than the second value.

The processing of the region brightness determination unit 7 for determining the brightness of the region to be processed based on the detection results of the full screen characteristic amount detection unit 5 and the region characteristic amount detection unit 6 is now explained with reference to FIG. 34.

Figure 34:
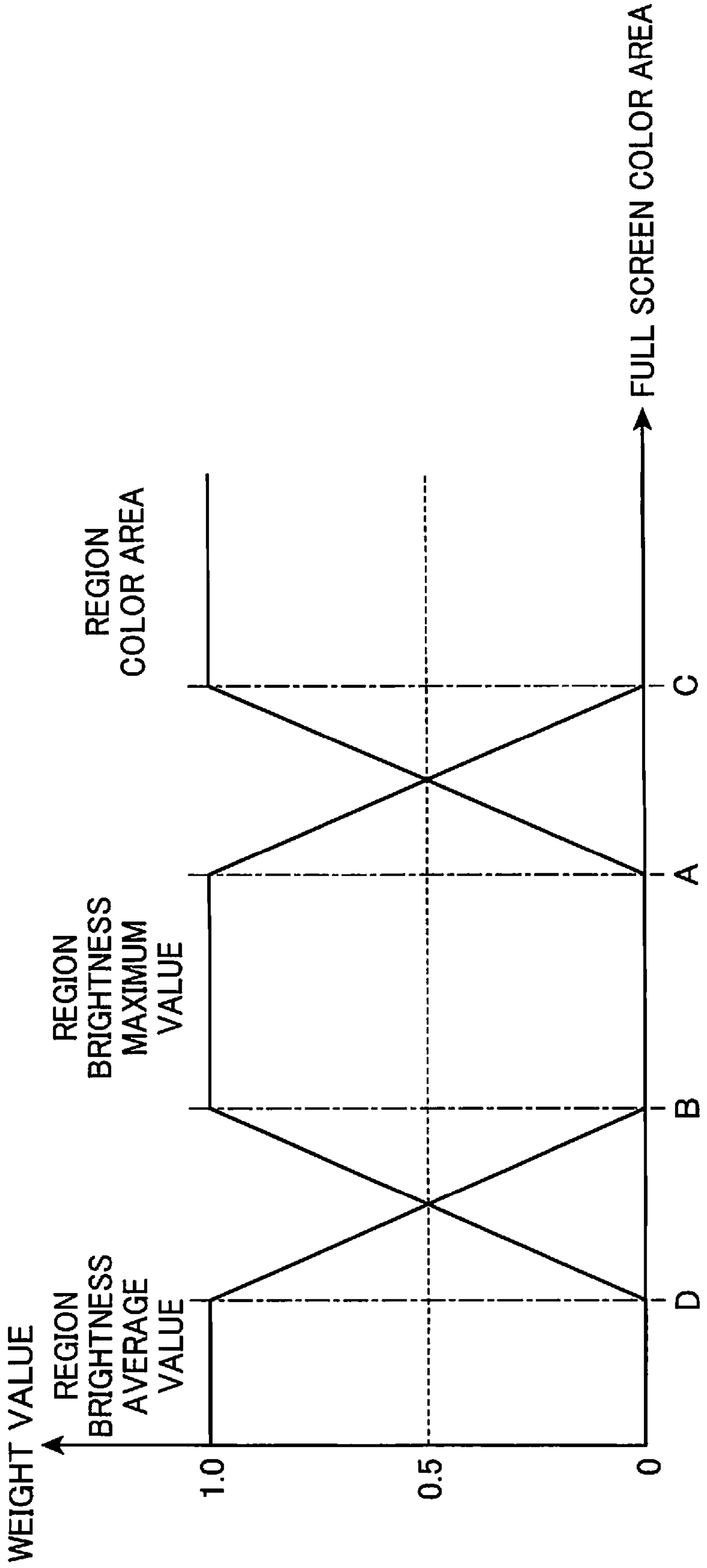
[FIG. 34]

FIG. 34 is a diagram explaining the processing of determining the region brightness to be performed by the region brightness determination unit 7 in the seventh modified example of Embodiment 2. In FIG. 34, the horizontal axis shows the color area of a specific color in the full screen that is detected by the full screen characteristic amount detection unit 5, and the vertical axis shows the weight value that is multiplied to the maximum value of brightness of the image in the region, the average value of brightness of the image in the region, and the color area of a specific color in the region that were detected by the region characteristic amount detection unit 6.

As evident from FIG. 34, the region brightness determination unit 7 determines the emission brightness of the target LED of the backlight unit 3 to be the brightness corresponding to the color area of a specific color that is detected by the region color area detection unit 14 when the color area of a specific color of the image of the overall screen that is detected by the full screen color area detection unit 24 is a third value C, which is greater than the first value A, or higher.

Moreover, the region brightness determination unit 7 determines the emission brightness of the target LED of the backlight unit 3 to be a total value of a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the color area of a specific color of the image of the overall screen that is detected by the full screen color area detection unit 24 is the first value A or higher and smaller than the third value C. In the foregoing case, the specific color used for detecting the color area in the full screen and the specific color used for detecting the color area in the region are, for example, both white.

Here, the region brightness determination unit 7 reads from the weight value storing unit 8 the weight value in which the detected color area of a specific color of the overall screen and the detected color area of a specific color in the region are associated, and reads from the weight value storing unit 8 the weight value in which the detected color area of a specific color of the overall screen and the detected maximum value of brightness in the region are associated.

Meanwhile, the region brightness determination unit 7 determines the emission brightness of the target LED of the backlight unit 3 to be the average value of brightness that is detected by the region brightness average value detection unit 13 when the color area of a specific color of the image of the overall screen that is detected by the full screen color area detection unit 24 is a fourth value D, which is smaller than the second value B, or less.

Moreover, the region brightness determination unit 7 determines the emission brightness of the target LED of the backlight unit 3 to be a total value of a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the color area of a specific color of the image of the overall screen that is detected by the full screen color area detection unit 24 is the second value B or less and greater than the fourth value D.

Here, the region brightness determination unit 7 reads from the weight value storing unit 8 the weight value in which the detected color area of a specific color of the overall screen and the detected average value of brightness in the region are associated, and reads from the weight value storing unit 8 the weight value in which the detected color area of a specific color of the overall screen and the detected maximum value of brightness in the region are associated.

In addition, the region brightness determination unit 7 determines the emission brightness of the target LED of the backlight unit 3 to be the maximum value of brightness of the image in the region that is detected by the region brightness maximum value detection unit 11 when the color area of a specific color of the image of the overall screen that is detected by the full screen color area detection unit 24 is smaller than the first value A and greater than the second value B.

Needless to say, when the specific color upon detecting the color area of the overall screen is black, the emission brightness of the LED will be the opposite value as the foregoing case when the specific color upon detecting the color area of the overall screen is white. Specifically, the region brightness determination unit 7 determines the emission brightness of the LED to be a total value of a value obtained by multiplying the weight value stored in the weight value storing unit 8 to the average value of brightness that is detected by the region brightness average value detection unit 13, and a value obtained multiplying the weight value stored in the weight value storing unit 8 to the maximum value of brightness that is detected by the region brightness maximum value detection unit 11 when the black color area of the overall screen is the first value A or higher and smaller than the third value C, determines the emission brightness of the LED to be a total value of a value obtained by multiplying the weight value stored in the weight value storing unit 8 to the brightness corresponding to the color area of a specific color that is detected by the region color area detection unit 14, and a value obtained multiplying the weight value stored in the weight value storing unit 8 to the maximum value of brightness that is detected by the region brightness maximum value detection unit 11 when the black color area of the overall screen is the second value B or less and greater than the fourth value D, and determines the emission brightness of the LED to be the maximum value of brightness that is detected by the region brightness maximum value detection unit 11 when the black color area of the overall screen is smaller than the first value A and greater than the second value B.

Since the emission brightness of each of the divided regions is determined in consideration of the characteristics of the image of the overall screen based on the foregoing processing, it is possible to inhibit the problem of black floating and insufficient brightness, and provide a video picture to the user that will not cause a visually unpleasant sensation.

Note that the processing in foregoing Embodiment 1 and Embodiment 2 is merely an example of the processing that is performed in the present invention, and the parameters other than those described above or the plurality of parameters described above are detected as the characteristic amount of the image of the overall screen and the characteristic amount of each region, and thereby the region brightness determination unit 7 can determine the emission brightness of the respective LEDs of the backlight unit 3.

Moreover, as the setting method of the weight value, setting methods other than those described above can also be used. For example, the function for determining the weight value can also be set multi-dimensionally. Moreover, as shown in Embodiment 2, the weight value of the boundary division of the minimum value of brightness and the average value of brightness, and the weight value of the boundary division of the average value of brightness and the maximum value of brightness can be changed gradually. Moreover, the weight value of the boundary division of the minimum value of brightness and the average value of brightness, and the weight value of the boundary division of the average value of brightness and the maximum value of brightness can also be clearly separated.

Moreover, the setting methods of the weight value in Embodiment 1 and Embodiment 2 are merely an example, and the order of the respective characteristic amount detection values and the ratio of the weight values can be determined arbitrarily. Moreover, it is also possible to use the average of the respective values by using the characteristic amount in the plurality of regions other than the maximum value of brightness, the minimum value of brightness, and the average value of brightness. Moreover, although the average value of brightness is used as the full screen characteristic amount to serve as the reference of the weight value, a characteristic amount other than the average value of brightness can also be used.

Figure 35:
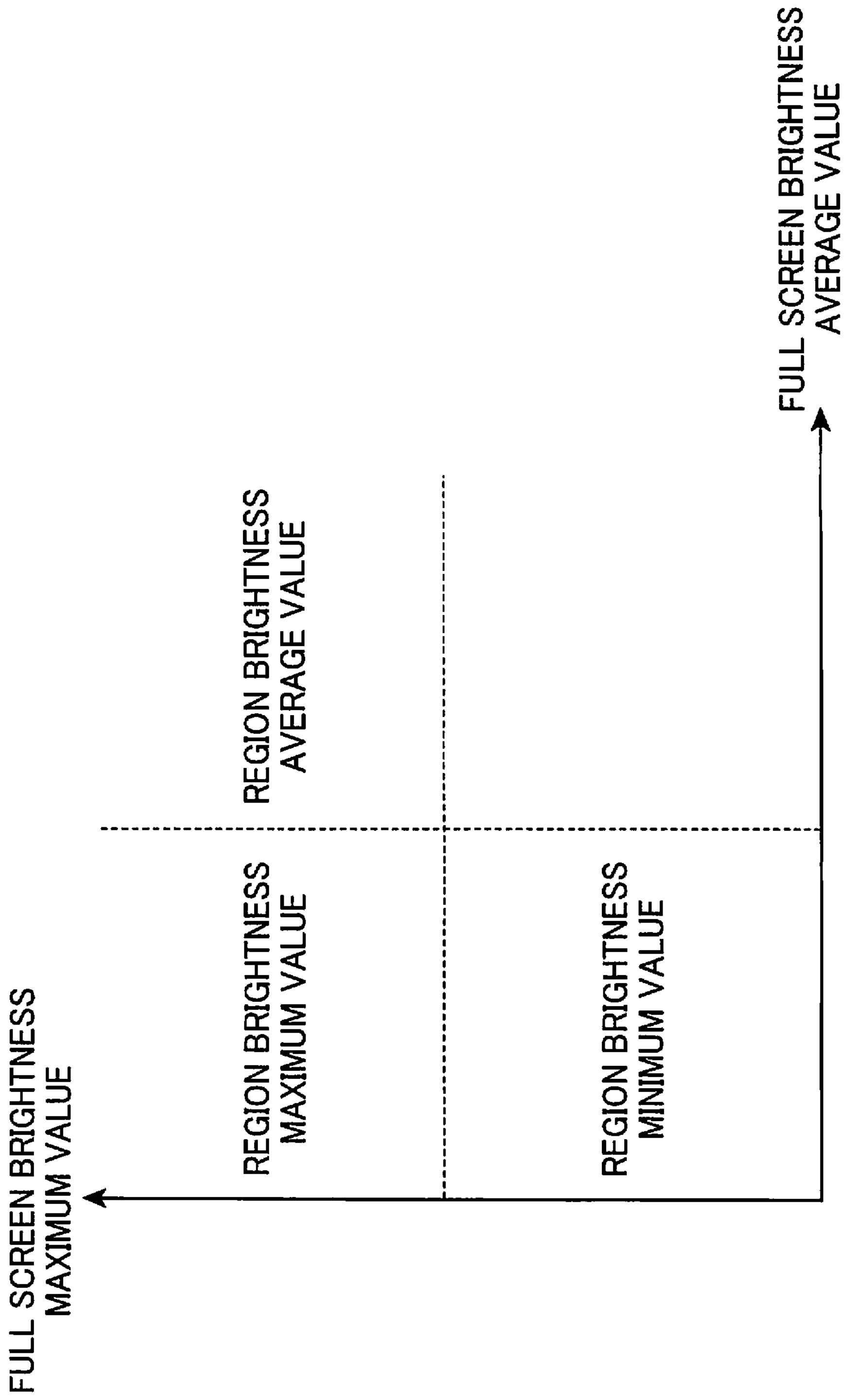
[FIG. 35]

Moreover, the method of determining the brightness in the region is not limited to the foregoing determination methods, and other methods can also be used. FIG. 35 is a diagram explaining another example of the method of determining the brightness in the region.

For example, as shown in FIG. 35, it is also possible to set the brightness in the region multi-dimensionally. In other words, the full screen characteristic amount detection unit 5 detects the average value of brightness in the full screen and the maximum value of brightness in the full screen, and the region characteristic amount detection unit 6 detects the average value of brightness of each region, the maximum value of brightness of each region, and the minimum value of brightness of each region. Furthermore, the region brightness determination unit 7 determines the emission brightness of the LED to be one among the average value of brightness of each region, the maximum value of brightness of each region, and the minimum value of brightness of each region based on the average value of brightness in the full screen and the maximum value of brightness in the full screen.

In FIG. 35, the two-dimensional space that is represented by the average value of brightness in the full screen and the maximum value of brightness in the full screen is divided into a first area for selecting the maximum value of brightness, a second area for selecting the minimum value of brightness, and a third area for selecting the average value of brightness. The region brightness determination unit 7 determines the emission brightness of the LED to be one among the average value of brightness of each region, the maximum value of brightness of each region, and the minimum value of brightness of each region upon determining whether the detected average value of brightness in the full screen and the detected maximum value of brightness in the full screen are included in the first area, the second area or the third area.

(Embodiment 3)

Figure 36B:
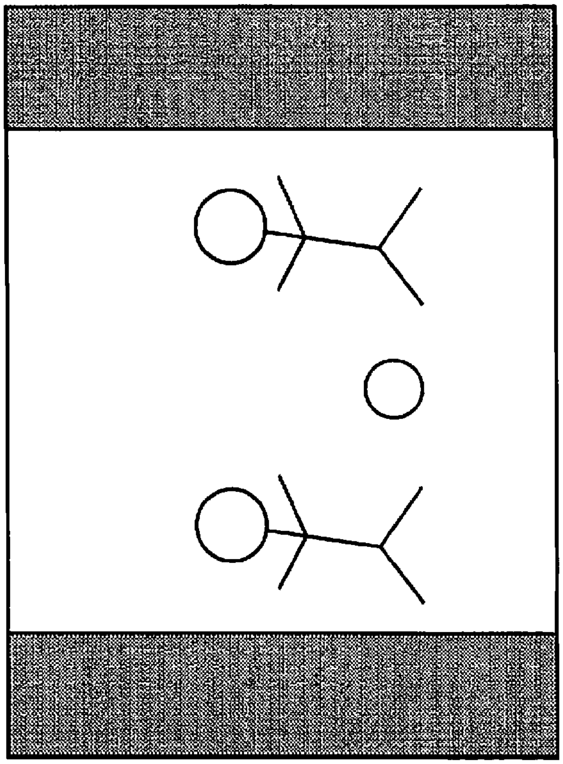
FIG. 36B is a diagram showing an example of the screen on which a side bar-type image is displayed.
Figure 36A:
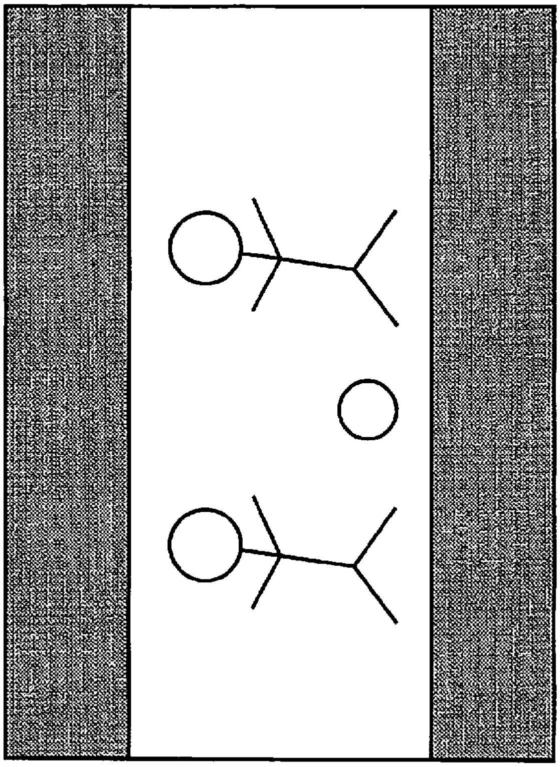
FIG. 36A is a diagram showing an example of the screen on which a letter box-type image is displayed.

The display device of Embodiment 3 is now explained with reference to FIG. 1 and FIG. 36. Embodiment 3 is applied to cases of displaying a so-called letter box-type image in which a black strip image is displayed at the upper part and lower part of the screen as shown in FIG. 36A, or to cases of displaying a so-called side bar-type image in which a black strip image is displayed at the left side and right side of the screen as shown in FIG. 36B. FIG. 36A is a diagram showing an example of the screen on which a letter box-type image is displayed, and FIG. 36B is a diagram showing an example of the screen on which a side bar-type image is displayed.

The foregoing full screen characteristic amount detection unit 5 detects, for the image of the overall screen displayed on the display panel 1, at least one among an average value of brightness, a maximum value of brightness, a minimum value of brightness, a low frequency component detection value (magnitude of low frequency component of frequency spectrum), a high frequency component detection value (magnitude of high frequency component of frequency spectrum), a dynamic range (difference between maximum value of brightness and minimum value of brightness), an average value of the maximum value of brightness and the minimum value of brightness, an area of a specific color in the region, and a variance value (value showing distribution of histogram) of brightness in the region. Nevertheless, for example, when displaying a letter box-type image or a side bar-type image, a black image is displayed in a region (black strip display region) of a part of the screen. Thus, when displaying a letter box-type image or a side bar-type image, for instance, with respect to the average value of brightness of the overall screen, the overall brightness will decrease in comparison to the case of not displaying a letter box-type image or a side bar-type image.

In the foregoing case, in a state where the letter box-type image or the side bar-type image is being displayed, if a user selects a mode of not displaying the black strip display region using a remote control or the like, since the average brightness of the overall screen will suddenly change, there is a problem in that the brightness set to the divided regions will also change.

Meanwhile, the full screen characteristic amount detection unit 5 of Embodiment 3 detects the characteristic amount of the remaining image after excluding the image of a specific region (black strip display region in a letter box-type image or a side bar-type image) from the image of the overall display panel. Note that, since the subsequent processing is the same as the processing described above, the explanation thereof is omitted.

According to the foregoing configuration, for example, when the full screen characteristic amount detection unit 5 detects the average value of brightness of the overall screen, the average brightness of the overall screen will not change substantially even when switching from a letter box-type image including a black strip display region or a side bar-type image including a black strip display region to a normal image that does not include a black strip display region. Thus, the processing method for each divided region will be the same regardless of whether it is a letter box-type image including a black strip display region, a side bar-type image including a black strip display region, or a normal image that does not include a black strip display region, and it is thereby possible to alleviate the visually unpleasant sensation that is experienced by the user caused by the sudden change in brightness.

(Embodiment 4)

Figure 37B:
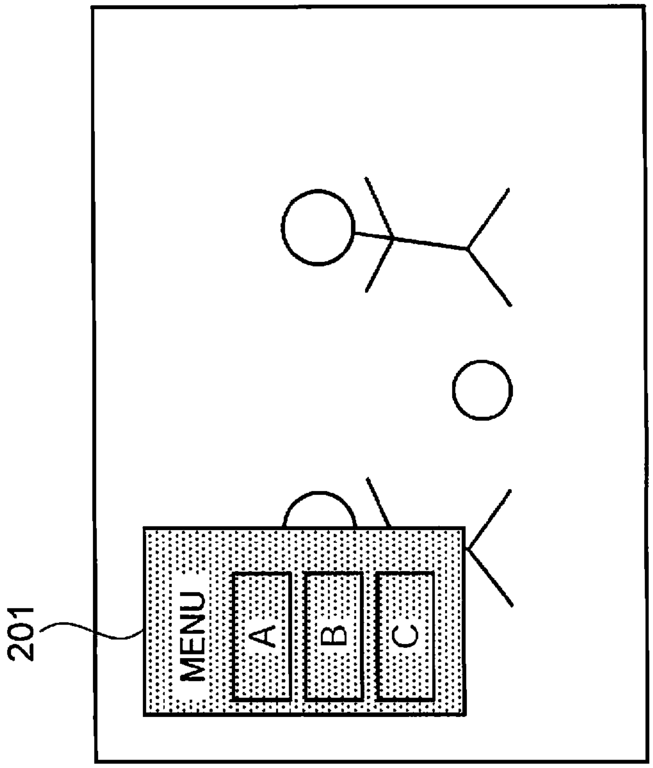
FIG. 37B is a diagram showing an example of the screen on which an operation menu is displayed in the OSD region.
Figure 37A:
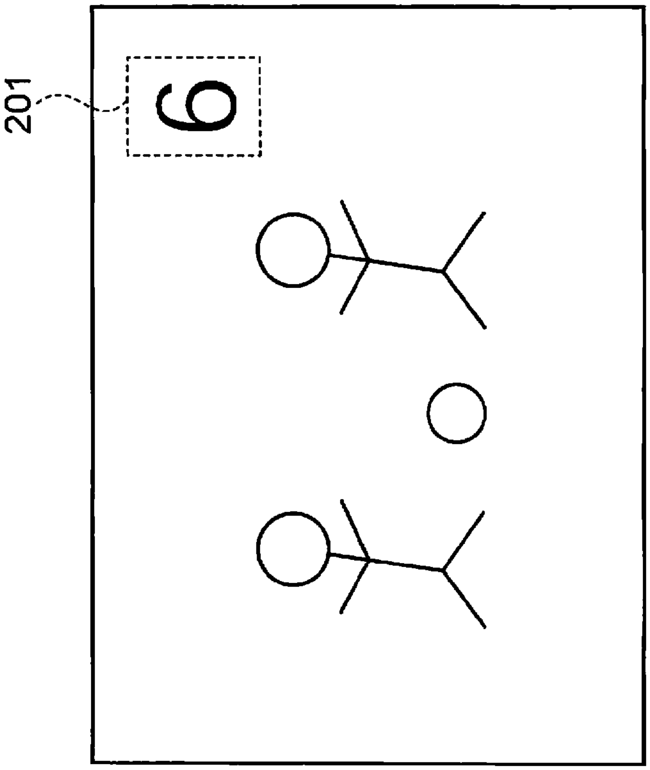
FIG. 37A is a diagram showing an example of the screen on which a channel number is displayed in the OSD region.

The display device of Embodiment 4 is now explained with reference to FIG. 37A, FIG. 37B and FIG. 38. Embodiment 4 is applied to cases of displaying a so-called OSD (On Screen Display) image as shown in FIG. 37A and FIG. 37B. Note that OSD is a function of overlapping the setting screen of the display device on the screen and accepting operations from the user, and an OSD region is the region where the setting screen for the OSD is displayed. FIG. 37A is a diagram showing an example of the screen in which a channel number is displayed in the OSD region, and FIG. 37B is a diagram showing an example of the screen in which an operation menu is displayed in the OSD region.

The foregoing region brightness determination unit 7 determines the brightness based on the detection results of the full screen characteristic amount detection unit 5 which detects the characteristic amount of the overall screen, and the region characteristic amount detection unit 6 which detects the characteristic amount of each region. Thus, for example, when an OSD region 201 as shown in FIG. 37A and FIG. 37B is displayed, the characteristic amount that is detected by the full screen characteristic amount detection unit 5 will change for each screen displaying the OSD region 201.

In the foregoing case, although it is desirable that the OSD region 201 is constantly displayed at the same brightness, there is a problem in that the emission brightness of the OSD region 201 will change due to the influence of other regions other than the OSD region 201.

Figure 38:
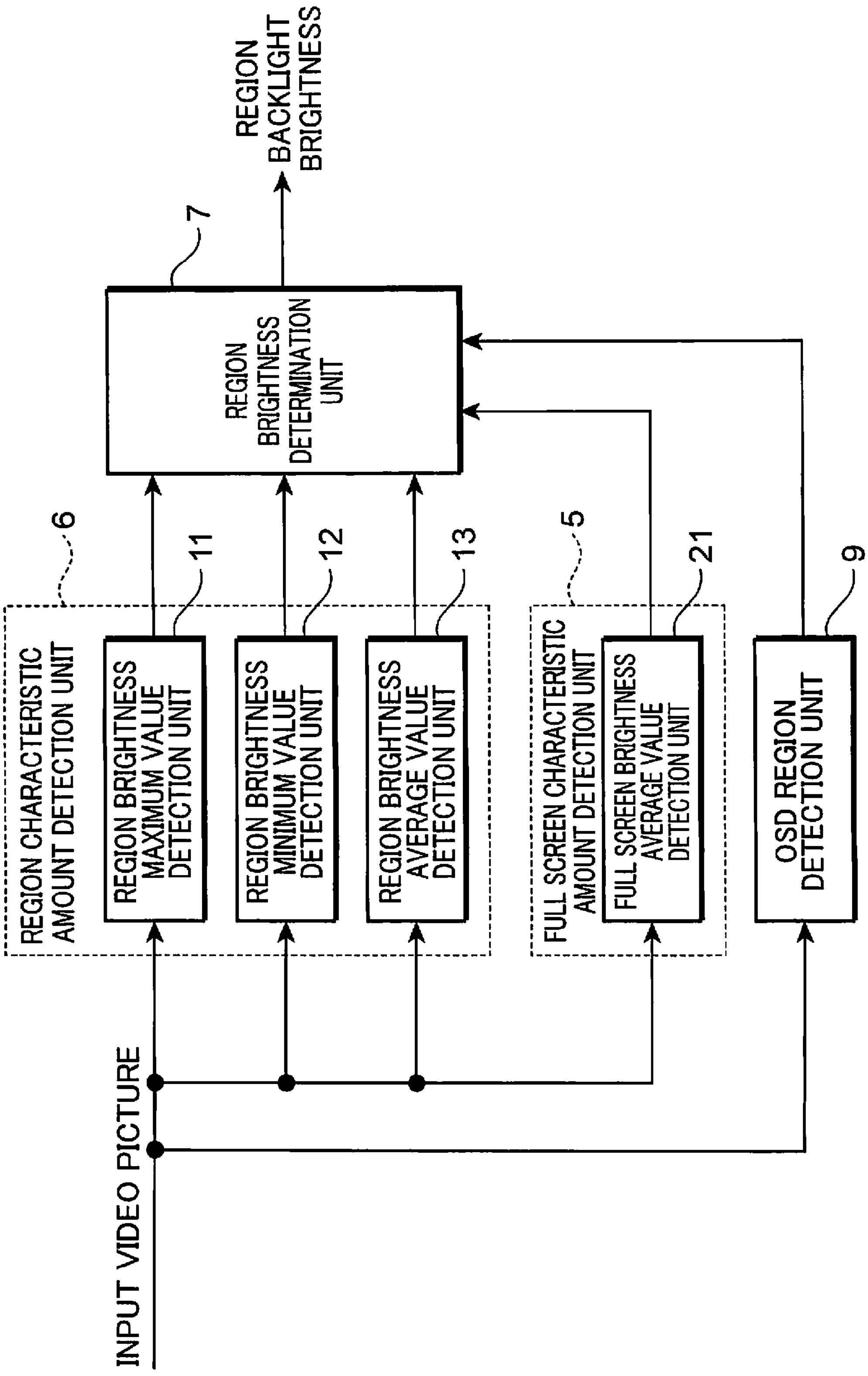
[FIG. 38]

Meanwhile, the display device of Embodiment 4 additionally comprises, as shown in FIG. 38, an OSD region detection unit 9 which detects the OSD region contained in the image to be displayed. FIG. 38 is a block diagram showing the configuration of the full screen characteristic amount detection unit and the region characteristic amount detection unit in Embodiment 4 of the present invention. Note that, in Embodiment 4, the configuration other than the OSD region detection unit 9 is the same as FIG. 1 and the explanation thereof is omitted. Moreover, in FIG. 38, the same configuration as FIG. 2 is given the same reference numeral and the explanation thereof is omitted.

When the OSD region detection unit 9 detects an OSD region in the image, it notifies the existence of an OSD region and information concerning the OSD region (for instance, position of the OSD region and size of the OSD region) to the region brightness determination unit 7. Note that, in Embodiment 4, the OSD region detection unit 9 corresponds to one example of the on-screen display region detection unit.

When the region brightness determination unit 7 is notified from the OSD region detection unit 9 of the existence of an OSD region and information concerning the OSD region, it determines the emission brightness of the LED so that the OSD region is illuminated at a fixed brightness. For example, considered may be fixing the emission brightness of the LED to the average value of brightness in the segmented region including the OSD region. Note that, since the remaining processing overlaps with the foregoing contents, the explanation thereof is omitted.

According to the foregoing configuration, for example, when the region brightness determination unit 7 determines the emission brightness of the LED of the backlight unit 3, the emission brightness of each of the divided regions is determined in consideration of the characteristic of the image of the overall screen. Thus, it becomes possible to inhibit the problems of black floating and insufficient brightness, and provide a video picture to the user which will not cause a visually unpleasant sensation. In addition, since the OSD region in the screen will be lit at a fixed brightness, it is possible to constantly display the OSD region at the same brightness.

(Embodiment 5)

Figure 39:
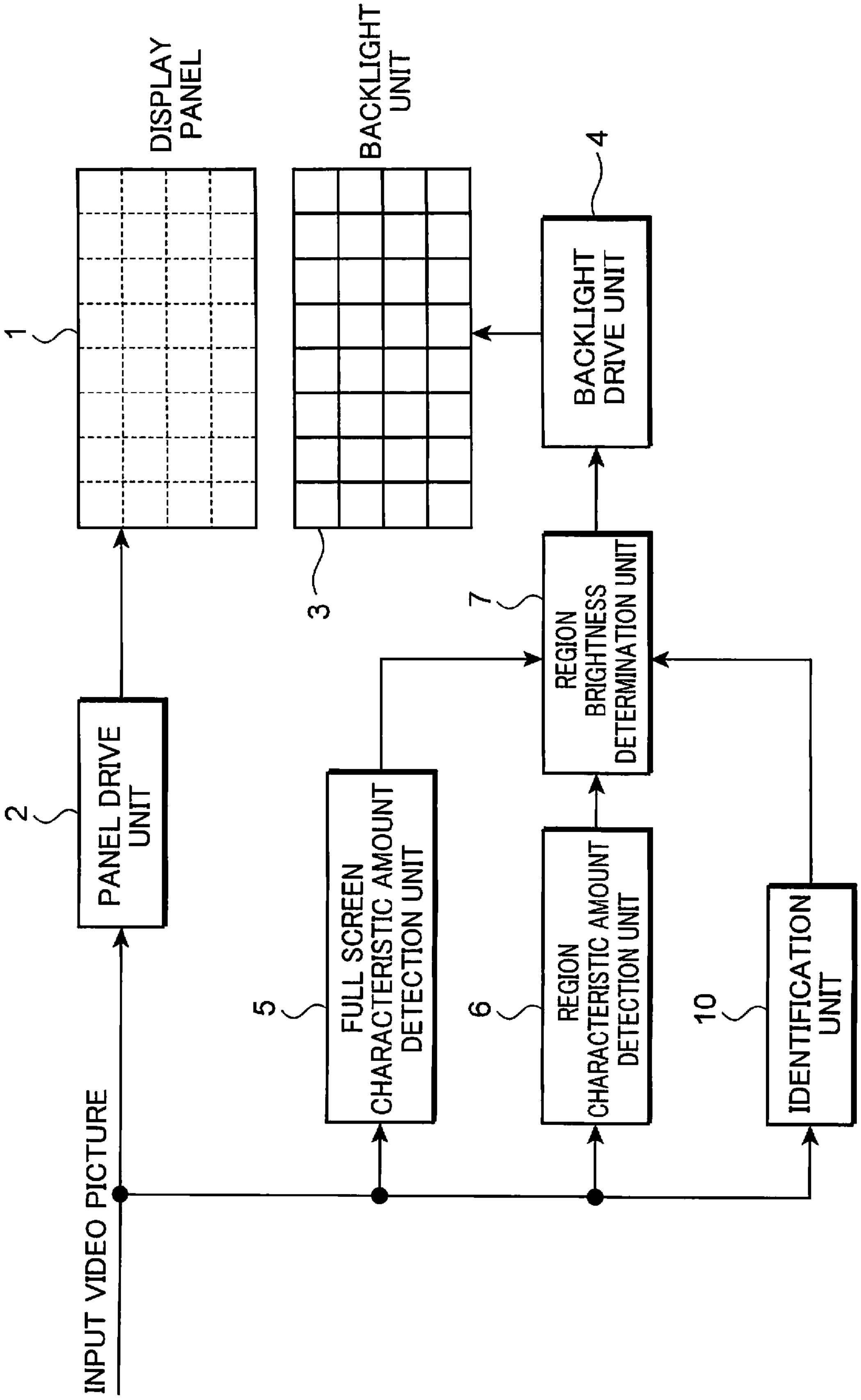
[FIG. 39]
Figure 40A:
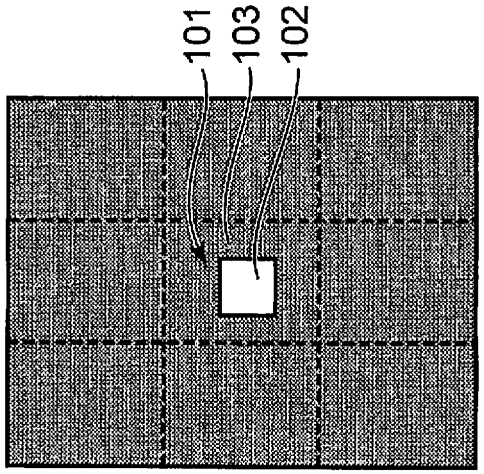
[FIG. 40]
Figure 40B:
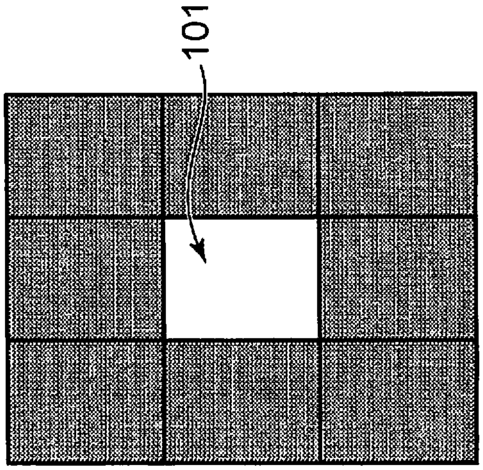
Figure 40C:
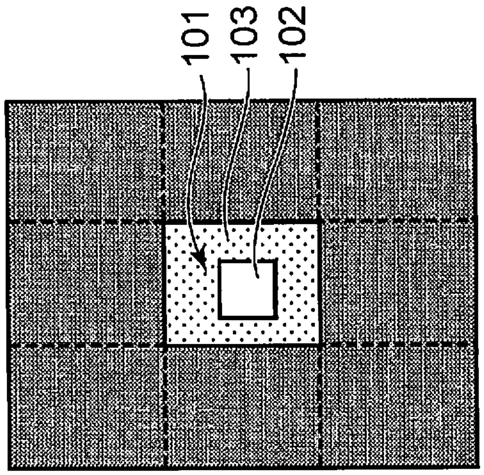
Figure 41A:
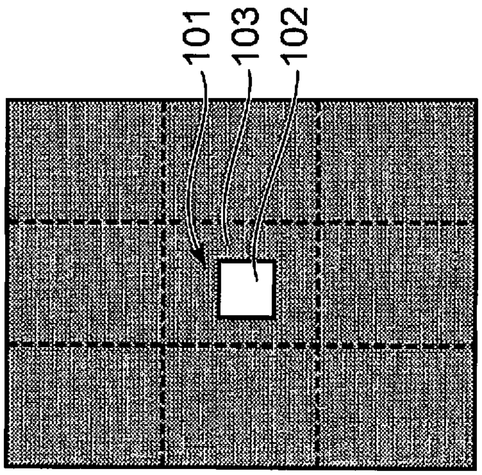
[FIG. 41]
Figure 41B:
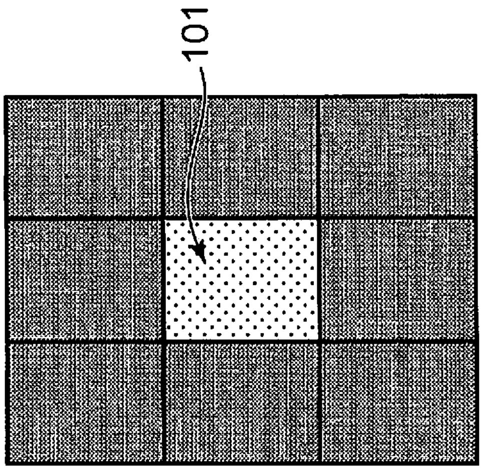
Figure 41C:
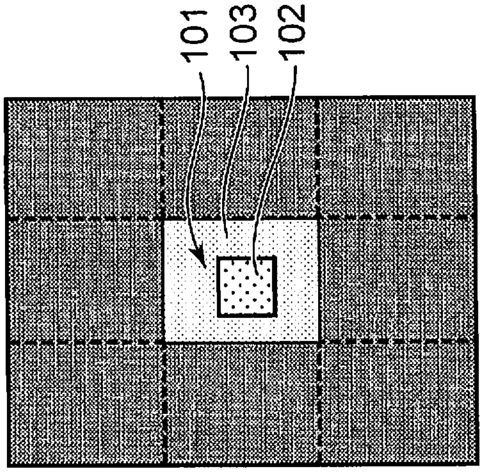

The display device of Embodiment 5 is now explained with reference to FIG. 39. As described above, in Embodiments 1 to 4, the region brightness determination unit 7 determines which characteristic amount to use among the plurality of characteristics amounts of each region that were detected by the region characteristic amount detection unit 6 by comparing the characteristic amount of the overall screen that is detected by the full screen characteristic amount detection unit 5, and predetermined thresholds (first value A, second value B, third value C and fourth value D). In the foregoing explanation, a case was explained where the predetermined thresholds (first value A, second value B, third value C and fourth value D) are a fixed value, but the present invention is not limited thereto, and it is also possible to adopt a configuration of causing the predetermined thresholds (first value A, second value B, third value C and fourth value D) to be variable.

For example, the appropriate display brightness will differ in cases where the display device is installed in a store and cases where it is installed in a home. Since the brightness of the peripheral illumination is high in cases where the display device is installed in a store, it is desirable to display the image brighter. Moreover, in cases where the display device is installed in a home, it is desirable to display the image darker in comparison to the case of installing the display device in a store.

Moreover, the appropriate display brightness will differ in cases where the type of video picture that is input is a movie, a sports program of soccer or baseball, or a news program. For example, when the type of video picture is a movie, it is desirable to display the image darker. Moreover, when the type of video picture is a sports program of soccer or baseball, it is desirable to display the image brighter.

Thus, the display device of Embodiment 5 further comprises an identification unit 10. FIG. 39 is a block diagram showing the overall configuration of the display device in Embodiment 5 of the present invention. Note that, in Embodiment 5, the configuration other than the identification unit 10 is the same as FIG. 1 and the explanation thereof is omitted.

The identification unit 10 identifies the type of video picture that has been input, and additionally identifies whether the display mode is a storefront mode where the display device is installed in a store or a normal mode where the display device is installed in a home. Note that, in Embodiment 5, the identification unit 10 corresponds to an example of the identification unit.

The region brightness determination unit 7 determines the brightness of the respective LEDs corresponding to each of the regions based on the characteristic amount of the image of each region that is detected by the region characteristic amount detection unit 6, the characteristic amount of the image of the overall display panel that is detected by the full screen characteristic amount detection unit 5, and the type of video picture that is identified by the identification unit 10. The region brightness determination unit 7 changes the predetermined thresholds (first value A, second value B, third value C and fourth value D) according to the type of video picture that is identified by the identification unit 10. It is thereby possible to determine the appropriate emission brightness of the backlight unit 3 according to the type of video picture that has been input or the display mode.

Note that the specific embodiments described above mainly include the invention having the following configurations.

The display device according to one aspect of the present invention comprises a display panel which displays a video picture, a backlight unit which is disposed on a back surface of the display panel, and which includes a plurality of light sources for each region obtained by dividing the display panel into a plurality of regions, a first detection unit which detects a characteristic amount of an image of each of the divided regions, a second detection unit which detects a characteristic amount of an image of the overall display panel, and a drive unit which determines an emission brightness of the respective light sources corresponding to each of the regions based on the characteristic amount of the image of each region that is detected by the first detection unit, and the characteristic amount of the image of the overall display panel that is detected by the second detection unit, and drives the respective light sources to emit light at the determined emission brightness.

According to the foregoing configuration, the characteristic amount of the image of each of the divided regions is detected, and the characteristic amount of the image of overall display panel is detected. In addition, the emission brightness of the respective light sources corresponding to each of the regions is determined based on the detected characteristic amount of the image of each region, and the detected characteristic amount of the image of the overall display panel, and the respective light sources are driven to emit light at the determined emission brightness.

Accordingly, since the emission brightness of the respective light sources corresponding to each of the divided regions is determined in consideration of the characteristic amount of the image of the overall screen in addition to the characteristic amount of the image of each of the divided regions, it is possible to determine the emission brightness of the light sources so as to inhibit black floating and insufficient brightness, and reduce the visually unpleasant sensation that is experienced by the user.

Moreover, in the foregoing display device, preferably, the first detection unit detects, for the image of each of the divided regions, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness.

According to the foregoing configuration, for the image of each of the divided regions, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness is detected.

Accordingly, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness can be detected as the characteristic amount of the image of the respective regions.

Moreover, in the foregoing display device, preferably, the second detection unit detects, for the image of the overall display panel, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness.

According to the foregoing configuration, for the image of the overall display panel, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness is detected.

Accordingly, at least one among an average value of brightness, a maximum value of brightness, a minimum value of brightness, a magnitude of a low frequency component of a frequency spectrum, a magnitude of a high frequency component of the frequency spectrum, a difference between the maximum value and minimum value of brightness, an average value of the maximum value and minimum value of brightness, an area of a specific color, and a variance value of brightness can be detected as the characteristic amount of the image of the overall display panel.

Moreover, in the foregoing display device, preferably, the first detection unit detects an average value of brightness, a maximum value of brightness, and a minimum value of brightness of the image in each of the divided regions, the second detection unit detects an average value of brightness of the image of the overall display panel, and the drive unit determines the emission brightness of the respective light sources based on the maximum value of brightness that is detected by the first detection unit when the average value of brightness that is detected by the second detection unit is a first value or higher, determines the emission brightness of the respective light sources based on the minimum value of brightness that is detected by the first detection unit when the average value of brightness that is detected by the second detection unit is a second value, which is smaller than the first value, or less, and determines the emission brightness of the respective light sources based on the average value of brightness that is detected by the first detection unit when the average value of brightness that is detected by the second detection unit is smaller than the first value and greater than the second value.

According to the foregoing configuration, an average value of brightness, a maximum value of brightness, and a minimum value of brightness of the image in each of the divided regions are detected, and an average value of brightness of the image of the overall display panel is detected. In addition, the emission brightness of the respective light sources is determined based on the detected maximum value of brightness of the image in the respective regions when the detected average value of brightness of the image of the overall display panel is a first value or higher. Moreover, the emission brightness of the respective light sources is determined based on the detected minimum value of brightness of the image in the respective regions when the detected average value of brightness of the image of the overall display panel is a second value, which is smaller than the first value, or less. In addition, the emission brightness of the respective light sources is determined based on the detected average value of brightness of the image in the respective regions when the detected average value of brightness of the image of the overall display panel is smaller than the first value and greater than the second value.

Accordingly, since the emission brightness of the respective light sources is determined based on one among the detected average value of brightness, maximum value of brightness, and minimum value of brightness of the image in the respective regions according to the detected average value of brightness of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a brightness, by respectively associating the weight values with an average value of brightness, a maximum value of brightness, and a minimum value of brightness, the first detection unit detects an average value of brightness, a maximum value of brightness, and a minimum value of brightness of the image in each of the divided regions, the second detection unit detects an average value of brightness of the image of the overall display panel, and the drive unit determines the emission brightness of the respective light sources based on a value obtained by multiplying the weight value stored in the storing unit by the maximum value of brightness that is detected by the first detection unit and a value obtained by multiplying the weight value stored in the storing unit by the average value of brightness that is detected by the first detection unit when the average value of brightness that is detected by the second detection unit is a first value or higher, determines the emission brightness of the respective light sources based on a value obtained by multiplying the weight value stored in the storing unit by the minimum value of brightness that is detected by the first detection unit and a value obtained by multiplying the weight value stored in the storing unit by the average value of brightness that is detected by the first detection unit when the average value of brightness that is detected by the second detection unit is a second value, which is smaller than the first value, or less, and determines the emission brightness of the respective light sources based on the average value of brightness that is detected by the first detection unit when the average value of brightness that is detected by the second detection unit is smaller than the first value and greater than the second value.

According to the foregoing configuration, a plurality of weight values, which change according to a brightness, are respectively associated with an average value of brightness, a maximum value of brightness, and a minimum value of brightness and stored in the storing unit. Furthermore, an average value of brightness, a maximum value of brightness, and a minimum value of brightness of the image in each of the divided regions are detected, and an average value of brightness of the image of the overall display panel is detected. The emission brightness of the respective light sources is determined based on a value obtained by multiplying the weight value stored in the storing unit by the detected maximum value of brightness of the image in the respective regions and a value obtained by multiplying the weight value stored in the storing unit by the detected average value of brightness of the image in the respective regions when the detected average value of brightness of the image of the overall display panel is a first value or higher. Moreover, the emission brightness of the respective light sources is determined based on a value obtained by multiplying the weight value stored in the storing unit by the detected minimum value of brightness of the image in the respective regions and a value obtained by multiplying the weight value stored in the storing unit by the detected average value of brightness of the image in the respective regions when the detected average value of brightness of the image of the overall display panel is a second value, which is smaller than the first value, or less. In addition, the emission brightness of the respective light sources is determined based on the average value of brightness of the image in the respective regions when the detected average value of brightness of the image of the overall display panel is smaller than the first value and greater than the second value.

Accordingly, since the emission brightness of the respective light sources is determined based on a value obtained by multiplying a weight value, which changes according to the brightness, to the detected average value of brightness, maximum value of brightness, and minimum value of brightness of the image in the respective regions, it is possible to determine the emission brightness in further detail.

Moreover, in the foregoing display device, preferably, the first detection unit detects an average value of brightness, a maximum value of brightness, and a minimum value of brightness of the image in each of the divided regions, the second detection unit detects a color area of a specific color of the image of the overall display panel, and the drive unit determines the emission brightness of the respective light sources based on the maximum value of brightness that is detected by the first detection unit when the color area of the specific color that is detected by the second detection unit is a first value or higher, determines the emission brightness of the respective light sources based on the minimum value of brightness that is detected by the first detection unit when the color area of the specific color that is detected by the second detection unit is a second value, which is smaller than the first value, or less, and determines the emission brightness of the respective light sources based on the average value of brightness that is detected by the first detection unit when the color area of the specific color that is detected by the second detection unit is smaller than the first value and greater than the second value.

According to the foregoing configuration, an average value of brightness, a maximum value of brightness, and a minimum value of brightness of the image in each of the divided regions are detected, and a color area of a specific color of the image of the overall display panel is detected. Furthermore, the emission brightness of the respective light sources is determined based on the detected maximum value of brightness of the image in the respective regions when the detected color area of the specific color of the image of the overall display panel is a first value or higher. Moreover, the emission brightness of the respective light sources is determined based on the detected minimum value of brightness of the image in the respective regions when the detected color area of the specific color of the image of the overall display panel is a second value, which is smaller than the first value, or less. In addition, the emission brightness of the respective light sources is determined based on the detected average value of brightness of the image in the respective regions when the detected color area of the specific color of the image of the overall display panel is smaller than the first value and greater than the second value.

Accordingly, since the emission brightness of the respective light sources is determined based on one among the detected average value of brightness, maximum value of brightness, and minimum value of brightness of the image in the respective regions according to the detected color area of the specific color of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a color area of a specific color, by respectively associating the weight values with an average value of brightness, a maximum value of brightness, and a minimum value of brightness, the first detection unit detects an average value of brightness, a maximum value of brightness, and a minimum value of brightness of the image in each of the divided regions, the second detection unit detects a color area of a specific of the image of the overall display panel, and the drive unit determines the emission brightness of the respective light sources based on a value obtained by multiplying the weight value stored in the storing unit by the maximum value of brightness that is detected by the first detection unit and a value obtained by multiplying the weight value stored in the storing unit by the average value of brightness that is detected by the first detection unit when the color area of the specific color that is detected by the second detection unit is a first value or higher, determines the emission brightness of the respective light sources based on a value obtained by multiplying the weight value stored in the storing unit by the minimum value of brightness that is detected by the first detection unit and a value obtained by multiplying the weight value stored in the storing unit by the average value of brightness that is detected by the first detection unit when the color area of the specific color that is detected by the second detection unit is a second value, which is smaller than the first value, or less, and determines the emission brightness of the respective light sources based on the average value of brightness that is detected by the first detection unit when the color area of the specific color that is detected by the second detection unit is smaller than the first value and greater than the second value.

According to the foregoing configuration, a plurality of weight values, which change according to a color area of a specific color, are respectively associated with an average value of brightness, a maximum value of brightness, and a minimum value of brightness, and stored in the storing unit. Furthermore, an average value of brightness, a maximum value of brightness, and a minimum value of brightness of the image in each of the divided regions are detected, and a color area of a specific of the image of the overall display panel is detected. The emission brightness of the respective light sources is determined based on a value obtained by multiplying the weight value stored in the storing unit by the detected maximum value of brightness of the image in the respective regions and a value obtained by multiplying the weight value stored in the storing unit by the detected average value of brightness of the image in the respective regions when the detected color area of the specific color of the image of the overall display panel is a first value or higher. Moreover, the emission brightness of the respective light sources is determined based on a value obtained by multiplying the weight value stored in the storing unit by the detected minimum value of brightness of the image in the respective regions and a value obtained by multiplying the weight value stored in the storing unit by the detected average value of brightness of the image in the respective regions when the detected color area of the specific color of the image of the overall display panel is a second value, which is smaller than the first value, or less. In addition, the emission brightness of the respective light sources is determined based on the average value of brightness of the image in the respective regions when the detected color area of the specific color of the image of the overall display panel is smaller than the first value and greater than the second value.

Accordingly, since the emission brightness of the respective light sources is determined based on a value obtained by multiplying a weight value, which changes according to a color area of a specific color, to the detected average value of brightness, maximum value of brightness, and minimum value of brightness of the image in the respective regions, it is possible to determine the emission brightness in further detail.

Moreover, in the foregoing display device, preferably, the first detection unit detects an average value of brightness, a maximum value of brightness, and a minimum value of brightness of the image in each of the divided regions, the second detection unit detects a variance value of brightness of the image of the overall display panel, and the drive unit determines the emission brightness of the respective light sources based on the maximum value of brightness that is detected by the first detection unit when the variance value that is detected by the second detection unit is a first value or higher, determines the emission brightness of the respective light sources based on the minimum value of brightness that is detected by the first detection unit when the variance value that is detected by the second detection unit is a second value, which is smaller than the first value, or less, and determines the emission brightness of the respective light sources based on the average value of brightness that is detected by the first detection unit when the variance value that is detected by the second detection unit is smaller than the first value and greater than the second value.

According to the foregoing configuration, an average value of brightness, a maximum value of brightness, and a minimum value of brightness of the image in each of the divided regions are detected, and a variance value of brightness of the image of the overall display panel is detected. Furthermore, the emission brightness of the respective light sources is determined based on the detected maximum value of brightness of the image in the respective regions when the detected variance value of the image of the overall display panel is a first value or higher. Moreover, the emission brightness of the respective light sources is determined based on the detected minimum value of brightness of the image in the respective regions when the detected variance value of the image of the overall display panel is a second value, which is smaller than the first value, or less. In addition, the emission brightness of the respective light sources is determined based on the detected average value of brightness of the image in the respective regions when the detected variance value of the image of the overall display panel is smaller than the first value and greater than the second value.

Accordingly, since the emission brightness of the respective light sources is determined based on one among the detected average value of brightness, maximum value of brightness, and minimum value of brightness of the image in the respective regions according to the detected variance value of brightness of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a variance value of brightness, by respectively associating the weight values with an average value of brightness, a maximum value of brightness, and a minimum value of brightness, the first detection unit detects an average value of brightness, a maximum value of brightness, and a minimum value of brightness of the image in each of the divided regions, the second detection unit detects a variance value of brightness of the image of the overall display panel, and the drive unit determines the emission brightness of the respective light sources based on a value obtained by multiplying the weight value stored in the storing unit by the maximum value of brightness that is detected by the first detection unit and a value obtained by multiplying the weight value stored in the storing unit by the average value of brightness that is detected by the first detection unit when the variance value that is detected by the second detection unit is a first value or higher, determines the emission brightness of the respective light sources based on a value obtained by multiplying the weight value stored in the storing unit by the minimum value of brightness that is detected by the first detection unit and a value obtained by multiplying the weight value stored in the storing unit by the average value of brightness that is detected by the first detection unit when the variance value that is detected by the second detection unit is a second value, which is smaller than the first value, or less, and determines the emission brightness of the respective light sources based on the average value of brightness that is detected by the first detection unit when the variance value that is detected by the second detection unit is smaller than the first value and greater than the second value.

According to the foregoing configuration, a plurality of weight values, which change according to a variance value of brightness, are respectively associated with an average value of brightness, a maximum value of brightness, and a minimum value of brightness, and stored in the storing unit. Furthermore, an average value of brightness, a maximum value of brightness, and a minimum value of brightness of the image in each of the divided regions are detected, and a variance value of brightness of the image of the overall display panel is detected. The emission brightness of the respective light sources is determined based on a value obtained by multiplying the weight value stored in the storing unit by the detected maximum value of brightness of the image in the respective regions and a value obtained by multiplying the weight value stored in the storing unit by the detected average value of brightness of the image in the respective regions when the detected variance value of the image of the overall display panel is a first value or higher. Moreover, the emission brightness of the respective light sources is determined based on a value obtained by multiplying the weight value stored in the storing unit by the detected minimum value of brightness of the image in the respective regions and a value obtained by multiplying the weight value stored in the storing unit by the detected average value of brightness of the image in the respective regions when the detected variance value of the image of the overall display panel is a second value, which is smaller than the first value, or less. In addition, the emission brightness of the respective light sources is determined based on the detected average value of brightness of the image in the respective regions when the detected variance value of the image of the overall display panel is smaller than the first value and greater than the second value.

Accordingly, since the emission brightness of the respective light sources is determined based on a value obtained by multiplying a weight value, which changes according to a variance value of brightness, to the detected average value of brightness, maximum value of brightness, and minimum value of brightness of the image in the respective regions, it is possible to determine the emission brightness in further detail.

Moreover, in the foregoing display device, preferably, the first detection unit detects an average value of brightness, a maximum value of brightness, and a minimum value of brightness of the image in each of the divided regions, the second detection unit detects a specific spatial frequency component of the image of the overall display panel, and the drive unit determines the emission brightness of the respective light sources based on the maximum value of brightness that is detected by the first detection unit when the specific spatial frequency component that is detected by the second detection unit is a first value or higher, determines the emission brightness of the respective light sources based on the minimum value of brightness that is detected by the first detection unit when the specific spatial frequency component that is detected by the second detection unit is a second value, which is smaller than the first value, or less, and determines the emission brightness of the respective light sources based on the average value of brightness that is detected by the first detection unit when the specific spatial frequency component that is detected by the second detection unit is smaller than the first value and greater than the second value.

According to the foregoing configuration, an average value of brightness, a maximum value of brightness, and a minimum value of brightness of the image in each of the divided regions are detected, and a specific spatial frequency component of the image of the overall display panel is detected. Furthermore, the emission brightness of the respective light sources is determined based on the detected maximum value of brightness of the image in the respective regions when the detected specific spatial frequency component of the image of the overall display panel is a first value or higher. Moreover, the emission brightness of the respective light sources is determined based on the detected minimum value of brightness of the image in the respective regions when the detected specific spatial frequency component of the image of the overall display panel is a second value, which is smaller than the first value, or less. In addition, the emission brightness of the respective light sources is determined based on the detected average value of brightness of the image in the respective regions when the detected specific spatial frequency component of the image of the overall display panel is smaller than the first value and greater than the second value.

Accordingly, since the emission brightness of the respective light sources is determined based on one among the detected average value of brightness, maximum value of brightness, and minimum value of brightness of the image in the respective regions according to the detected specific spatial frequency component of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a specific spatial frequency component, by respectively associating the weight values with an average value of brightness, a maximum value of brightness, and a minimum value of brightness, the first detection unit detects an average value of brightness, a maximum value of brightness, and a minimum value of brightness of the image in each of the divided regions, the second detection unit detects a specific spatial frequency component of the image of the overall display panel, and the drive unit determines the emission brightness of the respective light sources based on a value obtained by multiplying the weight value stored in the storing unit by the maximum value of brightness that is detected by the first detection unit and a value obtained by multiplying the weight value stored in the storing unit by the average value of brightness that is detected by the first detection unit when the specific spatial frequency component that is detected by the second detection unit is a first value or higher, determines the emission brightness of the respective light sources based on a value obtained by multiplying the weight value stored in the storing unit by the minimum value of brightness that is detected by the first detection unit and a value obtained by multiplying the weight value stored in the storing unit by the average value of brightness that is detected by the first detection unit when the specific spatial frequency component that is detected by the second detection unit is a second value, which is smaller than the first value, or less, and determines the emission brightness of the respective light sources based on the average value of brightness that is detected by the first detection unit when the specific spatial frequency component that is detected by the second detection unit is smaller than the first value and greater than the second value.

According to the foregoing configuration, a plurality of weight values, which change according to a specific spatial frequency component, are respectively associated with an average value of brightness, a maximum value of brightness, and a minimum value of brightness, and stored in the storing unit. Furthermore, an average value of brightness, a maximum value of brightness, and a minimum value of brightness of the image in each of the divided regions are detected, and a specific spatial frequency component of the image of the overall display panel is detected. The emission brightness of the respective light sources is determined based on a value obtained by multiplying the weight value stored in the storing unit by the detected maximum value of brightness of the image in the respective regions and a value obtained by multiplying the weight value stored in the storing unit by the detected average value of brightness of the image in the respective regions when the detected specific spatial frequency component of the image of the overall display panel is a first value or higher. Moreover, the emission brightness of the respective light sources is determined based on a value obtained by multiplying the weight value stored in the storing unit by the detected minimum value of brightness of the image in the respective regions and a value obtained by multiplying the weight value stored in the storing unit by the detected average value of brightness of the image in the respective regions when the detected specific spatial frequency component of the image of the overall display panel is a second value, which is smaller than the first value, or less. In addition, the emission brightness of the respective light sources is determined based on the detected average value of brightness of the image in the respective regions when the detected specific spatial frequency component of the image of the overall display panel is smaller than the first value and greater than the second value.

Accordingly, since the emission brightness of the respective light sources is determined based on a value obtained by multiplying a weight value, which changes according to a specific spatial frequency component, to the detected average value of brightness, maximum value of brightness, and minimum value of brightness of the image in the respective regions, it is possible to determine the emission brightness in further detail.

Moreover, in the foregoing display device, preferably, the first detection unit detects an average value of brightness, a maximum value of brightness, and a color area of a specific color of the image in each of the divided regions, the second detection unit detects an average value of brightness of the image of the overall display panel, and the drive unit determines the emission brightness of the respective light sources based on the brightness according to the color area of the specific color that is detected by the first detection unit when the average value of brightness that is detected by the second detection unit is a first value or higher, determines the emission brightness of the respective light sources based on the average value of brightness that is detected by the first detection unit when the average value of brightness that is detected by the second detection unit is a second value, which is smaller than the first value, or less, and determines the emission brightness of the respective light sources based on the maximum value of brightness that is detected by the first detection unit when the average value of brightness that is detected by the second detection unit is smaller than the first value and greater than the second value.

According to the foregoing configuration, an average value of brightness, a maximum value of brightness, and a color area of a specific color of the image in each of the divided regions are detected, and an average value of brightness of the image of the overall display panel is detected. Furthermore, the emission brightness of the respective light sources is determined based on the brightness according to the detected color area of the specific color of the image in the respective regions when the detected average value of brightness of the image of the overall display panel is a first value or higher. Moreover, the emission brightness of the respective light sources is determined based on the detected average value of brightness of the image in the respective regions when the detected average value of brightness of the image of the overall display panel is a second value, which is smaller than the first value, or less. In addition, the emission brightness of the respective light sources is determined based on the detected maximum value of brightness of the image in the respective regions when the average value of brightness of the image of the overall display panel is smaller than the first value and greater than the second value.

Accordingly, since the emission brightness of the respective light sources is determined based on one among the detected average value of brightness, maximum value of brightness, and color area of a specific color of the image in the respective regions according to the detected average value of brightness of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device comprises a storing unit which stores a plurality of weight values, which change according to a brightness, by respectively associating the weight values with an average value of brightness, a maximum value of brightness, and a color area of a specific color, the first detection unit detects an average value of brightness, a maximum value of brightness, and a color area of a specific color of the image in each of the divided regions, the second detection unit detects an average value of brightness of the image of the overall display panel, and wherein the drive unit determines the emission brightness of the respective light sources based on a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the average value of brightness that is detected by the second detection unit is a first value or higher, determines the emission brightness of the respective light sources based on a value obtained by multiplying the weight value stored in the storing unit by the average value of brightness that is detected by the first detection unit and a value obtained by multiplying the weight value stored in the storing unit by the maximum value of brightness that is detected by the first detection unit when the average value of brightness that is detected by the second detection unit is a second value, which is smaller than the first value, or less, and determines the emission brightness of the respective light sources based on the maximum value of brightness that is detected by the first detection unit when the average value of brightness that is detected by the second detection unit is smaller than the first value and greater than the second value.

According to the foregoing configuration, a plurality of weight values, which change according to a brightness, are respectively associated with an average value of brightness, a maximum value of brightness, and a color area of a specific color, and stored in the storing unit. Furthermore, an average value of brightness, a maximum value of brightness, and a color area of a specific color of the image in each of the divided regions are detected, and an average value of brightness of the image of the overall display panel is detected. The emission brightness of the respective light sources is determined based on a value obtained by multiplying the weight value stored in the storing unit by the brightness according to the detected color area of the specific color of the image in the respective regions and a value obtained by multiplying the weight value stored in the storing unit by the detected maximum value of brightness of the image in the respective regions when the detected average value of brightness of the image of the overall display panel is a first value or higher. Moreover, the emission brightness of the respective light sources is determined based on a value obtained by multiplying the weight value stored in the storing unit by the detected average value of brightness of the image in the respective regions and a value obtained by multiplying the weight value stored in the storing unit by the detected maximum value of brightness of the image in the respective regions when the detected average value of brightness of the image of the overall display panel is a second value, which is smaller than the first value, or less. In addition, the emission brightness of the respective light sources is determined based on the detected maximum value of brightness of the image in the respective regions when the detected average value of brightness of the image of the overall display panel is smaller than the first value and greater than the second value.

Accordingly, since the emission brightness of the respective light sources is determined based on a value obtained by multiplying a weight value, which changes according to the brightness, to the detected average value of brightness, maximum value of brightness, and color area of a specific color of the image in the respective regions, it is possible to determine the emission brightness in further detail.

Moreover, in the foregoing display device, preferably, the first detection unit detects an average value of brightness, a maximum value of brightness, and a color area of a specific color of the image in each of the divided regions, the second detection unit detects a color area of a specific color of the image of the overall display panel, and the drive unit determines the emission brightness of the respective light sources based on the brightness according to the color area of the specific color that is detected by the first detection unit when the color area of the specific color that is detected by the second detection unit is a first value or higher, determines the emission brightness of the respective light sources based on the average value of brightness that is detected by the first detection unit when the color area of the specific color that is detected by the second detection unit is a second value, which is smaller than the first value, or less, and determines the emission brightness of the respective light sources based on the maximum value of brightness that is detected by the first detection unit when the color area of the specific color that is detected by the second detection unit is smaller than the first value and greater than the second value.

According to the foregoing configuration, an average value of brightness, a maximum value of brightness, and a color area of a specific color of the image in each of the divided regions are detected, and a color area of a specific color of the image of the overall display panel is detected. Furthermore, the emission brightness of the respective light sources is determined based on the brightness according to the detected color area of the specific color of the image in the respective regions when the detected color area of the specific color of the image of the overall display panel is a first value or higher. Moreover, the emission brightness of the respective light sources is determined based on the detected average value of brightness of the image in the respective regions when the detected color area of the specific color of the image of the overall display panel is a second value, which is smaller than the first value, or less. In addition, the emission brightness of the respective light sources is determined based on the detected maximum value of brightness of the image in the respective regions when the detected color area of the specific color of the image of the overall display panel is smaller than the first value and greater than the second value.

Accordingly, since the emission brightness of the respective light sources is determined based on one among the detected average value of brightness, maximum value of brightness, and color area of a specific color of the image in the respective regions according to the detected color area of the specific color of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a color area of a specific color, by respectively associating the weight values with an average value of brightness, a maximum value of brightness, and a color area of a specific color, the first detection unit detects an average value of brightness, a maximum value of brightness, and a color area of a specific color of the image in each of the divided regions, the second detection unit detects a color area of a specific color of the image of the overall display panel, and the drive unit determines the emission brightness of the respective light sources based on a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the color area of the specific color that is detected by the second detection unit is a first value or higher, determines the emission brightness of the respective light sources based on a value obtained by multiplying the weight value stored in the storing unit by the average value of brightness that is detected by the first detection unit and a value obtained by multiplying the weight value stored in the storing unit by the maximum value of brightness that is detected by the first detection unit when the color area of the specific color that is detected by the second detection unit is a second value, which is smaller than the first value, or less, and determines the emission brightness of the respective light sources based on the maximum value of brightness that is detected by the first detection unit when the color area of the specific color that is detected by the second detection unit is smaller than the first value and greater than the second value.

According to the foregoing configuration, a plurality of weight values, which change according to a color area of a specific color, are respectively associated with an average value of brightness, a maximum value of brightness, and a color area of a specific color, and stored in the storing unit. Furthermore, an average value of brightness, a maximum value of brightness, and a color area of a specific color of the image in each of the divided regions are detected, and a color area of a specific color of the image of the overall display panel is detected. The emission brightness of the respective light sources is determined based on a value obtained by multiplying the weight value stored in the storing unit by the brightness according to the detected color area of the specific color of the image in the respective regions and a value obtained by multiplying the weight value stored in the storing unit by the detected maximum value of brightness of the image in the respective regions when the detected color area of the specific color of the image of the overall display panel is a first value or higher. Moreover, the emission brightness of the respective light sources is determined based on a value obtained by multiplying the weight value stored in the storing unit by the detected average value of brightness of the image in the respective regions and a value obtained by multiplying the weight value stored in the storing unit by the detected maximum value of brightness of the image in the respective regions when the detected color area of the specific color of the image of the overall display panel is a second value, which is smaller than the first value, or less. In addition, the emission brightness of the respective light sources is determined based on the detected maximum value of brightness of the image in the respective regions when the detected color area of the specific color of the image of the overall display panel is smaller than the first value and greater than the second value.

Accordingly, since the emission brightness of the respective light sources is determined based on a value obtained by multiplying a weight value, which changes according to the color area of a specific color, to the detected average value of brightness, maximum value of brightness, and color area of a specific color of the image in the respective regions, it is possible to determine the emission brightness in further detail.

Moreover, in the foregoing display device, preferably, the first detection unit detects an average value of brightness, a maximum value of brightness, and a color area of a specific color of the image in each of the divided regions, the second detection unit detects a variance value of brightness of the image of the overall display panel, and the drive unit determines the emission brightness of the respective light sources based on the brightness according to the color area of the specific color that is detected by the first detection unit when the variance value that is detected by the second detection unit is a first value or higher, determines the emission brightness of the respective light sources based on the average value of brightness that is detected by the first detection unit when the variance value that is detected by the second detection unit is a second value, which is smaller than the first value, or less, and determines the emission brightness of the respective light sources based on the maximum value of brightness that is detected by the first detection unit when the variance value that is detected by the second detection unit is smaller than the first value and greater than the second value.

According to the foregoing configuration, an average value of brightness, a maximum value of brightness, and a color area of a specific color of the image in each of the divided regions are detected, and a variance value of brightness of the image of the overall display panel is detected. Furthermore, the emission brightness of the respective light sources is determined based on the brightness according to the detected color area of the specific color of the image in the respective regions when the variance value of the image of the overall display panel is a first value or higher. Moreover, the emission brightness of the respective light sources is determined based on the detected average value of brightness of the image in the respective regions when the detected variance value of the image of the overall display panel is a second value, which is smaller than the first value, or less. In addition, the emission brightness of the respective light sources is determined based on the detected maximum value of brightness of the image in the respective regions when the detected variance value of the image of the overall display panel is smaller than the first value and greater than the second value.

Accordingly, since the emission brightness of the respective light sources is determined based on one among the detected average value of brightness, maximum value of brightness, and color area of a specific color of the image in the respective regions according to the detected variance value of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a variance value of brightness, by respectively associating the weight values with an average value of brightness, a maximum value of brightness, and a color area of a specific color, the first detection unit detects an average value of brightness, a maximum value of brightness, and a color area of a specific color of the image in each of the divided regions, the second detection unit detects a variance value of brightness of the image of the overall display panel, and the drive unit determines the emission brightness of the respective light sources based on a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the variance value that is detected by the second detection unit is a first value or higher, determines the emission brightness of the respective light sources based on a value obtained by multiplying the weight value stored in the storing unit by the average value of brightness that is detected by the first detection unit and a value obtained by multiplying the weight value stored in the storing unit by the maximum value of brightness that is detected by the first detection unit when the variance value that is detected by the second detection unit is a second value, which is smaller than the first value, or less, and determines the emission brightness of the respective light sources based on the maximum value of brightness that is detected by the first detection unit when the variance value that is detected by the second detection unit is smaller than the first value and greater than the second value.

According to the foregoing configuration, a plurality of weight values, which change according to a variance value of brightness, are respectively associated with an average value of brightness, a maximum value of brightness, and a color area of a specific color, and stored in the storing unit. Furthermore, an average value of brightness, a maximum value of brightness, and a color area of a specific color of the image in each of the divided regions are detected, and a variance value of brightness of the image of the overall display panel is detected. The emission brightness of the respective light sources is determined based on a value obtained by multiplying the weight value stored in the storing unit by the brightness according to the detected color area of the specific color of the image in the respective regions and a value obtained by multiplying the weight value stored in the storing unit by the detected maximum value of brightness of the image in the respective regions when the detected variance value of the image of the overall display panel is a first value or higher. Moreover, the emission brightness of the respective light sources is determined based on a value obtained by multiplying the weight value stored in the storing unit by the detected average value of brightness of the image in the respective regions and a value obtained by multiplying the weight value stored in the storing unit by the detected maximum value of brightness of the image in the respective regions when the detected variance value of the image of the overall display panel is a second value, which is smaller than the first value, or less. In addition, the emission brightness of the respective light sources is determined based on the detected maximum value of brightness of the image in the respective regions when the detected variance value of the image of the overall display panel is smaller than the first value and greater than the second value.

Accordingly, since the emission brightness of the respective light sources is determined based on a value obtained by multiplying a weight value, which changes according to the variance value of brightness, to the detected average value of brightness, maximum value of brightness, and color area of a specific color of the image in the respective regions, it is possible to determine the emission brightness in further detail.

Moreover, in the foregoing display device, preferably, the first detection unit detects an average value of brightness, a maximum value of brightness, and a color area of a specific color of the image in each of the divided regions, the second detection unit detects a specific spatial frequency component of the image of the overall display panel, and the drive unit determines the emission brightness of the respective light sources based on the brightness according to the color area of the specific color that is detected by the first detection unit when the specific spatial frequency component that is detected by the second detection unit is a first value or higher, determines the emission brightness of the respective light sources based on the average value of brightness that is detected by the first detection unit when the specific spatial frequency component that is detected by the second detection unit is a second value, which is smaller than the first value, or less, and determines the emission brightness of the respective light sources based on the maximum value of brightness that is detected by the first detection unit when the specific spatial frequency component that is detected by the second detection unit is smaller than the first value and greater than the second value.

According to the foregoing configuration, an average value of brightness, a maximum value of brightness, and a color area of a specific color of the image in each of the divided regions are detected, and a specific spatial frequency component of the image of the overall display panel is detected. Furthermore, the emission brightness of the respective light sources is determined based on the brightness according to the detected color area of the specific color of the image in the respective regions when the specific spatial frequency component of the image of the overall display panel is a first value or higher. Moreover, the emission brightness of the respective light sources is determined based on the detected average value of brightness of the image in the respective regions when the detected specific spatial frequency component of the image of the overall display panel is a second value, which is smaller than the first value, or less. In addition, the emission brightness of the respective light sources is determined based on the detected maximum value of brightness of the image in the respective regions when the detected specific spatial frequency component of the image of the overall display panel is smaller than the first value and greater than the second value.

Accordingly, since the emission brightness of the respective light sources is determined based on one among the detected average value of brightness, maximum value of brightness, and color area of a specific color of the image in the respective regions according to the detected specific spatial frequency component of the image of the overall display panel, it is possible to determine the emission brightness of the respective light sources so as to inhibit black floating and insufficient brightness, and reduce the visually unpleasant sensation that is experienced by the user.

Moreover, in the foregoing display device, preferably, the display device further comprises a storing unit which stores a plurality of weight values, which change according to a specific spatial frequency component, by respectively associating the weight values with an average value of brightness, a maximum value of brightness, and a color area of a specific color, the first detection unit detects an average value of brightness, a maximum value of brightness, and a color area of a specific color of the image in each of the divided regions, the second detection unit detects a specific spatial frequency component of the image of the overall display panel, and the drive unit determines the emission brightness of the respective light sources based on a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the specific spatial frequency component that is detected by the second detection unit is a first value or higher, determines the emission brightness of the respective light sources based on a value obtained by multiplying the weight value stored in the storing unit by the average value of brightness that is detected by the first detection unit and a value obtained by multiplying the weight value stored in the storing unit by the maximum value of brightness that is detected by the first detection unit when the specific spatial frequency component that is detected by the second detection unit is a second value, which is smaller than the first value, or less, and determines the emission brightness of the respective light sources based on the maximum value of brightness that is detected by the first detection unit when the specific spatial frequency component that is detected by the second detection unit is smaller than the first value and greater than the second value.

According to the foregoing configuration, a plurality of weight values, which change according to a specific spatial frequency component, are respectively associated with an average value of brightness, a maximum value of brightness, and a color area of a specific color, and stored in the storing unit. Furthermore, an average value of brightness, a maximum value of brightness, and a color area of a specific color of the image in each of the divided regions are detected, and a specific spatial frequency component of the image of the overall display panel is detected. The emission brightness of the respective light sources is determined based on a value obtained by multiplying the weight value stored in the storing unit by the brightness according to the detected color area of the specific color of the image in the respective regions and a value obtained by multiplying the weight value stored in the storing unit by the detected maximum value of brightness of the image in the respective regions when the detected specific spatial frequency component of the image of the overall display panel is a first value or higher. Moreover, the emission brightness of the respective light sources is determined based on a value obtained by multiplying the weight value stored in the storing unit by the detected average value of brightness of the image in the respective regions and a value obtained by multiplying the weight value stored in the storing unit by the detected maximum value of brightness of the image in the respective regions when the detected specific spatial frequency component of the image of the overall display panel is a second value, which is smaller than the first value, or less. In addition, the emission brightness of the respective light sources is determined based on the detected maximum value of brightness of the image in the respective regions when the detected specific spatial frequency component of the image of the overall display panel is smaller than the first value and greater than the second value.

Accordingly, since the emission brightness of the respective light sources is determined based on a value obtained by multiplying a weight value, which changes according to the specific spatial frequency component, to the detected average value of brightness, maximum value of brightness, and color area of a specific color of the image in the respective regions, it is possible to determine the emission brightness in further detail.

Moreover, in the foregoing display device, preferably, the display device further comprises an identification unit which identifies a type of video picture that has been input, and the drive unit determines the emission brightness of the respective light sources corresponding to each of the regions based on a characteristic amount of the image of each region that is detected by the first detection unit, a characteristic amount of the image of the overall display panel that is detected by the second detection unit, and the type of video picture that is identified by the identification unit.

According to the foregoing configuration, since the type of video picture that has been input is identified, and the emission brightness of the respective light sources corresponding to each of the regions is determined based on the detected characteristic amount of the image of each region, the detected characteristic amount of the image of the overall display panel, and the type of video picture that is identified, the appropriate emission brightness of the respective light sources can be determined according to the type of video picture that has been input.

Moreover, in the foregoing display device, preferably, the second detection unit detects a characteristic amount of a remaining image after excluding the images of a specific region from the image of the overall display panel, and the drive unit determines the emission brightness of the respective light sources corresponding to each of the regions based on the characteristic amount of the image of each region that is detected by the first detection unit, and the characteristic amount of the remaining image that is detected by the second detection unit.

According to the foregoing configuration, the characteristic amount of the remaining image after excluding the images of a specific region from the image of the overall display panel is detected. Furthermore, the emission brightness of the respective light sources corresponding to each of the regions is determined based on the detected characteristic amount of the image of each region, and the detected characteristic amount of the remaining image.

For example, the brightness of the image of the overall display panel will differ in a case where the image of the overall display panel contains a black specific region and a case where it does not contain a black specific region. Nevertheless, since the characteristic amount of the remaining image after excluding the images of a specific region is detected from the image of the overall display panel, it is possible to alleviate the visually unpleasant sensation that is experienced by the user even in cases where the brightness of the image of the overall display panel changes as a result of the image of the overall display panel including the specific region.

Moreover, in the foregoing display device, preferably, the display device further comprises an on-screen display region detection unit which detects an on-screen display region on the display panel, and, when the on-screen display region is detected by the on-screen display region detection unit, the drive unit determines the emission brightness of the light source corresponding to the regions including the on-screen display region to be a predetermined brightness that is fixed in advance.

According to the foregoing configuration, when an on-screen display region on the display panel is detected, the emission brightness of the light source corresponding to the regions including the on-screen display region is determined to be a predetermined brightness that is fixed in advance.

For example, when the on-screen display region on the display panel is displayed across a plurality of segmented regions, there are cases where the respective light sources of the plurality of segmented regions included in the on-screen display region emit light at different levels of brightness due to the influence of regions other than the on-screen display region in the segmented regions. In the foregoing case, the on-screen display region will be displayed in various levels of brightness, and the user may experience a visually unpleasant sensation. Nevertheless, when an on-screen display region on the display panel is detected, since the emission brightness of the light source corresponding to the regions including the on-screen display region is determined to be a predetermined brightness that is fixed in advance, it is possible to alleviate the visually unpleasant sensation that is experienced by the user.

The display control method according to another aspect of the present invention is a display control method for controlling a plurality of light sources which are disposed on a back surface of a display panel for displaying a video picture, and which illuminate respective regions obtained by dividing the display panel into a plurality of regions, the display control method comprising a first detection step of detecting a characteristic amount of an image of each of the divided regions, a second detection step of detecting a characteristic amount of an image of the overall display panel, and a drive step of determining an emission brightness of the respective light sources corresponding to each of the regions based on the characteristic amount of the image of each region that is detected in the first detection step, and the characteristic amount of the image of the overall display panel that is detected in the second detection step, and driving the respective light sources to emit light at the determined emission brightness.

According to the foregoing configuration, a characteristic amount of an image of each of the divided regions is detected, and a characteristic amount of an image of the overall display panel is detected. Furthermore, an emission brightness of the respective light sources corresponding to each of the regions is determined based on the detected characteristic amount of the image of each region, and the detected characteristic amount of the image of the overall display panel, and the respective light sources are driven to emit light at the determined emission brightness.

Accordingly, since the emission brightness of the respective light sources corresponding to each of the divided regions is determined in consideration of the characteristic amount of the image of the overall screen in addition to the characteristic amount of the image of each of the divided regions, it is possible to determine the emission brightness of the respective light sources so as to inhibit black floating and insufficient brightness, and reduce the visually unpleasant sensation that is experienced by the user.

The specific embodiments or examples that were described in the foregoing section of Description of Embodiments are first and foremost for clarifying the technical content of the present invention, and the present invention should not be narrowly interpreted by being limited to such specific examples, and may be variously modified and implemented within the scope of the spirit and claims of the present invention.

Industrial Applicability

The display device according to the present invention can reduce the visually unpleasant sensation that is experienced by the user, and is useful as a display device comprising a plurality of light sources on the back surface of the display panel. Moreover, the display control method according to the present invention can reduce the visually unpleasant sensation that is experienced by the user, and is useful as a display control method for controlling a plurality of light sources disposed on the back surface of the display panel.

The invention claimed is:

1. A display device, comprising:

a display panel which displays an image;

a backlight unit which is disposed on a back surface of the display panel, and which includes a plurality of light sources for each region obtained by dividing the display panel into a plurality of regions;

a first detection unit which detects, for an image of each of the divided regions, an average value of brightness, a maximum value of brightness, and a color area of a specific color, as a characteristic amount of the image of each of the divided regions;

a second detection unit which detects, for an image of the overall display panel, a variance value of brightness, as a characteristic amount of the image of the overall display panel; and a drive unit which determines an emission brightness of each of respective light sources, of the plurality of the light sources corresponding to each of the regions, based on the characteristic amount of the image of each region that is detected by the first detection unit, and the characteristic amount of the image of the overall display panel that is detected by the second detection unit, and drives each of the respective light sources to emit light at the determined emission brightness, and wherein the drive unit includes:

a first determination unit which determines whether the variance value of brightness of the image of the overall display panel that is detected by the second detection unit is a first value or higher;

a first emission brightness determination unit which determines a brightness according to the color area of the specific color that is detected by the first detection unit as the emission brightness of each of the respective light sources, when the first determination unit determines that the variance value that is detected by the second detection unit is the first value or higher;

a second determination unit which determines whether the variance value of brightness of the image of the overall display panel that is detected by the second detection unit is a second value, which is smaller than the first value, or less, when the first determination unit determines that the variance value that is detected by the second detection unit is smaller than the first value;

a second emission brightness determination unit which determines the average value of brightness that is detected by the first detection unit as the emission brightness of the respective light sources, when the second determination unit determines that the variance value that is detected by the second detection unit is the second value, or less; and a third emission brightness determination unit which determines the maximum value of brightness that is detected by the first detection unit as the emission brightness of each of the respective light sources, when the second determination unit determines that the variance value that is detected by the second detection unit is smaller than the first value and greater than the second value.

2. The display device according to claim 1, wherein the first detection unit detects the average value of brightness, the maximum value of brightness, and the minimum value of brightness of the image in each of the divided regions, wherein the second detection unit detects the average value of brightness of the image of the overall display panel, and wherein the drive unit includes:

a third determination unit which determines whether the average value of brightness of the image of the overall display panel that is detected by the second detection unit is a third value or higher;

a fourth emission brightness determination unit which determines the maximum value of brightness that is detected by the first detection unit as the emission brightness of each of the respective light sources, when the third determination unit determines that the average value of brightness that is detected by the second detection unit is the third value or higher;

a fourth determination unit which determines whether the average value of brightness of the image of the overall display panel that is detected by the second detection unit is a fourth value, which is smaller than the third value, or less, when the third determination unit determines that the average value of brightness that is detected by the second detection unit is smaller than the third value;

a fifth emission brightness determination unit which determines the minimum value of brightness that is detected by the first detection unit as the emission brightness of each of the respective light sources, when the fourth determination unit determines that the average value of brightness that is detected by the second detection unit is the fourth value or less; and a sixth emission brightness determination unit which determines the average value of brightness that is detected by the first detection unit as the emission brightness of each of the respective light sources, when the fourth determination unit determines that the average value of brightness that is detected by the second detection unit is greater than the fourth value.

3. The display device according to claim 1, further comprising:

a storing unit which stores a plurality of weight values, which change according to a brightness, by respectively associating each of the weight values with an average value of brightness, a maximum value of brightness, and a minimum value of brightness, wherein the first detection unit detects the average value of brightness, the maximum value of brightness, and the minimum value of brightness of the image in each of the divided regions, wherein the second detection unit detects the average value of brightness of the image of the overall display panel, and wherein the drive unit includes:

a third determination unit which determines whether the average value of brightness of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the maximum value of brightness that is detected by the first detection unit and a value obtained by multiplying the weight value stored in the storing unit by the average value of brightness that is detected by the first detection unit, when the third determination unit determines that the average value of brightness that is detected by the second detection unit is the third value or higher;

a fourth determination unit which determines whether the average value of brightness of the image of the overall display panel that is detected by the second detection unit is a fourth value, which is smaller than the third value, or less, when the third determination unit determines that the average value of brightness that is detected by the second detection unit is smaller than the third value;

a fifth emission brightness determination unit which determines, as the emission brightness of each of the respective light sources, a total value of a value obtained by multiplying the weight value stored in the storing unit by the minimum value of brightness that is detected by the first detection unit and a value obtained by multiplying the weight value stored in the storing unit by the average value of brightness that is detected by the first detection unit, when the fourth determination unit determines that the average value of brightness that is detected by the second detection unit is the fourth value or less; and a sixth emission brightness determination unit which determines the average value of brightness that is detected by the first detection unit as the emission brightness of each of the respective light sources, when the fourth determination unit determines that the average value of brightness that is detected by the second detection unit is greater than the fourth value.

4. The display device according to claim 1, wherein the first detection unit detects the average value of brightness, the maximum value of brightness, and the minimum value of brightness of the image in each of the divided regions, wherein the second detection unit detects the color area of the specific color of the image of the overall display panel, and wherein the drive unit includes:

a third determination unit which determines whether the color area of the specific color of the image of the overall display panel that is detected by the second detection unit is a third value or higher;

a fourth emission brightness determination unit which determines the maximum value of brightness that is detected by the first detection unit as the emission brightness of each of the respective light sources, when the third determination unit determines that the color area of the specific color that is detected by the second detection unit is the third value or higher;

a fourth determination unit which determines whether the color area of the specific color of the image of the overall display panel that is detected by the second detection unit is a fourth value, which is smaller than the third value, or less, when the third determination unit determines that the color area of the specific color that is detected by the second detection unit is smaller than the third value;

a fifth emission brightness determination unit which determines the minimum value of brightness that is detected by the first detection unit as the emission brightness of each of the respective light sources, when the fourth determination unit determines that the color area of the specific color that is detected by the second detection unit is the fourth value or less; and a sixth emission brightness determination unit which determines the average value of brightness that is detected by the first detection unit as the emission brightness of each of the respective light sources, when the fourth determination unit determines that the color area of the specific color that is detected by the second detection unit is greater than the fourth value.

5. The display device according to claim 1, further comprising:

a storing unit which stores a plurality of weight values, which change according to a color area of a specific color, by respectively associating each of the weight values with an average value of brightness, a maximum value of brightness, and a minimum value of brightness, wherein the first detection unit detects the average value of brightness, the maximum value of brightness, and the minimum value of brightness of the image in each of the divided regions, wherein the second detection unit detects the color area of the specific color of the image of the overall display panel, and wherein the drive unit includes:

a third determination unit which determines whether the color area of the specific color of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the maximum value of brightness that is detected by the first detection unit and a value obtained by multiplying the weight value stored in the storing unit by the average value of brightness that is detected by the first detection unit, when the third determination unit determines that the color area of the specific color that is detected by the second detection unit is the third value or higher;

a fourth determination unit which determines whether the color area of the specific color of the image of the overall display panel that is detected by the second detection unit is a fourth value, which is smaller than the third value, or less, when the third determination unit determines that the color area of the specific color that is detected by the second detection unit is smaller than the third value;

a fifth emission brightness determination unit which determines, as the emission brightness of each of the respective light sources, a total value of a value obtained by multiplying the weight value stored in the storing unit by the minimum value of brightness that is detected by the first detection unit and a value obtained by multiplying the weight value stored in the storing unit by the average value of brightness that is detected by the first detection unit, when the fourth determination unit determines that the color area of the specific color that is detected by the second detection unit is the fourth value or less; and a sixth emission brightness determination unit which determines the average value of brightness that is detected by the first detection unit as the emission brightness of each of the respective light sources, when the fourth determination unit determines that the color area of the specific color that is detected by the second detection unit is greater than the fourth value.

6. The display device according to claim 1, wherein the first detection unit detects the average value of brightness, the maximum value of brightness, and the minimum value of brightness of the image in each of the divided regions, wherein the second detection unit detects the variance value of brightness of the image of the overall display panel, and wherein the drive unit includes:

a fourth emission brightness determination unit which determines the maximum value of brightness that is detected by the first detection unit as the emission brightness of each of the respective light sources, when the first determination unit determines that the variance value that is detected by the second detection unit is the first value or higher;

a fifth emission brightness determination unit which determines the minimum value of brightness that is detected by the first detection unit as the emission brightness of each of the respective light sources, when the second determination unit determines that the variance value that is detected by the second detection unit is the second value or less; and a sixth emission brightness determination unit which determines the average value of brightness that is detected by the first detection unit as the emission brightness of each of the respective light sources, when the second determination unit determines that the variance value that is detected by the second detection unit is greater than the second value.

7. The display device according to claim 1, further comprising:

a storing unit which stores a plurality of weight values, which change according to a variance value of brightness, by respectively associating each of the weight values with an average value of brightness, a maximum value of brightness, and a minimum value of brightness, wherein the first detection unit detects the average value of brightness, the maximum value of brightness, and the minimum value of brightness of the image in each of the divided regions, wherein the second detection unit detects the variance value of brightness of the image of the overall display panel, and wherein the drive unit includes:

a fourth emission brightness determination unit which determines, as the emission brightness of each of the respective light sources, a total value of a value obtained by multiplying the weight value stored in the storing unit by the maximum value of brightness that is detected by the first detection unit and a value obtained by multiplying the weight value stored in the storing unit by the average value of brightness that is detected by the first detection unit, when the first determination unit determines that the variance value that is detected by the second detection unit is the first value or higher;

a fifth emission brightness determination unit which determines, as the emission brightness of each of the respective light sources, a total value of a value obtained by multiplying the weight value stored in the storing unit by the minimum value of brightness that is detected by the first detection unit and a value obtained by multiplying the weight value stored in the storing unit by the average value of brightness that is detected by the first detection unit, when the second determination unit determines that the variance value that is detected by the second detection unit is the second value or less; and a sixth emission brightness determination unit which determines the average value of brightness that is detected by the first detection unit as the emission brightness of each of the respective light sources, when the second determination unit determines that the variance value that is detected by the second detection unit is greater than the second value.

8. The display device according to claim 1, wherein the first detection unit detects the average value of brightness, the maximum value of brightness, and the minimum value of brightness of the image in each of the divided regions, wherein the second detection unit detects a specific spatial frequency component of the image of the overall display panel, and wherein the drive unit includes:

a third determination unit which determines whether the specific spatial frequency component of the image of the overall display panel that is detected by the second detection unit is a third value or higher;

a fourth emission brightness determination unit which determines the maximum value of brightness that is detected by the first detection unit as the emission brightness of each of the respective light sources, when the third determination unit determines that the specific spatial frequency component that is detected by the second detection unit is the third value or higher;

a fourth determination unit which determines whether the specific spatial frequency component of the image of the overall display panel that is detected by the second detection unit is a fourth value, which is smaller than the third value, or less, when the third determination unit determines that the specific spatial frequency component that is detected by the second detection unit is smaller than the third value;

a fifth emission brightness determination unit which determines the minimum value of brightness that is detected by the first detection unit as the emission brightness of each of the respective light sources, when the fourth determination unit determines that the specific spatial frequency component that is detected by the second detection unit is the fourth value or less; and a sixth emission brightness determination unit which determines the average value of brightness that is detected by the first detection unit as the emission brightness of each of the respective light sources, when the fourth determination unit determines that the specific spatial frequency component that is detected by the second detection unit is greater than the fourth value.

9. The display device according to claim 1, further comprising:

a storing unit which stores a plurality of weight values, which change according to a specific spatial frequency component, by respectively associating each of the weight values with an average value of brightness, a maximum value of brightness, and a minimum value of brightness, wherein the first detection unit detects the average value of brightness, the maximum value of brightness, and the minimum value of brightness of the image in each of the divided regions, wherein the second detection unit detects a specific spatial frequency component of the image of the overall display panel, and wherein the drive unit includes:

a third determination unit which determines whether the specific spatial frequency component of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the maximum value of brightness that is detected by the first detection unit and a value obtained by multiplying the weight value stored in the storing unit by the average value of brightness that is detected by the first detection unit, when the third determination unit determines that the specific spatial frequency component that is detected by the second detection unit is the third value or higher;

a fourth determination unit which determines whether the specific spatial frequency component of the image of the overall display panel that is detected by the second detection unit is a fourth value, which is smaller than the third value, or less, when the third determination unit determines that the specific spatial frequency component that is detected by the second detection unit is smaller than the third value;

a fifth emission brightness determination unit which determines, as the emission brightness of each of the respective light sources, a total value of a value obtained by multiplying the weight value stored in the storing unit by the minimum value of brightness that is detected by the first detection unit and a value obtained by multiplying the weight value stored in the storing unit by the average value of brightness that is detected by the first detection unit, when the fourth determination unit determines that the specific spatial frequency component that is detected by the second detection unit is the fourth value or less; and a sixth emission brightness determination unit which determines the average value of brightness that is detected by the first detection unit as the emission brightness of each of the respective light sources, when the fourth determination unit determines that the specific spatial frequency component that is detected by the second detection unit is greater than the fourth value.

10. The display device according to claim 1, wherein the first detection unit detects the average value of brightness, the maximum value of brightness, and the color area of the specific color of the image in each of the divided regions, wherein the second detection unit detects the average value of brightness of the image of the overall display panel, and wherein the drive unit includes:

a third determination unit which determines whether the average value of brightness of the image of the overall display panel that is detected by the second detection unit is a third value or higher;

a fourth emission brightness determination unit which determines the brightness according to the color area of the specific color that is detected by the first detection unit, when the third determination unit determines that the average value of brightness that is detected by the second detection unit is the third value or higher;

a fourth determination unit which determines whether the average value of brightness of the image of the overall display panel that is detected by the second detection unit is a fourth value, which is smaller than the third value, or less, when the third determination unit determines that the average value of brightness that is detected by the second detection unit is smaller than the third value;

a fifth emission brightness determination unit which determines the average value of brightness that is detected by the first detection unit as the emission brightness of each of the respective light sources, when the fourth determination unit determines that the average value of brightness that is detected by the second detection unit is the fourth value or less; and a sixth emission brightness determination unit which determines the maximum value of brightness that is detected by the first detection unit as the emission brightness of each of the respective light sources, when the fourth determination unit determines that the average value of brightness that is detected by the second detection unit is greater than the fourth value.

11. The display device according to claim 1, further comprising:

a storing unit which stores a plurality of weight values, which change according to a brightness, by respectively associating each of the weight values with an average value of brightness, a maximum value of brightness, and a color area of a specific color, wherein the first detection unit detects the average value of brightness, the maximum value of brightness, and the color area of the specific color of the image in each of the divided regions, wherein the second detection unit detects the average value of brightness of the image of the overall display panel, and wherein the drive unit includes:

a third determination unit which determines whether the average value of brightness of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit, when the third determination unit determines that the average value of brightness that is detected by the second detection unit is the third value or higher;

a fourth determination unit which determines whether the average value of brightness of the image of the overall display panel that is detected by the second detection unit is a fourth value, which is smaller than the third value, or less, when the third determination unit determines that the average value of brightness that is detected by the second detection unit is smaller than the third value;

a fifth emission brightness determination unit which determines, as the emission brightness of each of the respective light sources, a total value of a value obtained by multiplying the weight value stored in the storing unit by the average value of brightness that is detected by the first detection unit and a value obtained by multiplying the weight value stored in the storing unit by the maximum value of brightness that is detected by the first detection unit, when the fourth determination unit determines that the average value of brightness that is detected by the second detection unit is the fourth value or less; and a sixth emission brightness determination unit which determines the maximum value of brightness that is detected by the first detection unit as the emission brightness of each of the respective light sources, when the fourth determination unit determines that the average value of brightness that is detected by the second detection unit is greater than the fourth value.

12. The display device according to claim 1, wherein the first detection unit detects the average value of brightness, the maximum value of brightness, and the color area of the specific color of the image in each of the divided regions, wherein the second detection unit detects the color area of the specific color of the image of the overall display panel, and wherein the drive unit includes:

a third determination unit which determines whether the color area of the specific color of the image of the overall display panel that is detected by the second detection unit is a third value or higher;

a fourth emission brightness determination unit which determines the brightness according to the color area of the specific color that is detected by the first detection unit as the emission brightness of each of the respective light sources, when the third determination unit determines that the color area of the specific color that is detected by the second detection unit is the third value or higher;

a fourth determination unit which determines whether the color area of the specific color of the image of the overall display panel that is detected by the second detection unit is a fourth value, which is smaller than the third value, or less, when the third determination unit determines that the color area of the specific color that is detected by the second detection unit is smaller than the third value;

a fifth emission brightness determination unit which determines the average value of brightness that is detected by the first detection unit as the emission brightness of each of the respective light sources, when the fourth determination unit determines that the color area of the specific color that is detected by the second detection unit is the fourth value or less; and a sixth emission brightness determination unit which determines the maximum value of brightness that is detected by the first detection unit as the emission brightness of each of the respective light sources, when the fourth determination unit determines that the color area of the specific color that is detected by the second detection unit is greater than the fourth value.

13. The display device according to claim 1, further comprising:

a storing unit which stores a plurality of weight values, which change according to a color area of a specific color, by respectively associating each of the weight values with an average value of brightness, a maximum value of brightness, and a color area of a specific color, wherein the first detection unit detects the average value of brightness, the maximum value of brightness, and the color area of the specific color of the image in each of the divided regions, wherein the second detection unit detects the color area of the specific color of the image of the overall display panel, and wherein the drive unit includes:

a third determination unit which determines whether the color area of the specific color of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the third determination unit determines that the color area of the specific color that is detected by the second detection unit is the third value or higher;

a fourth determination unit which determines whether the color area of the specific color of the image of the overall display panel that is detected by the second detection unit is a fourth value, which is smaller than the third value, or less, when the third determination unit determines that the color area of the specific color that is detected by the second detection unit is smaller than the third value;

a fifth emission brightness determination unit which determines, as the emission brightness of each of the respective light sources, a total value of a value obtained by multiplying the weight value stored in the storing unit by the average value of brightness that is detected by the first detection unit and a value obtained by multiplying the weight value stored in the storing unit by the maximum value of brightness that is detected by the first detection unit, when the fourth determination unit determines that the color area of the specific color that is detected by the second detection unit is the fourth value or less; and a sixth emission brightness determination unit which determines the maximum value of brightness that is detected by the first detection unit as the emission brightness of each of the respective light sources, when the fourth determination unit determines that the color area of the specific color that is detected by the second detection unit is greater than the fourth value.

14. The display device according to claim 1, further comprising:

a storing unit which stores a plurality of weight values, which change according to a variance value of brightness, by respectively associating each of the weight values with an average value of brightness, a maximum value of brightness, and a color area of a specific color, wherein the first emission brightness determination unit determines, as the emission brightness of each of the respective light sources, a total value of a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit, when the first determination unit determines that the variance value that is detected by the second detection unit is the first value or higher, wherein the second emission brightness determination unit determines, as the emission brightness of each of the respective light sources, a total value of a value obtained by multiplying the weight value stored in the storing unit by the average value of brightness that is detected by the first detection unit and a value obtained by multiplying the weight value stored in the storing unit by the maximum value of brightness that is detected by the first detection unit, when the second determination unit determines that the variance value that is detected by the second detection unit is the second value or less, and wherein the third emission brightness determination unit determines the maximum value of brightness that is detected by the first detection unit as the emission brightness of each of the respective light sources, when the second determination unit determines that the variance value that is detected by the second detection unit is greater than the second value.

15. The display device according to claim 1, wherein the first detection unit detects the average value of brightness, the maximum value of brightness, and the color area of the specific color of the image in each of the divided regions, wherein the second detection unit detects a specific spatial frequency component of the image of the overall display panel, and wherein the drive unit includes:

a third determination unit which determines whether the specific spatial frequency component of the image of the overall display panel that is detected by the second detection unit is a third value or higher;

a fourth emission brightness determination unit which determines the brightness according to the color area of the specific color that is detected by the first detection unit as the emission brightness of each of the respective light sources, when the third determination unit determines that the specific spatial frequency component that is detected by the second detection unit is the third value or higher;

a fourth determination unit which determines whether the specific spatial frequency component of the image of the overall display panel that is detected by the second detection unit is a fourth value, which is smaller than the third value, or less, when the third determination unit determines that the specific spatial frequency component that is detected by the second detection unit is smaller than the third value;

a fifth emission brightness determination unit which determines the average value of brightness that is detected by the first detection unit as the emission brightness of each of the respective light sources, when the fourth determination unit determines that the specific spatial frequency component that is detected by the second detection unit is the fourth value or less; and a sixth emission brightness determination unit which determines the maximum value of brightness that is detected by the first detection unit as the emission brightness of each of the respective light sources, when the fourth determination unit determines that the specific spatial frequency component that is detected by the second detection unit is greater than the fourth value.

16. The display device according to claim 1, further comprising:

a storing unit which stores a plurality of weight values, which change according to a specific spatial frequency component, by respectively associating each of the weight values with an average value of brightness, a maximum value of brightness, and a color area of a specific color, wherein the first detection unit detects the average value of brightness, the maximum value of brightness, and the color area of the specific color of the image in each of the divided regions, wherein the second detection unit detects a specific spatial frequency component of the image of the overall display panel, and wherein the drive unit includes:

a third determination unit which determines whether the specific spatial frequency component of the image of the overall display panel that is detected by the second detection unit is a third value or higher;

a fourth emission brightness determination unit which determines, as the emission brightness of each of the respective light sources, a total value of a value obtained by multiplying the weight value stored in the storing unit by the brightness according to the color area of the specific color that is detected by the first detection unit and a value obtained by multiplying the weight value stored in the storing unit by the maximum value of brightness that is detected by the first detection unit when the third determination unit determines that the specific spatial frequency component that is detected by the second detection unit is the third value or higher;

a fourth determination unit which determines whether the specific spatial frequency component of the image of the overall display panel that is detected by the second detection unit is a fourth value, which is smaller than the third value, or less, when the third determination unit determines that the specific spatial frequency component that is detected by the second detection unit is smaller than the third value;

a fifth emission brightness determination unit which determines, as the emission brightness of each of the respective light sources, a total value of a value obtained by multiplying the weight value stored in the storing unit by the average value of brightness that is detected by the first detection unit and a value obtained by multiplying the weight value stored in the storing unit by the maximum value of brightness that is detected by the first detection unit, when the fourth determination unit determines that the specific spatial frequency component that is detected by the second detection unit is the fourth value or less; and a sixth emission brightness determination unit which determines the maximum value of brightness that is detected by the first detection unit as the emission brightness of each of the respective light sources, when the fourth determination unit determines that the specific spatial frequency component that is detected by the second detection unit is greater than the fourth value.

17. The display device according to claim 1, further comprising:

an identification unit which identifies a type of video picture that has been input, wherein the drive unit determines the emission brightness of each of the respective light sources corresponding to each of the regions based on the characteristic amount of the image of each region that is detected by the first detection unit, the characteristic amount of the image of the overall display panel that is detected by the second detection unit, and the type of video picture that is identified by the identification unit.

18. The display device according to claim 1, wherein the second detection unit detects a characteristic amount of a remaining image after excluding the images of a specific region from the image of the overall display panel, and wherein the drive unit determines the emission brightness of each of the respective light sources corresponding to each of the regions based on the characteristic amount of the image of each region that is detected by the first detection unit, and the characteristic amount of the remaining image that is detected by the second detection unit.

19. The display device according to claim 1, further comprising:

an on-screen display region detection unit which detects an on-screen display region on the display panel, wherein, when the on-screen display region is detected by the on-screen display region detection unit, the drive unit determines the emission brightness of a light source corresponding to the regions including the on-screen display region to be a predetermined brightness that is fixed in advance.

20. A display control method for controlling a plurality of light sources which are disposed on a back surface of a display panel for displaying an image, and which illuminate respective regions obtained by dividing the display panel into a plurality of regions, the display control method comprising:

a first detection step of detecting, for an image of each of the divided regions, an average value of brightness, a maximum value of brightness, and a color area of a specific color, as a characteristic amount of the image of each of the divided regions;

a second detection step of detecting, for an image of the overall display panel, a variance value of brightness, as a characteristic amount of the image of the overall display panel; and a drive step of determining an emission brightness of each of respective light sources, of the plurality of the light sources corresponding to each of the regions, based on the characteristic amount of the image of each region that is detected in the first detection step, and the characteristic amount of the image of the overall display panel that is detected in the second detection step, and driving each of the respective light sources to emit light at the determined emission brightness, and wherein the drive step includes:

a first determination step of determining whether the variance value of brightness of the image of the overall display panel that is detected by the second detection step is a first value or higher;

a first emission brightness determination step of determining a brightness according to the color area of the specific color that is detected by the first detection step as the emission brightness of each of the respective light sources, when the first determination step determines that the variance value that is detected by the second detection step is the first value or higher;

a second determination step of determining whether the variance value of brightness of the image of the overall display panel that is detected by the second detection step is a second value, which is smaller than the first value, or less, when the first determination step determines that the variance value that is detected by the second detection step is smaller than the first value;

a second emission brightness determination step of determining the average value of brightness that is detected by the first detection step as the emission brightness of each of the respective light sources, when the second determination step determines that the variance value that is detected by the second detection step is the second value or less; and a third emission brightness determination step of determining the maximum value of brightness that is detected by the first detection step as the emission brightness of each of the respective light sources, when the second determination step determines that the variance value that is detected by the second detection step is smaller than the first value and greater than the second value.

* * * * *